(12) United States Patent
Mendelson et al.

(10) Patent No.: US 11,640,738 B2
(45) Date of Patent: May 2, 2023

(54) SYSTEM AND METHOD FOR TRACKING USERS OR OBJECTS AND PROVIDING ASSOCIATED DATA FOR FEATURES CORRESPONDING THERETO

(71) Applicant: WHITEWATER WEST INDUSTRIES, LTD., Richmond (CA)

(72) Inventors: Aaron Daniel Mendelson, Longmont, CO (US); Richard D K Bojahra, New Westminster (CA); David Allan Black, North Vancouver (CA); Rick Briggs, Springfield, IL (US); Philip R. Edgell, North Vancouver (CA)

(73) Assignee: WHITEWATER WEST INDUSTRIES, LTD., Richmond (CA)

( * ) Notice: Subject to any disclaimer, the term of this patent is extended or adjusted under 35 U.S.C. 154(b) by 0 days.

(21) Appl. No.: 16/939,057

(22) Filed: Jul. 27, 2020

(65) Prior Publication Data
US 2020/0357211 A1 Nov. 12, 2020

Related U.S. Application Data

(62) Division of application No. 16/368,687, filed on Mar. 28, 2019.

(60) Provisional application No. 62/759,946, filed on Nov. 12, 2018, provisional application No. 62/680,567, (Continued)

(51) Int. Cl.
*G07C 9/24* (2020.01)
*H04W 4/029* (2018.01)
*G06F 1/16* (2006.01)
*H04W 4/38* (2018.01)
*G07C 9/29* (2020.01)
(Continued)

(52) U.S. Cl.
CPC .............. *G07C 9/247* (2020.01); *G06F 1/163* (2013.01); *G07C 9/257* (2020.01); *G07C 9/27* (2020.01); *G07C 9/29* (2020.01); *H04W 4/029* (2018.02); *H04W 4/38* (2018.02)

(58) Field of Classification Search
CPC ......... G06F 1/163; G07C 9/247; G07C 9/257; G07C 9/27; G07C 9/28; G07C 9/29; H04W 4/029; H04W 4/23; H04W 4/38
See application file for complete search history.

(56) References Cited

U.S. PATENT DOCUMENTS 9,491,578 B1 * 11/2016 Saucedo ........... H04M 1/72457
10,855,335 B1 * 12/2020 Napoles ................... H04B 5/06
(Continued)

*Primary Examiner* — Yong Hang Jiang
(74) *Attorney, Agent, or Firm* — Buchalter, A Professional Corporation

(57) ABSTRACT

A system and method for sensing or tracking users at a geographic location or destination and collecting data based upon such users and/or the tracking of such users for enhancing the experience of the users, providing increased operational functionality of venues or attractions associated with the destination, and/or managing or influencing behavior associated with users or employees at the geographic location or destination. The system may be accessible via software applications executed upon mobile devices and/or permanent hardware kiosks and/or via a web-based interface. Trackable hardware is carried and/or worn or otherwise associated with the users so that the users' movement and activities may be tracked at the geographic location or destination.

7 Claims, 42 Drawing Sheets

Related U.S. Application Data filed on Jun. 4, 2018, provisional application No. 62/649,508, filed on Mar. 28, 2018.

(51) Int. Cl.
  *G07C 9/25* (2020.01)
  *G07C 9/27* (2020.01)

(56) References Cited

U.S. PATENT DOCUMENTS

| | | | |
|---|---|---|---|
| 2008/0088412 A1* | 4/2008 | Cromer | G07C 9/00182 |
| | | | 340/539.3 |
| 2011/0209373 A1* | 9/2011 | Padgett | A61B 90/90 |
| | | | 235/492 |
| 2013/0341414 A1* | 12/2013 | Ziller | H01Q 5/40 |
| | | | 235/492 |
| 2016/0156603 A1* | 6/2016 | Janik | G06Q 20/401 |
| | | | 726/7 |
| 2016/0324470 A1* | 11/2016 | Townsend | A61B 5/681 |
| 2018/0020193 A1* | 1/2018 | Blum | G06F 1/1686 |
| 2018/0041859 A1* | 2/2018 | Forster | G06Q 20/321 |
| 2021/0283627 A1* | 9/2021 | Andrinal Lopez | A61M 11/00 |

\* cited by examiner

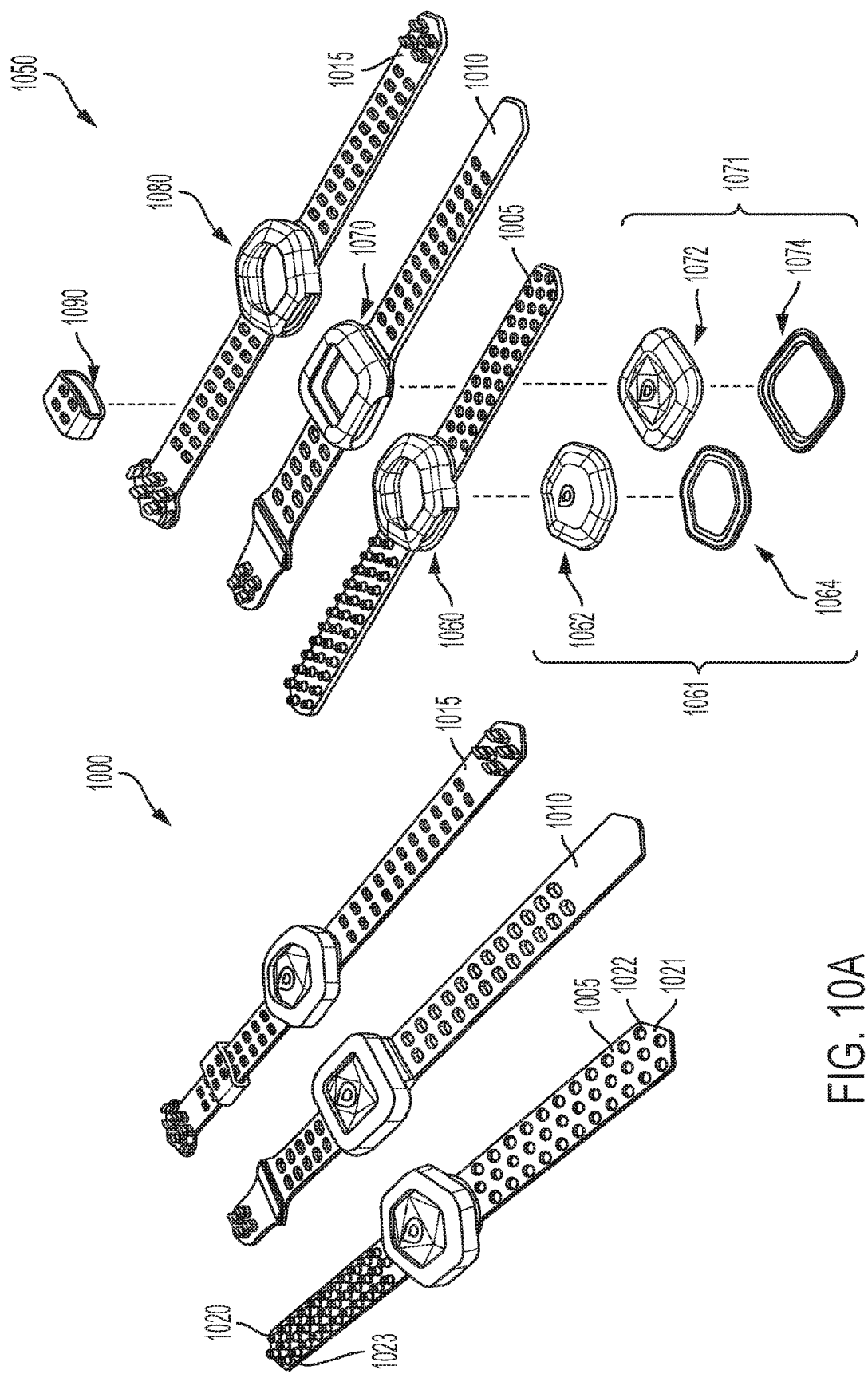

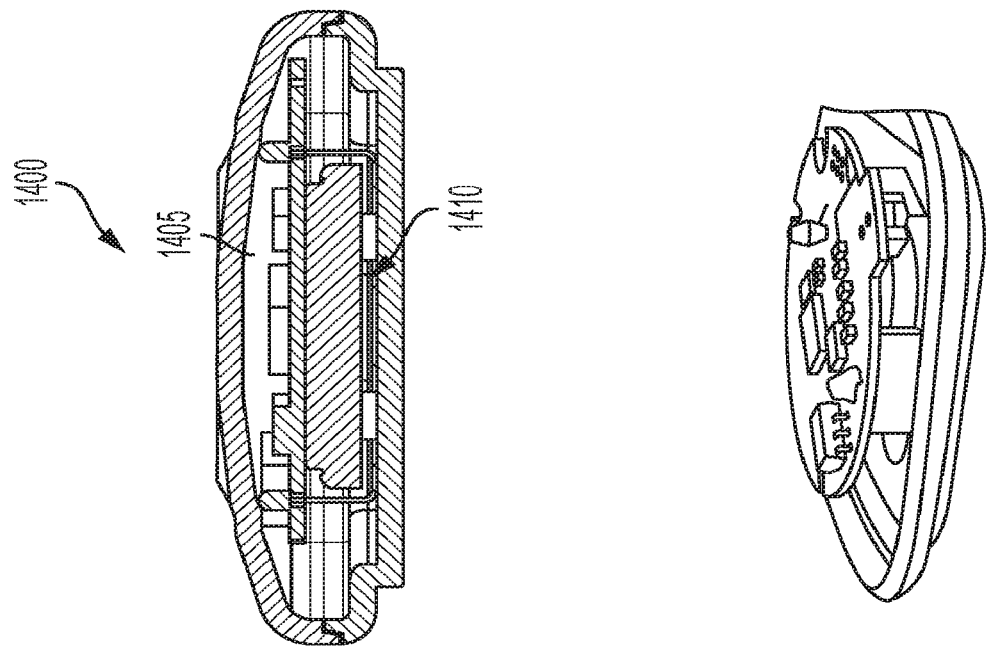
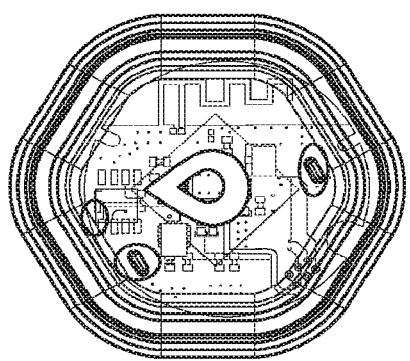
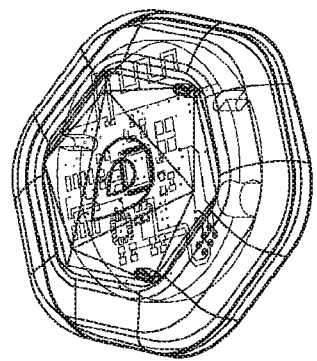
FIG. 14

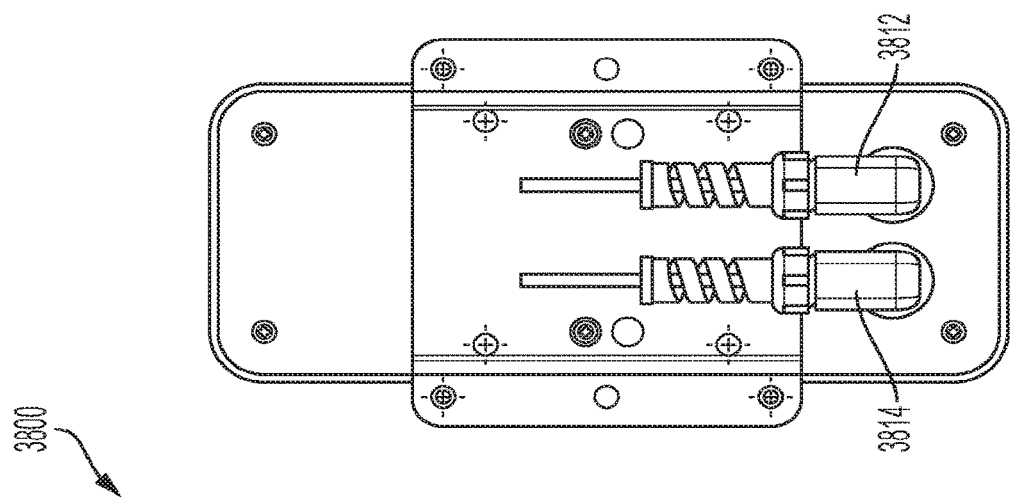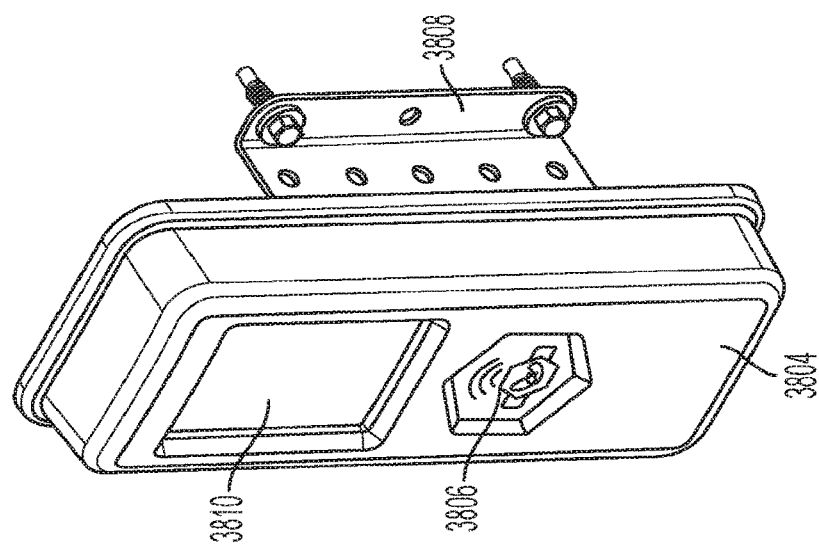
FIG. 38

SYSTEM AND METHOD FOR TRACKING USERS OR OBJECTS AND PROVIDING ASSOCIATED DATA FOR FEATURES CORRESPONDING THERETO

CROSS REFERENCE TO RELATED APPLICATIONS

This application claims the benefit of U.S. Provisional Patent Application Ser. No. 62/759,946, filed on Nov. 12, 2018, entitled "SYSTEM AND METHOD FOR TRACKING USERS OR OBJECTS AND PROVIDING ASSOCIATED DATA OR FEATURES CORRESPONDING THERETO," which is hereby incorporated by reference in its entirety into this application. This application claims the benefit of U.S. Provisional Patent Application Ser. No. 62/680,567, filed on Jun. 4, 2018, entitled "SYSTEM AND METHOD FOR TRACKING USERS OR OBJECTS AND PROVIDING ASSOCIATED DATA OR FEATURES CORRESPONDING THERETO," which is hereby incorporated by reference in its entirety into this application. This application claims the benefit of U.S. Provisional Patent Application Ser. No. 62/649,508, filed on Mar. 28, 2018, entitled "TRACKING OR MONITORING SYSTEM FOR ENTERTAINMENT ATTRACTIONS OR ENTERTAINMENT FACILITIES," which is hereby incorporated by reference in its entirety into this application.

BACKGROUND

1. Field of the Invention

The present invention relates to a system or method for tracking users and/or objects in a geographical location or other area and providing associated features or information. More particularly, the present invention relates to a system or method for tracking users and/or objects (e.g., guests) at a location (e.g., an amusement park or waterpark) and providing information or features to and/or about those users and/or objects for increasing user satisfaction at the geographical location or otherwise and/or for providing improved operational performance and/or efficiency.

2. Description of the Related Art

Amusement parks, waterparks, mixed-use theme parks (e.g., coupled with hotels, resorts, etc.), and/or other venues for entertaining guests ("Entertainment Venues") are popular entertainment destinations where guests congregate within a geographic location that contains a number of entertainment or associated activities (e.g., shows, rides or attractions, dining options, lockers, hotel rooms, concessions, etc.) for the participation of the guests. Entertainment Venues provide such entertainment activities to its guests without having specific data as to what a particular guest is doing at the amusement park or waterpark at a particular time. Moreover, operators of Entertainment Venues do not have specific data concerning guest demographics and how certain demographics are capable of interacting on a real-time basis with one or more of the entertainment activities provided. One or more of crowd control, payment methods, maintenance of facilities and/or attractions, efficiency of staff activity and/or guest activity, guest convenience, and/or customer service issues in conventional Entertainment Venue operation may be significant issues that can impact guest enjoyment and/or finances.

Ideally, an improved system for an Entertainment Venue would be configured to provide the owner, operator, and/or manager with specific and/or particular data about and/or associated with or concerning each guest or group of guests that participates at the Entertainment Venue. This data would ideally enable improved customer service and/or guest experience, improved operational performance and/or efficiency for one or more of the entertainment activities, or other available facilities that a guest may participate with, improved demographic information and guest activity information to help guide future decisions about the Entertainment Venue and/or surrounding geographic area, among possible options. The improved system or method could track the location and/or participation of guests at the Entertainment Venue, or other objects or structures associated with the Entertainment Venue.

SUMMARY

The present invention involves devices and/or features for tracking users and/or objects within a particular destination, location, or area, such as an Entertainment Venue, and to provide enhanced user experience and/or operational performance/efficiency. A system for tracking a user at a destination may include a trackable hardware configured to transmit short-range and long-range signals for detection of the trackable hardware, a short-range receiver configured to receive short-range transmissions from the trackable hardware, a long-range receiver configured to receive long-range transmissions from the trackable hardware, and a processor for determining positioning of the trackable hardware based on information received from the short-range-receiver and/or the long-range receiver, including performance of accuracy checks or determinations. Data associated with the tracking of the trackable hardware may be used to control operation of one or more attractions, communicate with users, or otherwise help control goods or services.

A method for providing enhanced user experience features for an amusement park may include providing a software application configured to be executed upon a portable device of a user where the software application may be configured to: establish a link with a trackable wristband (or other trackable object, such as phone, watch, key fob, necklace, etc.) of the user, allow the user to view information associated with the amusement park, allow the user to choose a theme for use in at least one attraction of the amusement park, allow the user to choose a music type for use in at least one attraction of the amusement park, allow the user to establish a user profile, allow the user to obtain and view badges based on activities of the user at the amusement park, allow the user to view a history of the user's activity at the amusement park, allow the user to view a wait time for at least one attraction of the amusement park, the wait time updated in real time based upon tracking data associated with every user that enters the amusement park, allow the user to obtain a currency based upon activities of the user at the amusement park, allow the user to spend the currency obtained on products or services at the amusement park, allow the user to make reservations for at least one attraction of the amusement park, allow for tracking and/or communication with other users, such as family/friends, and/or allow for ordering of photographs or other media, products, and/or services.

A method may include providing a kiosk fixed at a location in the amusement park, the kiosk configured to execute a software application that may be configured to establish a link with a trackable wristband of the user, allow the user to view information associated with the amusement park, allow the user to choose a theme for use in at least one attraction of the amusement park, allow the user to choose a music type for use in at least one attraction of the amusement park, allow the user to establish a user profile, allow the user to obtain and view badges based on activities of the user at the amusement park, allow the user to view a history of the user's activity at the amusement park, allow the user to view a wait time for at least one attraction of the amusement park, the wait time updated in real time based upon tracking data associated with every user that enters the amusement park, allow the user to obtain a currency based upon activities of the user at the amusement park, allow the user to spend the currency obtained on products or services at the amusement park, and allow the user to make reservations for at least one attraction of the amusement park.

In one embodiment, a device associated with a user for tracking may include a capsule having a cavity. The cavity of the capsule may contain a printed circuit board having a first side and a second side, a first transmitter configured to transmit unique identification data corresponding to the capsule for a maximum distance of less than 3 ft, the first transmitter connected on the first side of the printed circuit board, a second transmitter configured to transmit the unique identification data corresponding to the capsule for a distance that is greater than the maximum distance of the first transmitter, the second transmitter connected on the second side of the printed circuit board, and a battery for providing power to the first transmitter or the second transmitter.

In one embodiment, a structure for interaction by a user may include a body having a cavity therein, a sensor connected with the body and configured to sense a unique identifier associated with the user, a display connected with the body, and a processor connected with the sensor and the display. The processor may be configured to receive information from a server based on the unique identifier sensed by the sensor, cause the display to display the information, receive input from the user, and transmit information to the server based on the input received from the display.

In one embodiment, a system for tracking a user at a destination may include a trackable device configured to be associated with the user, a kiosk having a first sensor and a display, the first sensor configured to sense the trackable device when the trackable device is within 2 ft of the first sensor, the display configured to display information based upon the sensing of the trackable device, a second sensor configured to sense the trackable device, a processor configured to determine a position of the trackable device based on the sensing of the trackable device by the second sensor, and a server in communication with the processor and configured to store data based on the position of the trackable device determined by the processor.

In one embodiment, a system for tracking a user at a destination may include a trackable device configured to be associated with the user, a first sensor configured to sense the trackable device, a second sensor configured to sense the trackable device, a server in communication with the processor and configured to store data based on the sensing of the trackable device by the first sensor and the second sensor, and a processor configured to allocate one or more points to the user based on the sensing of the trackable device by the first sensor or the second sensor.

In one embodiment, a system for tracking a plurality of users at a destination may include a plurality of trackable devices configured to be associated with the plurality of users, a sensor configured to sense the plurality of trackable devices, a server in communication with the processor and configured to store data based on the sensing of the plurality of trackable device by the sensor, and a processor configured to provide a notification based upon the plurality of trackable devices being sensed by the sensor.

BRIEF DESCRIPTION OF THE DRAWINGS

FIG. 10A illustrates a perspective view of a plurality of wristbands configured to be sensed or tracked by a system, according to one exemplary embodiment of the invention;

FIG. 10B illustrates an exploded view of component parts making up the plurality of wristbands of FIG. 10A;

FIG. 14 illustrates electrical component layout making up a capsule shaped as a hexagon that is configured to be tracked by a system, according to one exemplary embodiment of the invention;

FIG. 38 illustrates a sensing or tag-up device for user engagement and/or interaction, according to one exemplary embodiment of the invention.

DETAILED DESCRIPTION

Figure 1:
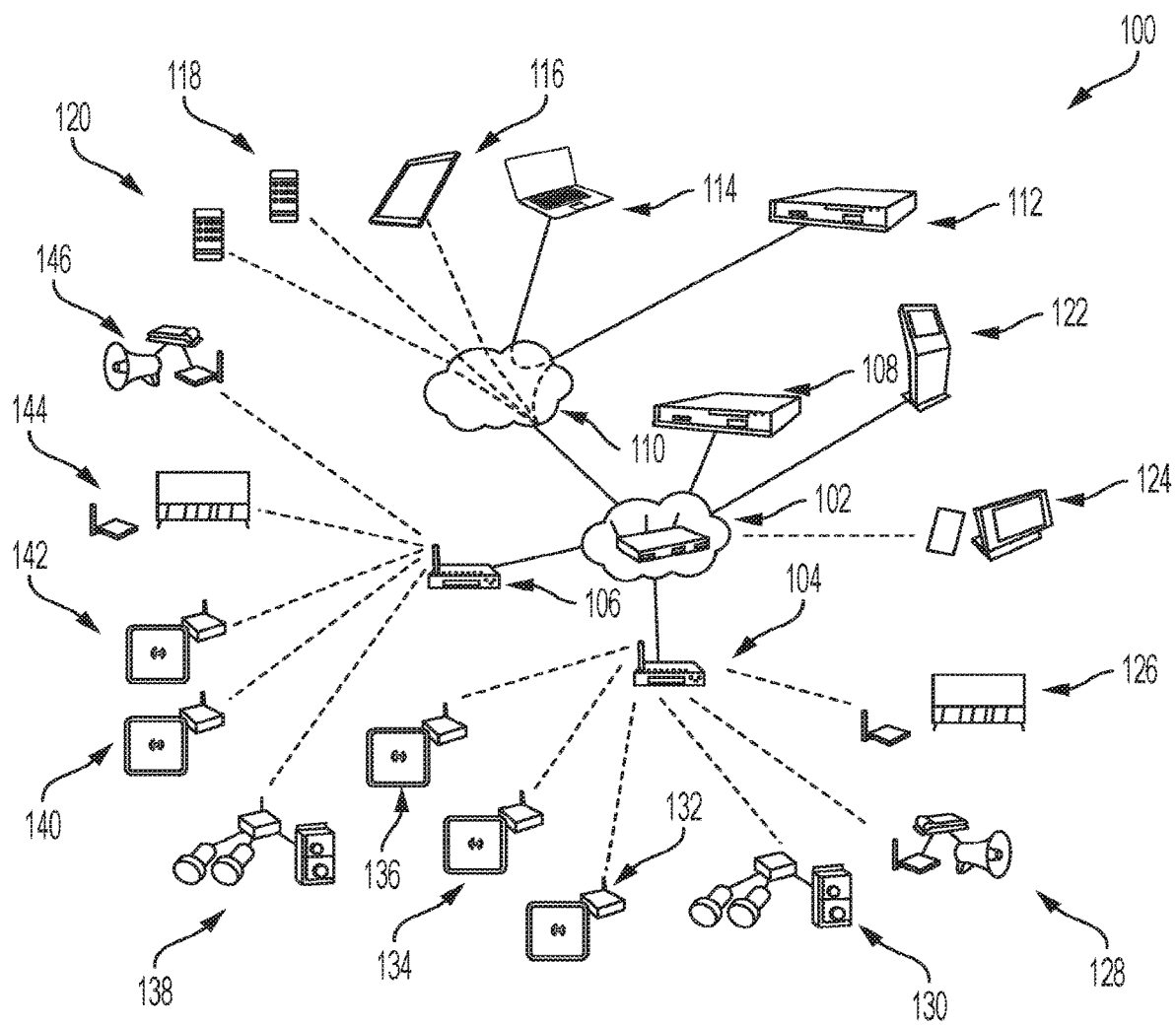
FIG. 1 illustrates a diagram for a system for tracking users and/or objects at a geographic location and configured to provide data and/or associated features, according to one exemplary embodiment of the invention.

The following description illustrates by way of example, not by way of limitation, the principles of the invention. This description enables one skilled in the art to make and use the invention, and describes embodiments, adaptations, variations, alternatives and uses of the invention, including what is presently believed to be the best mode of carrying out the invention. Drawings are diagrammatic and schematic representations of exemplary embodiments of the invention, not limiting of the present invention nor necessarily drawn to scale.

Although embodiments of the invention may be described and illustrated herein are substantially discussed in terms of an amusement park or waterpark context, it should be understood that all embodiments of this invention are not so limited, but are additionally applicable to any of a variety of possible destinations, locations, or areas that may benefit from the tracking and/or collection of data regarding users and/or objects at those destinations, locations, or areas, such as nightclubs, casinos, zoos, hotels, resorts, schools, conventions, tradeshows, concerts, sports arenas, or other activities (e.g., emergency personnel, transit systems, etc.) where user tracking and/or data collection would be desired. Furthermore, although embodiments may be described and illustrated herein in terms of particular hardware and/or software features, it should be understood that embodiments are also applicable to other hardware than that specifically discussed and software that includes greater, fewer, and/or alternative features, flow, and/or operation from that specifically show by the exemplary figures and associated description.

By way of summary or introduction, it would be desirable for users at a destination, such as an amusement park or waterpark, to be tracked by a system corresponding to or associated with the destination that is configured to determine each user's, or group of multiple users, location and/or various activities performed while at the destination. Beyond mere tracking and collection of data concerning such tracking, the data collected regarding users and/or objects may be used to enhance the user experience at the destination or beyond the destination. For example, as discussed in greater detail herein, particular users may customize their experience at the destination according to their specific taste or likes, receive benefits or rewards for engaging in particular behaviour that is encouraged by the system, and interact socially with other users via the system, etc. The benefits or rewards may be received by the user at the location or may be associated with other locations (e.g., commonly-owned venues, etc.) and/or companies that have negotiated or contracted to be part of the benefit or reward scheme of the system (e.g., a user may obtain a benefit or reward from a restaurant, such as a gift card or credit, as a reward or benefit from the system, even if such restaurant is not at the destination whereby users are tracked and/or is not otherwise associated with the system).

In certain embodiments, with or without benefits or rewards, users may be encouraged and/or allowed to engage in competitive (or collaborative) statistical activity. For example, whether across multiple entertainment venues (e.g., multiple waterparks spaced throughout the United States or World) or contained to a single entertainment venue (e.g., a single waterpark location), users may compete and/or see statistics relating to other users, such as see data and/or information about who has ridden the most rides, who has travelled the most vertical feet, who has achieved the fastest speed on a given ride, who has achieved the highest score on a given ride, etc.

Users (e.g., each user at the destination, a group of users, etc.) may wear or otherwise have associated with them hardware that is capable of being tracked as the user or users move throughout the destination. The hardware (e.g., a wristband or other wearable or other device with a tracking module or component) may be provided to a user as the user enters the destination and returned by the user as the user exits the destination. In some embodiments, the user may purchase (e.g., pre-purchase, or be given) the hardware and be permitted to keep all or some of the hardware even upon exiting the destination. Sensors configured to detect and/or track the hardware may have different ranges (e.g., sensors may have a short-range, such as corresponding to a max of a few inches, while other sensors may have a long-range, such as corresponding to roughly 90 ft) and may be placed throughout the destination at locations to sense and track the movement of users and/or objects.

Users may interface with the system (e.g., setup or modify a user profile or preferences, make purchases or modify reservations using the system, etc.) through a software application that runs on a mobile device, such as a smart phone and/or via software that runs upon one or more components of the tracking device, and/or by interfacing with kiosks or other hardware that is fixed or positioned at particular locations throughout the destination. For example, if a user does not have a mobile device or does not wish to carry the mobile device with them during their visit at the destination, the user may be sensed or detected by a kiosk upon getting within a particular proximity to the kiosk, or some component of the kiosk, and interact with their account and/or the settings corresponding to their tracked hardware via the kiosk. In certain embodiments, users may not wish to create a user account, but still may be able to interface with the system via the kiosk (e.g., the kiosk software may operate based upon a scanning of a tracked hardware such as a wristband and may not require the user to create a user account or profile in order to perform certain functions).

For example, in one embodiment, a user may visit a destination, receive trackable hardware (such as in a wristband), without ever downloading any additional software for a mobile device and/or signing up for an account. Such a user may receive a temporary or guest ID that is associated with the trackable hardware and stored in a local database, memory, or server of the destination. To the extent the user later creates an account, some or all of the data that is stored in the local database, memory, or server may subsequently be transferred to a global database, memory, or server (e.g., a server that is accessible by hardware outside of the destination, such as remotely over the Internet) as associated with the user account. If a user has already created an account, rather than receiving only a temporary or guest ID, account data for that user's account that exists in a global database, memory, or server containing user account information may be transferred to the local database, memory, or server and associated with the trackable hardware for the time that the user is at the destination associated with the local database, memory, or server. In this fashion, whether a user has an account or not, kiosks may be used by a user to do all or a subset of the features or functions, such as customizing music, themes etc., as discussed in greater detail below.

In certain embodiments, some features, such as storage of data relating to currency, available points, rewards, badges, etc. may not be available to the user after the user exits the destination unless the user has previously setup a user account or opts to setup a user account within some predetermined time upon exiting the destination. Other data (e.g., demographic data, tracked data, analytics etc. that are not related to user-customizations) may be saved on a global server or cloud regardless of whether a user has created or has not created a user account.

FIG. 1 shows a diagram 100 for a system for tracking users and/or objects at a geographic location or other destination and configured to provide data and/or associated features. The system may include a local network 102 that is connected with a public network 110, such as the Internet. One or more users or guests with devices (e.g., mobile devices such as smart phones) running a corresponding software application (118, 120) and/or one or more operators of the system with devices running a corresponding software application (116, 114) may access, the system using the public network 110. The software applications (118, 120, 114, 116) may be configured to be executed by a processor of a device and/or may be web-based software that allows interaction by a user through a web browser or other software. Certain aspects of the system, such as user profile or other data that has been synched or exported from or may be imported to the local network 102, for example to aid in operation by reducing latency or otherwise improving efficiency of transferring and/or accessing data.

A master server 112 may run the global functions of the system, for example, housing the master statistical database and/or analytics for the tracking or user data collected. A local server and/or controller 108 may run the local functions associated with data that is associated with the local network 102. Having a separate master server from a local server may be beneficial, for example, so that the local server and local network only need to contain and/or operate on data for individuals or systems that are at the destination and/or data that is needed for operation of the destination. Once an individual leaves the destination, data associated with that individual may be transferred to the master server and out of the local server since local operation using such data is no longer necessary. On or more processors may be connected with and/or associated with any of the master server 112 and/or the local server and/or controller 108 for aiding in the storing, moving, transfer, and/or analysis of data in the master server 112 and/or the local server and/or controller 108 and/or for executing software code for performing any of the features and/or operation described throughout this application.

Although a single server is illustrated coupled to the public network and a single server is illustrated coupled to the local network, any number and/or combination of servers may be used. For example, the system may be entirely locally or entirely globally and/or run such that there is only one or the other of the master server 112 or local server 108. The system may communicate directly with the respective server through the respective network. In addition, although a single server may be provided, the system may be distributed over any combination of local and remote servers. Therefore, although a single master server 112 is illustrated, the system may use a plurality of servers or other computing devices.

Figure 2:
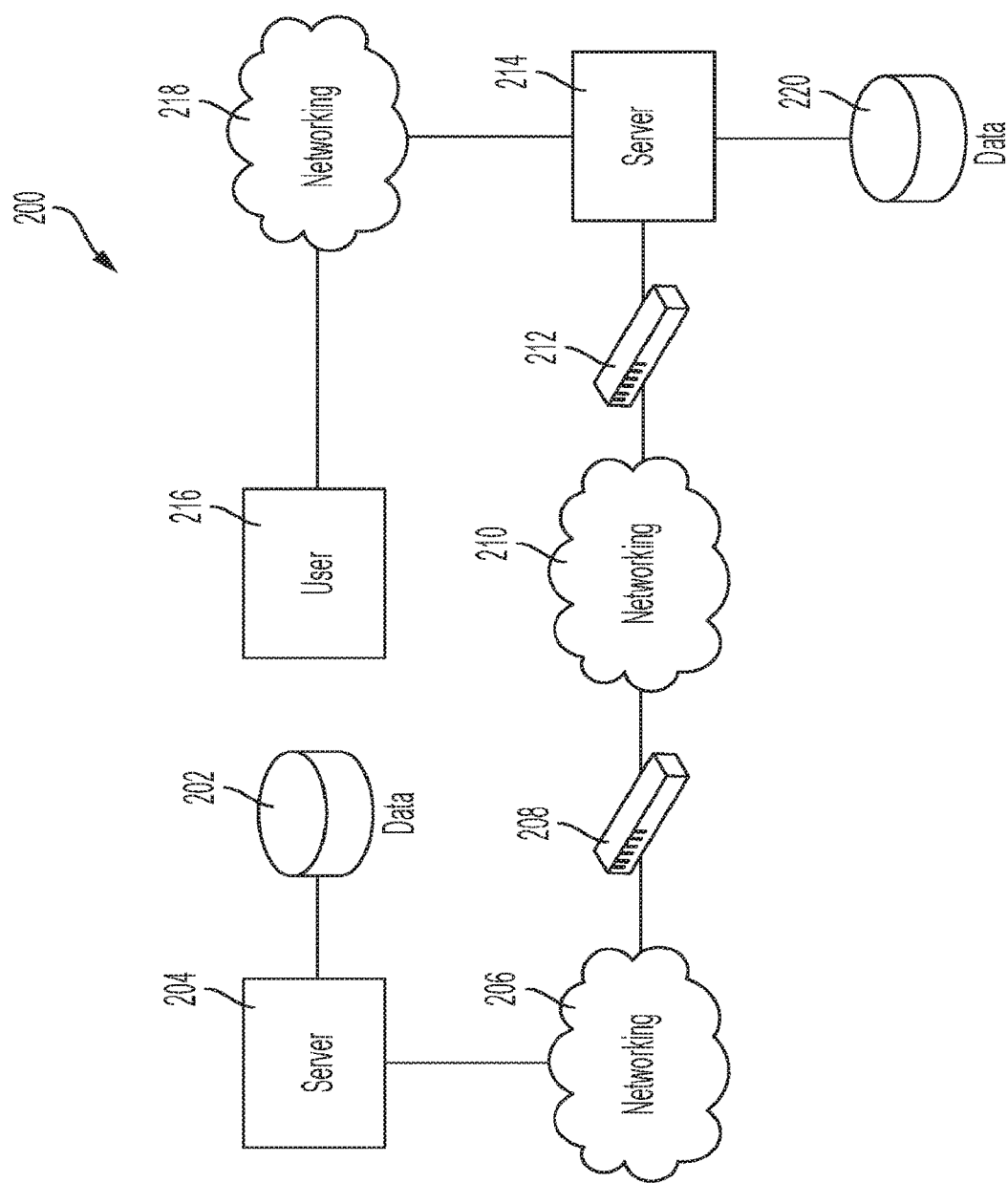
FIG. 2 illustrates a diagram for a system for tracking users and/or objects utilizing a local network interfacing with a non-local network, according to one exemplary embodiment of the invention.

For example, FIG. 2 shows a diagram 200 for a system employing both local and master or global networks interfacing with one another. The system and/or local or master networks of FIG. 2 may include features that are the same as or similar to those discussed throughout this application. Local data 202 is stored as part of a local (e.g., on-site) server 204 that connects via a local area network 206, firewalls (208, 212), and a virtual private network ("VPN") 210 to a master or global server 214 that stores master or global data 220. Users or operators 216 of the system may interface with the master or global server 214 via a public network 218, such as the Internet. As previously discussed, certain portions of the master data 220 on the master server 214 may be copied and/or moved to the local server 204 and stored as local data 202 depending, for example, on whether a particular user is going to be at the local destination associated with the local server 204.

With reference again to FIG. 1, the local server 108 associated with the particular destination (e.g., a waterpark or amusement park) may be configured to handle receipt and/or manipulation of data concerning individuals that are present at the particular destination. The local server 108 may include processes that are distinguished into three groups (for example, as exemplary shown in FIG. 3), which may, in some embodiments, be performed on different sub-servers if desired.

Figure 3:
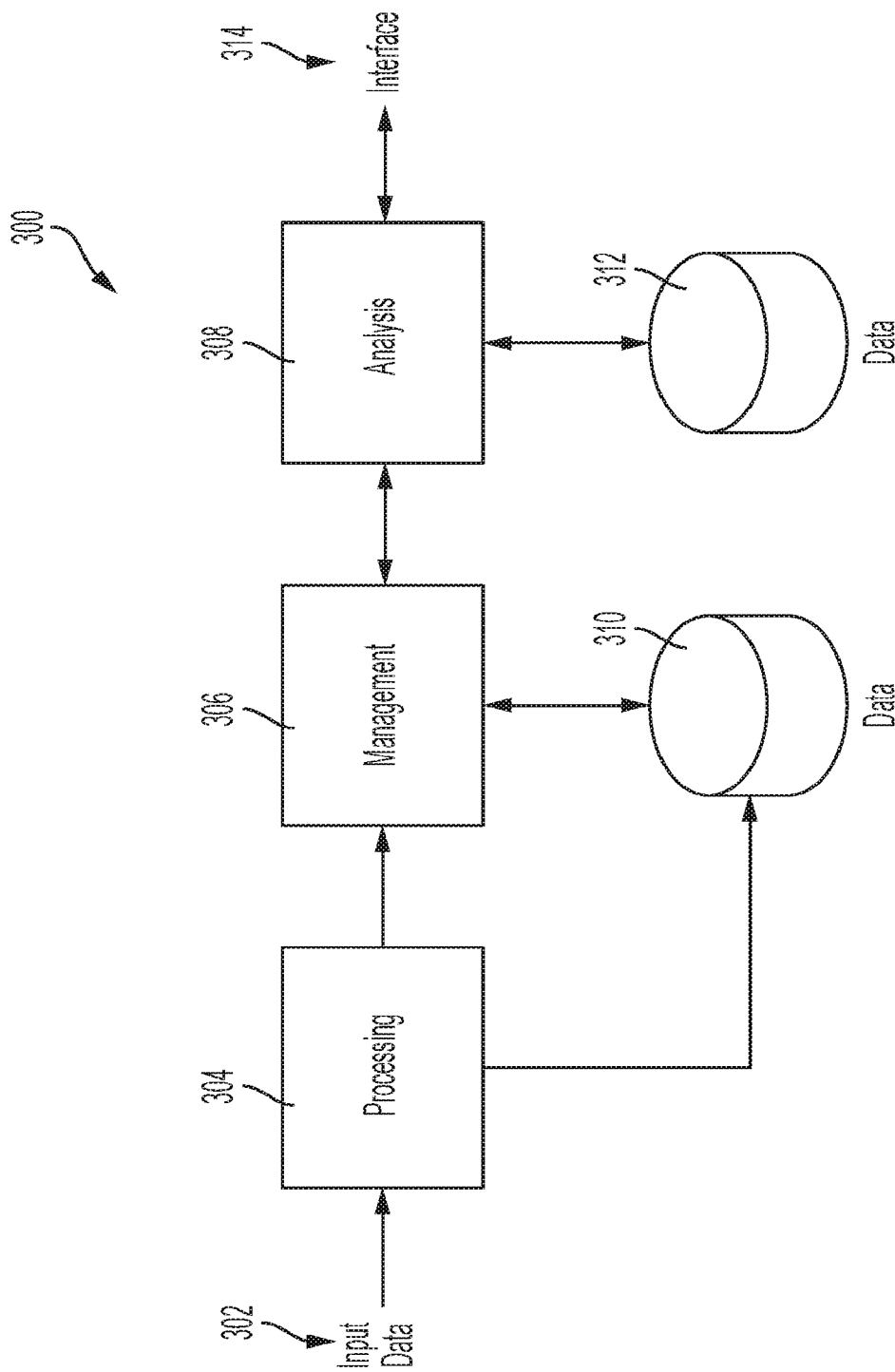
FIG. 3 illustrates a diagram for a system for tracking users and/or objects utilizing a plurality of processing servers, according to one exemplary embodiment of the invention.

As shown in an exemplary diagram 300 of FIG. 3, input data 302 (e.g., data received when a user is scanned, sensed, or tracked by either a sensor, such as a short-range and/or long-range sensor) is shown and may be received by a process 304 (e.g., executed by one or more processors) concerning real-time incoming data processing, for example, to determine accuracy of the input data 302. A variety of processes may be employed to help determine such accuracy. For example, in an embodiment where the tracking hardware associated with a user (e.g., a wristband) is configured to send a transmission and/or where such transmission may be sensed by multiple sensors or receivers of the system at the same or similar time (e.g., sensors positioned at different locations, but still capable of picking up a transmission of a user at a particular position), location resolution error control may be employed.

For example, an embodiment may utilize a sequence number associated with each transmission sent by the tracking hardware that increments (e.g., upon each transmission). The process 304 may compare sequence numbers from the input data 302 obtained from the different receivers to determine whether any errors are present. For example, such errors may be detected by determining whether the transmitter was sensed twice by different receivers at the same time (e.g., they share the same sequence number) versus determining whether the transmitter was sensed once by a first receiver and then sensed again later in time (e.g., the sequence numbers differ from each other). Sequence numbers may be generated in any fashion and may include synchronized time stamps.

In another example, the process 304 may perform debouncing to reduce errors from spurious detection of a transmission (e.g., due to radio frequency bouncing due to structural components at the destination, such as steel beams, etc. that the transmissions encounter). In another example, the process 304 may perform error resolution based on logical transitions. For example, if a transmitter had a prior trusted location (e.g., a location that had already been deemed accurate, either through some form of error control and/or because no contrary location information had been detected for a user at a particular location) and was subsequently sensed as transitioning to or located at a second location that is not logical from that trusted location (e.g., a distance too far away and/or where no travel path from the first trusted location to the subsequent location exists, etc.), the second location may automatically be flagged or otherwise indicated as untrusted or less trusted than the prior trusted location.

In still another example, the process 304 may perform location resolution error control by attempting to resolve phantom locations to improve accuracy. For example, if the system has not heard or sensed from a tracked hardware for a predetermined period of time, the process 304 may perform additional analysis to determine whether the lack of sensing the hardware indicates an error or whether such behaviour is expected (e.g., if a user entered a location where users tend to loiter or remain for the period of time, no error may be ascribed to the lack of any subsequent data within that period of time).

In still another example, the process 304 may perform location resolution error control by use of directional scanners or readers that are configured to sense the trackable hardware in a particular direction or in a more narrow field of vision (e.g., as opposed to a more broad, such as 360-degree radius, around the scanner or reader). Such directional scanners or readers may be beneficial in a waterpark or amusement park context, for example, if the waterpark or amusement park has two attraction entrances in relative proximity to one another and directional readers narrowly focused at each entrance may improve accuracy in determining which entrance a user entered).

Upon processing, the input data 302 is moved to a database or other memory 310, for example containing real-time data (e.g., data concerning where the trackable hardware currently is positioned, what user or guestID is currently associated with the hardware, etc.) whereby database management or other processing 306 (e.g., executed by one or more processors) may occur. This may include updating of data to help ensure accuracy. An analysis process 308 (e.g., executed by one or more processors) may operate (e.g., real-time) on tracking or other data 312 (e.g., data concerning transitions of trackable hardware from one location to another). The analysis process 308 may determine any of a number of possible statistics or operations, including crowd levels, whether maintenance is needed, whether equipment is operating within acceptable parameters, etc. Access to the analysis process 308 and/or any of the other operations or data shown and/or described for FIG. 3 may be provided via an interface 314 (e.g., allowing a system administrator or other user to view and/or otherwise influence or interact with the data and/or operations of the system as desired).

With reference again to FIG. 1, the local network 102 and/or the local server 108 may be connected with a one or more nodes (104, 106), for example, via Ethernet, wireless networks, powerline adapters, MoCA adapters, or other routing paths. The one or more nodes (104, 106) may function as a communications bridge between the local server 108 and other destination functions and/or hardware. A variety of local destination functions and/or hardware may be connected with these nodes in various embodiments. For example, as specifically shown in FIG. 1, local destination functions and/or hardware may be connected (e.g., via wireless or wired communication) with one or both of the one or more nodes (104, 106) and include displays (126, 144) (e.g., for showing ride status) such as monitors for displaying wait time and/or point values of rides or other advertising or rider-specific or general information, audio units (128, 146) such as speakers for playing re-recorded music or sound files, scanners, sensors, or receivers (132, 134, 136, 140, 142) such as units found at entry or exit of queue lines or attractions or other locations where user position or other statistics may be collected, and/or indicators or confirmation controls (130, 138) such as lights, buttons, etc. that may control operation or indication of when a user may enter an attraction. A point-of-sale station 124 may also be configured to interface via the local network 102 and/or the local server 108, for example, to register users with wristbands or tracking hardware and/or perform other currency-based functions. Some examples of currency-based functions may include purchase and/or rental of wristbands or tracking hardware, payment for access to a location (e.g., amusement part or waterpark) or for access to a particular attraction, or any other form of payment for and/or receipt of credits, rebates, coupons, or other manners of payment or reimbursement associated with a location, venue, device, etc. A kiosk 122 may allow users to interface with the system, as discussed in greater detail herein.

Figure 4:
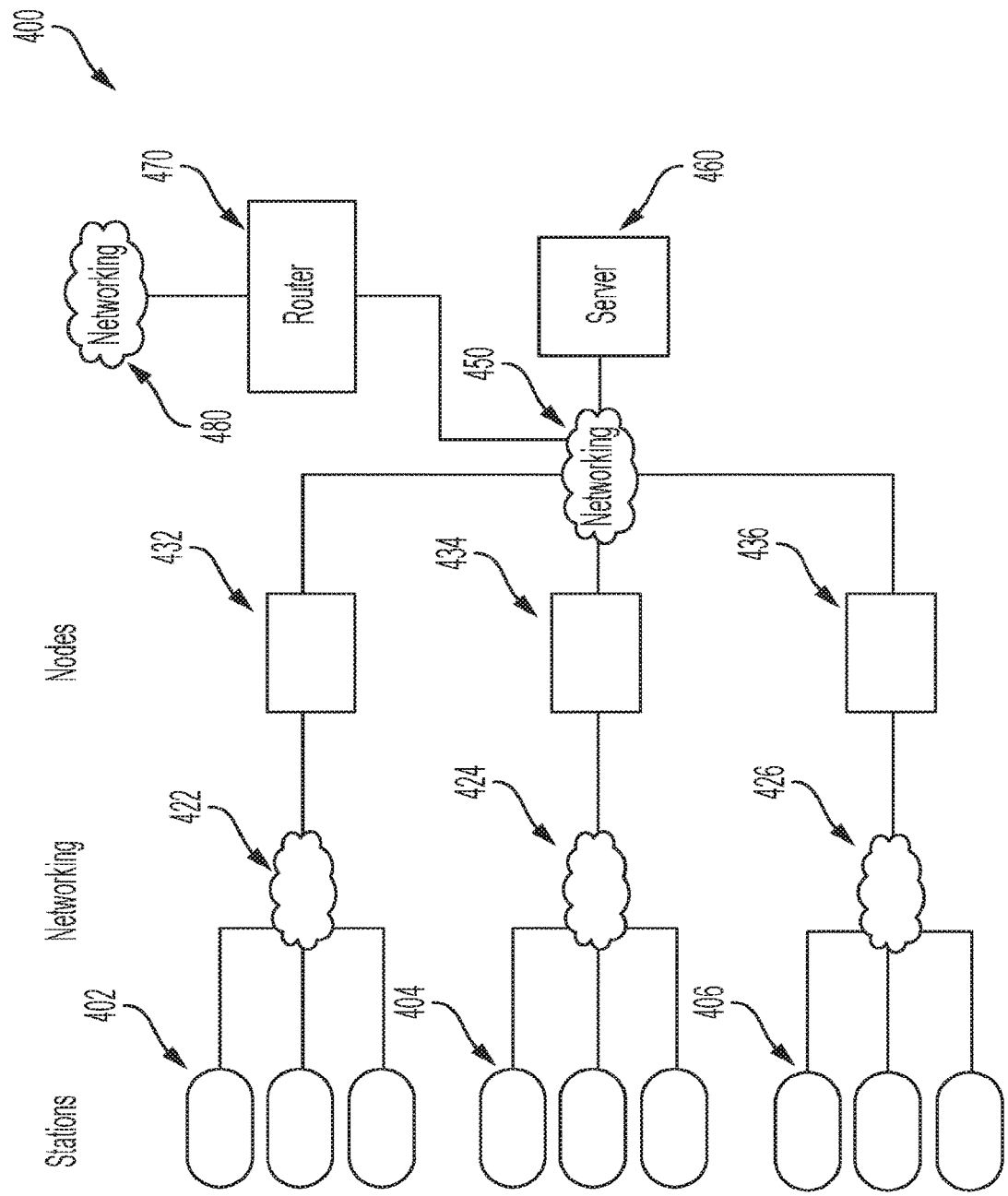
FIG. 4 illustrates a diagram for a system for tracking users and/or objects utilizing sensing stations and nodes for such tracking, according to one exemplary embodiment of the invention.

In one embodiment, shown by FIG. 4, a diagram 400 for a system for tracking users and/or objects utilizing a plurality of sensing stations (402, 404, 406) (e.g., receivers for sensing or tracking some trackable hardware) may communicate using Personal Area Network ("PAN") IDs (422, 424, 426) to communicate with a plurality of Nodes (432, 434, 436) as shown. In one embodiment, only one sensing station, PANID, and/or Node may be used. Each of the plurality of Nodes (432, 434, 436) may be connected, networked, or otherwise in communication 450 (e.g., a public network or a private network) with one or more servers 460. The plurality of Nodes (432, 434, 436) may also be in communication via a router 470 with a Wide Area Network 480. Such a configuration may allow for geographic locations or destinations having varying sizes to be accommodated by including as many sensing stations, PANs, and/or Nodes as part of the system in order to accommodate the size of the particular geographic location or destination. For example, a larger waterpark or amusement park may benefit from a greater number of sensing stations, PANs, and/or Nodes when compared to a smaller venue, such as a nightclub for the tracking of guest locations and/or statistics or data.

Figure 5:
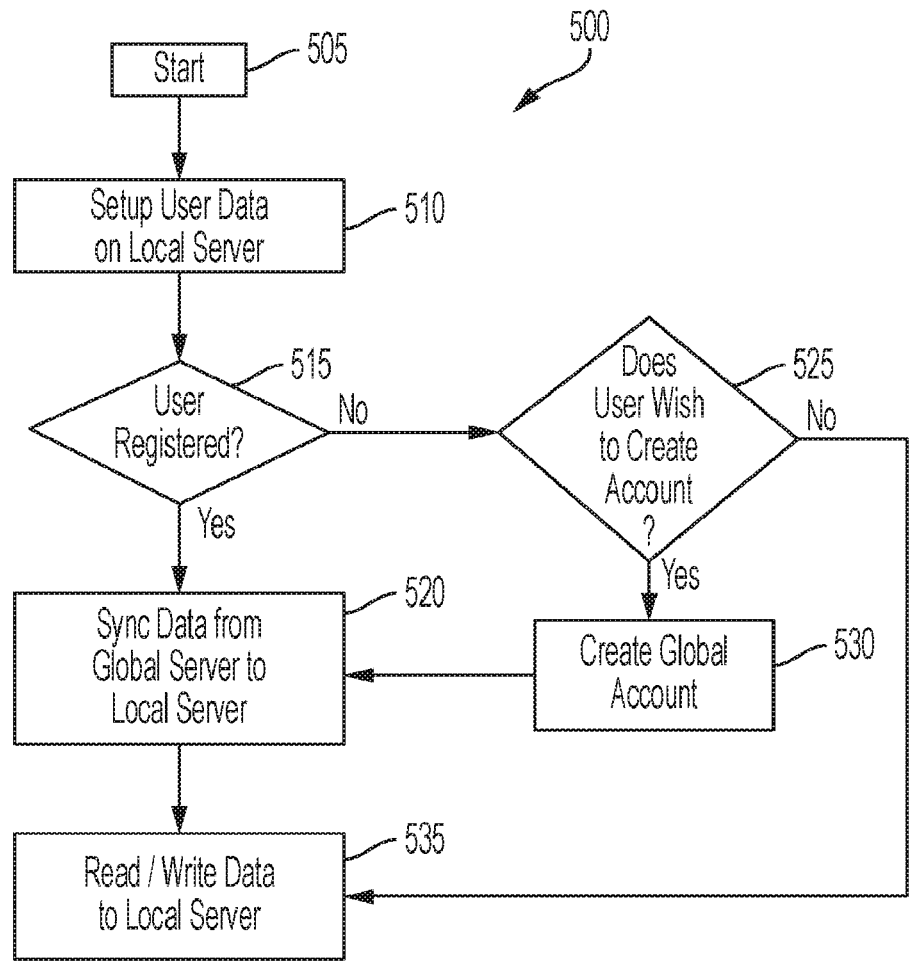
FIG. 5 illustrates a flowchart for management of data between global and local servers when a user enters a location having a system configured to track user and/or object data, according to one exemplary embodiment of the invention.

FIG. 5 shows a flowchart 500 for management of user or other data between one or more global and local server(s). Such data may be configured to be copied and/or moved between servers, for example, when a user enters a particular location or area, such as a location or area that is configured to track user and/or object data. In one example, user or other data (e.g., preferences, characteristics, statistics, prior locations, other historical information obtained by, from, or about the user) may be stored in a global server, but when the user enters a particular location (e.g., an entrance of an amusement or waterpark), all or some of the user or other data may be configured to move or copy to a different (e.g., a local) server. The different server may be configured to substantially contain and/or operate on data corresponding to users that are within a particular location. In such a system, the different server may more efficiently operate with such data since the data in the different server is a subset of the total amount of data and/or is setup with higher speed equipment or connections. Such efficiency and/or speed may be more desirable and/or important for data corresponding to user's at the location (e.g., accuracy of location data or operations upon such data may be more time critical since the user is actively engaged and/or located at the location) when compared to other global data, which may correspond to users that merely visited the location at some historical date, but are not actively being monitored or tracked at the given time. The system and/or server(s) may include features that are the same as or similar to those discussed throughout this application.

As previously discussed, it may be desired to allow a user to participate or engage with one or more features of the system whether or not that user has previously established a user account and/or ever establishes a user account. The flowchart 500 begins at step 505, for example, when a user enters a particular location (e.g., such as an entrance or other designated area of an amusement or water park), receives and/or has tracking hardware activated (e.g., a wristband with tracking capabilities), or otherwise has or will subsequently enter an area that will track the user and/or allow for the user to engage with features of the system.

At step 510, user data corresponding to the tracking hardware is setup on a local server (e.g., a server that is local to the particular location or destination, such as a waterpark). The user data may include a temporary ID number or other form of identification and/or may include additional data such as age, gender, height, or other characteristic, preference, or other information corresponding to the user. The local server may be a server that is not available to the general public, (e.g., not available via a public network, such as the Internet), and/or is configured to deal with a subset of the information or data of a master or global server and/or is setup to have increased communication speeds and/or data operation speed, for example, as discussed above. In one embodiment, the local server may only store and/or manipulate data for a certain time period (e.g., 24 hours) and/or only for those users that have entered or will enter a particular location or destination within that time period. After such timeframe, the local server may copy or move some or all of the user data stored in the local server to the master or global server and again only store and/or manipulate data at the local server level for users present at the particular location or destination during the next subsequent time period. In certain embodiments, this may allow the local server to operate quicker and/or more efficiently since it is only storing and/or manipulating a subset of data and/or for a subset of users that might otherwise exist in the master or global server, rather than concerning a potentially voluminous amount of data, most of which is not necessary to be used by the system during the timeframe or location of concern.

At step 515, the system checks to see whether the particular user has previously created or registered an account with the system. This account may be present upon the global (e.g., master) server. If so, operation moves to step 520 where all or some of the data that is associated with the user account is downloaded to, moved to, copied to, transferred to, or otherwise synced between the global server and the local server. Thus, at step 535, subsequent changes to or interactions or manipulations or operations with such user data can be performed at the local server level. At some subsequent time, all of some of the data now at the local server level may be downloaded, moved, copied, transferred, or otherwise synced between the local server and the global server.

If no account is determined to exist at Step 515, operation moves to step 525 and it is determined whether the user wishes to create or register an account (e.g., by notifying the user that they may create an account via a message, notification, phone call, etc. on an electronic device, such as a smart phone, tablet, kiosk, etc., by having an employee of the destination inform the user that they may create an account, by displaying to the user on a kiosk that they may create an account, etc.). If the user does wish to create an account, operation continues to step 530 where a user account is created on the global server. In another embodiment, the user account may be created on the local server for subsequent transfer to the global server. Once created, operation continues to step 520 where some or all of such data relating to the user account is synced between the master or global server and the local server, as previously discussed. If the user does not wish to create an account, operation continues to step 535 where the system continues its operation and provision of features by reading/writing data to the local server (e.g., storing tracking info to the local server, providing other features or functionality as discussed elsewhere in this application by storing or manipulating data of the local server, etc.). In certain embodiments, the master or global server may provide regular (e.g., timed or scheduled) and/or pushed data from the master or global server to the local server at times subsequent to the user initially entering the destination (e.g., to accommodate a user who does not create an account upon entering the destination, but participates within the destination for a period of time and creates an account at some subsequent time while still within the destination).

Figure 6:
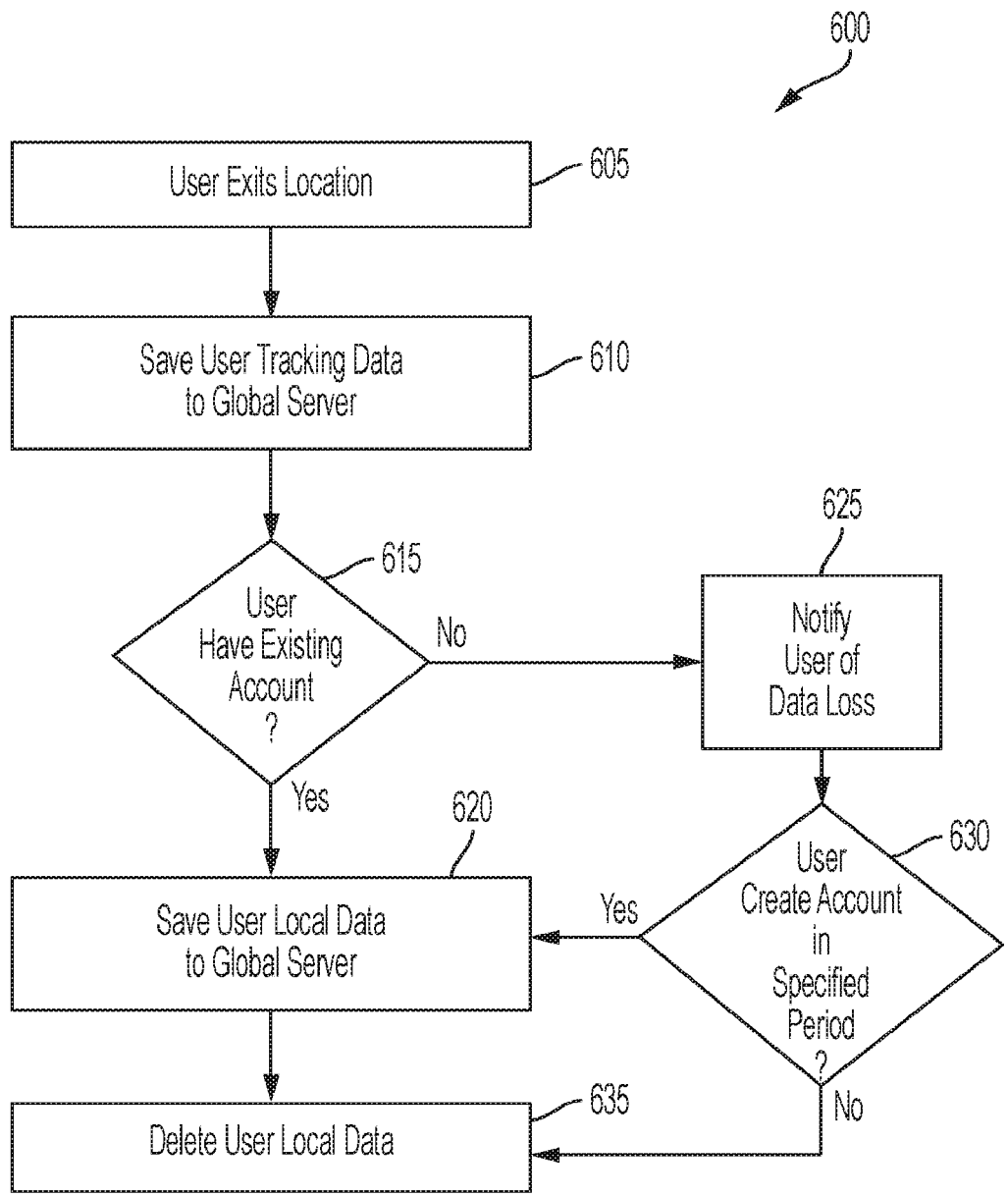
FIG. 6 illustrates a flowchart for management of data between global and local servers when a user exits a location having a system configured to track user and/or object data, according to one exemplary embodiment of the invention.

FIG. 6 shows a flowchart 600 for management of data between global and local servers when a user exits a location having a system configured to track user and/or object data. The system and/or servers may include features that are the same as or similar to those discussed throughout this application. At step 605, the user is detected as having exited the location or from a particular area within the location (e.g., the user has exited from an amusement park or waterpark and/or has moved from or through a designated area of a given location). At step 610, tracking data associated with that user (e.g., data concerning where and/or when the user visited particular positions with the location, what activities the user participated in and when, etc.) is downloaded, moved, copied, transferred, or otherwise synced between the local server and the global (e.g., master) server. This information may be downloaded, moved, copied, transferred, or otherwise synced without the user having ever created a user account. For example, tracking data may be user-agnostic but still be desired for storage as it may provide information about crowds or individuals in general, without requiring such data be specifically tied to a particular user whose account has been established. Certain features of the system may require a user account to be created, however, before data associated with those features is stored at the master or global server (e.g., features that involve use of or are based on a user's particular characteristics and/or preferences, features that involve use of or are based on purchases or other currency or rewards that are associated with the user).

For example, as discussed elsewhere in this application, a particular user may have made purchases, have a stored form of currency (e.g., points), accumulated badges, accumulated awards, obtained fast passes or other coupons, etc. Certain of such items may be configured to be available or accessed by the user after the user's time spent at the destination. In such a case, since such information is user-specific and may be persistent in nature (e.g., available to that user beyond the day spent at the waterpark or other particular location), the user may be required to setup a user account such that data associated with such items can be properly stored and accessed by or for such user at the global server. At step 615, it is determined whether the user has an existing user account. If so, operation continues to step 620 where all or some of the user's local data is downloaded, moved, copied, transferred, or otherwise synced between the local server and the global server. Operation then continues to step 635 where the local server data may be deleted, for example, after a particular time or after a particular amount of time has elapsed (e.g., end-of-day, end-of-week, overnight, etc.).

If instead it is determined at step 615 that the user does not have an account, operation continues to step 625 where the user is notified of upcoming data loss due to the user not having established an account. For example, the user may receive a message or other communication or notification stating that their data will be deleted at a specified time or within a specified time period unless the user takes action to establish a user account. At step 630 it is determined whether the user has created a user account within the time period. If so, operation continues to step 620 and the local data for the user is synced for the user account between the local server and the global server. If no user account is created in accordance with the time or time period specified, operation continues to step 635 and the user data on the local server may be deleted. In such a case, the user may lose the use of any accumulated items or benefits that had been accrued during the user's time at the destination since such items or benefits could not be associated with a user account before the data was deleted from the local server.

In certain embodiments, other data corresponding to the user (e.g., specifically tied to that particular user and/or more generic in nature such that not tied to any particular user) may be obtained and/or stored even should a user choose not to create a user account. Such data may be collected and used for statistical purposes (e.g., what areas of the park are most crowded, what attractions are most popular, what retail items and/or food are most or least popular, demographic information, etc. Thus, this information may be mined or used for improving park operation, shared with other third party vendors, or otherwise.

Figure 7:
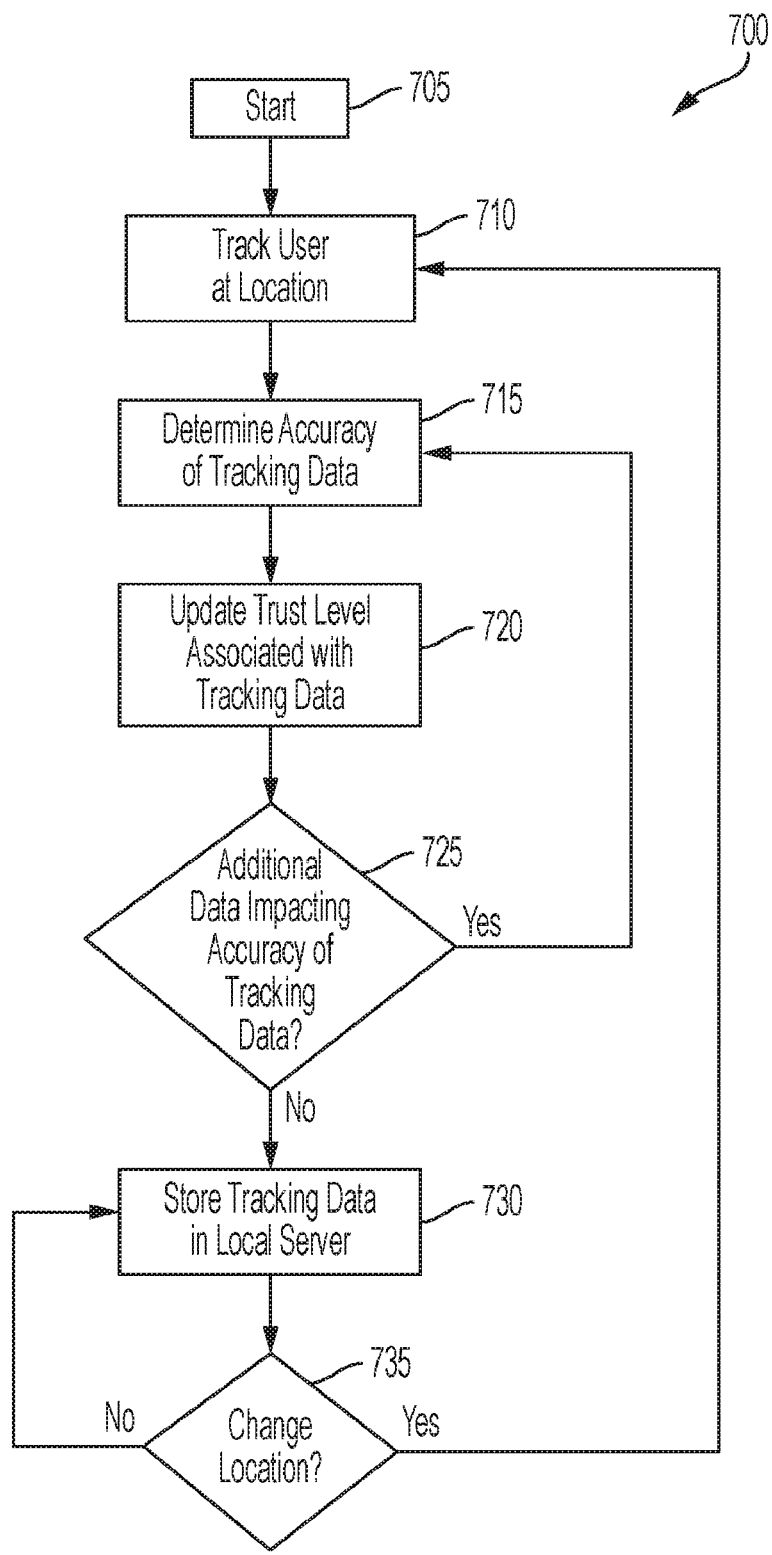
FIG. 7 illustrates a flowchart for storing user data for a system configured to track user and/or object data, according to one exemplary embodiment of the invention.

FIG. 7 shows a flowchart 700 for storing user data for a system configured to track user and/or object data. The system may include features that are the same as or similar to those discussed throughout this application. At step 705, operation begins, such as when a user is within a particular destination, location, or area that the system is configured to track user and/or object movement and/or activity. At step 710, tracking data for the user is obtained at a particular location within the destination. For example, this tracking data may result from tracking or sensing the user by way of RFID and/or any of a variety of other possible detection methods as discussed throughout this application (e.g., tracking of hardware worn or carried by a user via one or more sensors or receivers, tracking of a user or crowd of users, such as via motion detection, visual recognition, etc.). At step 715, accuracy of the tracking data is determined. For example, in a system that includes a plurality of sensors or receivers disposed at different positions around a destination or location, a particular user and/or object may be tracked or sensed by multiple sensors or receivers for a given time, even though the user and/or object is physically only located at one particular location. Accordingly, any of a variety of possible location error resolution methods may be employed, as discussed in greater detail throughout this application.

At step 720, a trust level is associated with the tracking data, for example, based upon the determination of accuracy of the tracking data from step 715. In one embodiment, this trust level may be a parameter, flag, or other indicator associated with the tracking data that may be updated or modified as the trust level for that tracking data changes. At step 725, it is determined whether additional data in the system impacts the accuracy of the tracking data and its associated trust level. If so, operation continues back to step 715 where the accuracy of the tracking data is re-evaluated and the trust level associated with that tracking data is updated at step 720.

For example, a user may be sensed by a first receiver at a first position. If this is the first tracking data associated with the user and there is no contrary data in the system indicating the first tracking data is of questionable accuracy, the accuracy of the tracking data may not be examined the tracking data may receive a high trust level. However, if the user is also sensed by a second receiver at a second position, but for the same time period (e.g., a transmission or signal is received or otherwise picked up or sensed by both the first receiver and the second receiver with a timestamp or same sequence ID), the accuracy of the tracking data may be questionable. Accordingly, the accuracy of the tracking data may be determined or re-determined due to the conflicting information. In one example, if the strength of the signal received by the second receiver is higher than the signal received by the first receiver, the system may determine that the user is actually closer to the second location associated with the second receiver due to its higher signal strength, at which point the trust level associated with tracking data from the second receiver is updated to be higher than that of the trust level associated with tracking data from the first receiver. Additional and/or alternative forms of accuracy determination may be used in alternative embodiments. Such accuracy determinations and trust levels between conflicting sets of tracking data may be performed within a cache, other transitory portion, or database associated with potentially untrustworthy tracking data of the local server.

If there is no additional data impacting accuracy for a particular tracking data at step 725, operation continues to step 730 and the tracking data is stored in the local server (e.g., stored as part of a particular database for data that has been determined to be accurate). For example, once accuracy has been evaluated and/or established, the tracking data may then be moved to a more permanent storage location (e.g., a database or other less transitory portion) of the local server when compared to the cache, other transitory portion, or potentially inaccurate database of data of the local server discussed above. In one embodiment, tracking data that is stored in the more permanent location of the local server may be considered more trusted or accurate when compared to new tracking data being received for the purposes of evaluating the accuracy of such newly received tracking data.

Operation then continues to step 735 where it is determined whether the user's location has changed (e.g., by the user being sensed or tracked at a new location) whereby such tracking data is again established at step 710 and the process begins again. If the user's location has not changed (e.g., there has been no receipt of any new locations sensing the user), then the lack of any movement is stored in the local server at step 730. In another embodiment, if no change in location is determined for the user, the system may not store any new data in the local server concerning tracking of the user until such a new location has been sensed.

Figure 8:
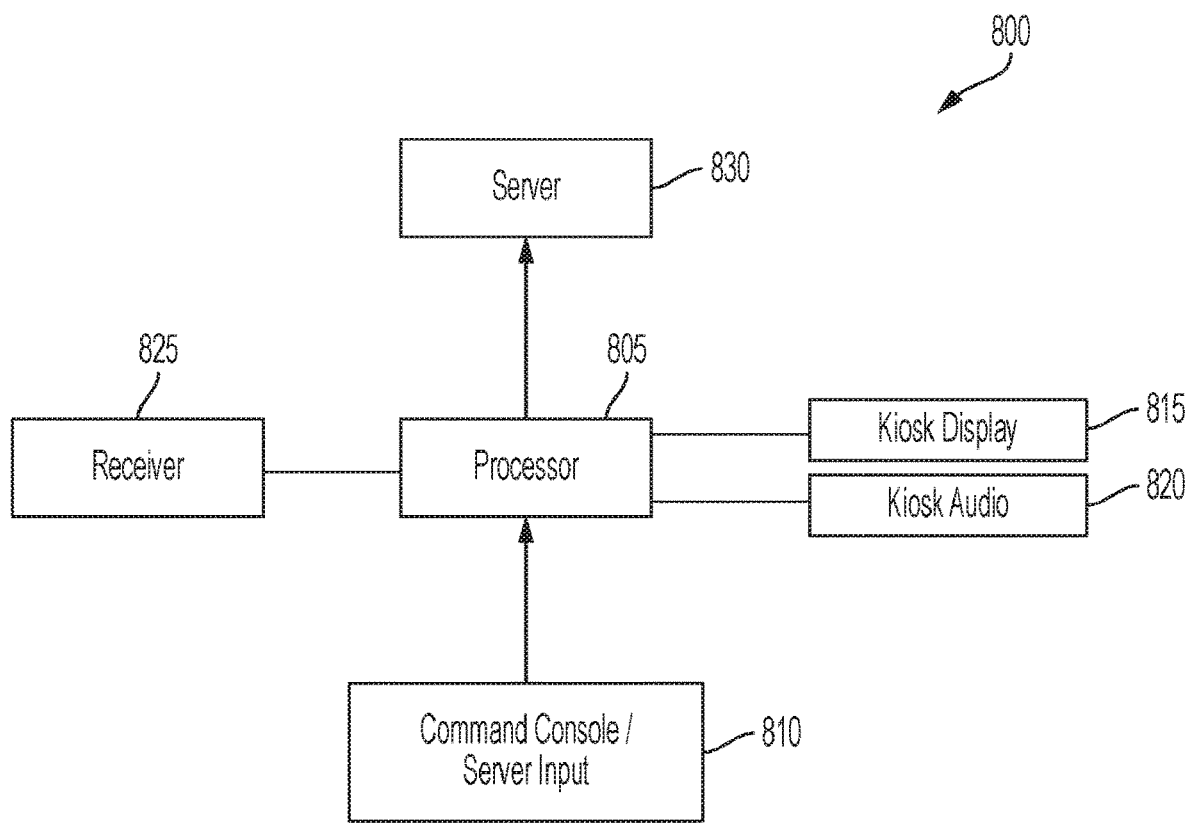
FIG. 8 illustrates an diagram for a kiosk used with a system configured to track user and/or object data, according to one exemplary embodiment of the invention.

FIG. 8 shows a diagram 800 for a kiosk used with a system configured to track user and/or object data. The system and/or kiosk may include features that are the same as or similar to those discussed throughout this application. As previously discussed, certain features of the system may be configured to allow users to view and/or manipulate info without having setup a user account and/or without using a personal electronic device, such as a smart phone. Kiosks or other permanent or semi-permanent hardware stands may be disposed around a destination to allow users to engage with features of the system, whether their associated tracking hardware (e.g., wristbands) have been linked to a user account or not. A user may position themselves or some trackable hardware associated with the user within a proximity (e.g., short-range, such as within a few inches) of a receiver 825 of the kiosk that senses the trackable hardware and starts software instructions using a processor 805. The processor 805 may be connected with memory (or memory may be embedded or on-chip with the processor 805) in one embodiment for executing software instructions, such as software features discussed throughout this application.

The processor 800 may have a command console or server input 810 that allows for an operator of the destination to send explicit instructions to the processor 800 of the kiosk (e.g., update firmware, update software, request status, etc.). The kiosk may also be connected (e.g., via wireless and/or through wired connections) with a server 830, such as a local server associated with the destination and/or a master or global server as discussed throughout. This connection with the server 830 may allow for syncing of data, lookup of data, and/or other communication of data between the server and kiosk, for example, when a user enters a proximity of the kiosk to be sensed by the kiosk and begin use, the data on the local and/or master or global servers is available for display and/or interaction by the kiosk.

The processor 805 may also be in communication with a display 815 (e.g., a touchscreen display) associated with the kiosk, for example, in order to display information and/or receive input or data and/or provide capability for operation, manipulation, or other features by a user interacting with the kiosk. The processor 805 may be in communication with an audio device 820 (e.g., one or more speakers) that may play music, sound effects, and/or other audible responses and/or tones, for example in response to user input (e.g., by way of the touchscreen) and/or while displaying info or features to the user.

Figure 9:
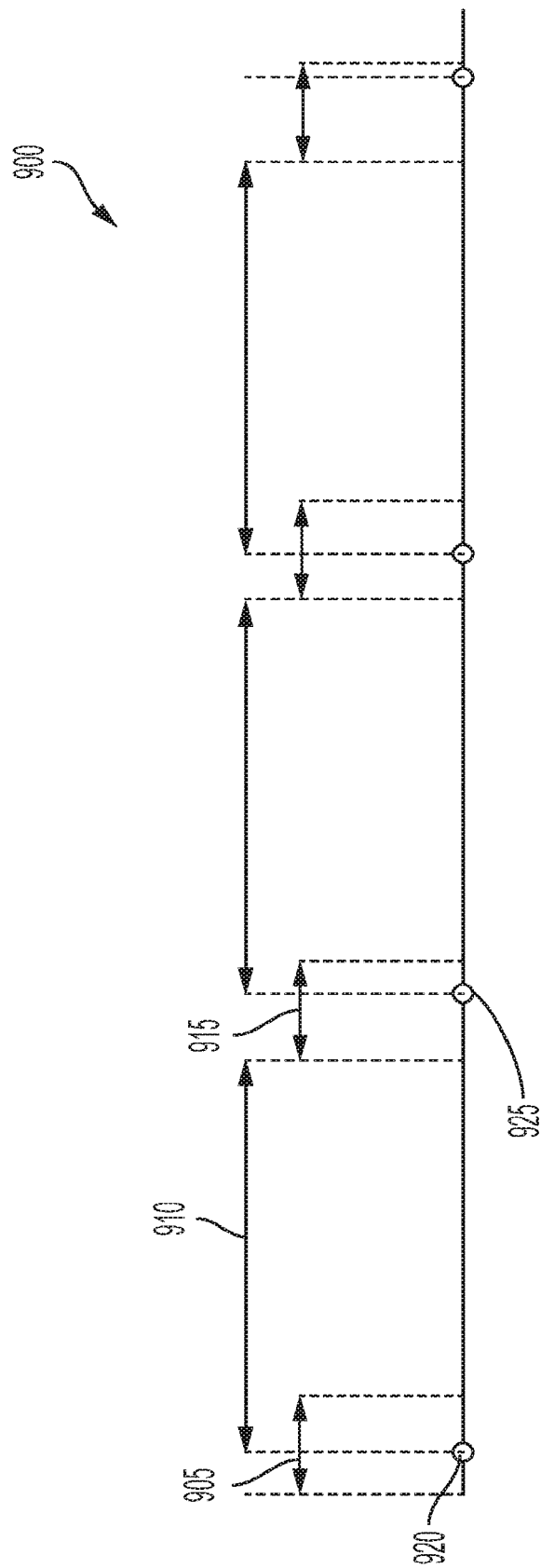
FIG. 9 illustrates a timing diagram for improving functionality of a system configured to track multiple users and/or objects, according to one exemplary embodiment of the invention.

FIG. 9 shows a timing diagram 900 for improving functionality of a system for tracking multiple users and/or objects. As previously discussed, due to the transmission signals from multiple transmitters (e.g., wristbands) that may be in close proximity to one another at a given time, there may be possible interference between transmissions that can cause errors in accuracy and/or in properly detecting and/or differentiating the transmissions. In order to help prevent such transmission interference, jitter may be introduced during the transmission process. For example, if a transmission is programmed to occur at time X, jitter window 905 allows such transmission to actually occur before or after some predetermined timeframe Y, thereby "jittering" or staggering (e.g., in effect helping to alter and/or randomize) the actual transmission time 920 from time X to time X+/−Y. After transmission, a predetermined time 910 elapses and the transmission time (+/−jitter window 915) occurs again, resulting in a second actual transition 925. The predetermined time between transmissions may be measured from time X (i.e., when the transmission was programmed to occur without jitter). Alternatively, the transmission interference can be further reduced by instead starting the predetermined time 910 from when the transmission actually occurred (i.e., X+/−Y) due to the jitter window. Thus, additional differentiation and/or randomization in transmission timing may be introduced into the system, which may be beneficial in reducing transmission interference.

FIG. 10A shows a perspective view 1000 of a plurality of wristbands (1005, 1010, 1015) that are configured to be sensed or tracked by a system. One or more of the plurality of wristbands (1005, 1010, 1015) and/or the system may include features as discussed or shown throughout this application. For example, trackable hardware (e.g., one or more of the plurality of wristbands (1005, 1010, 1015) may be associated with a user (e.g., worn by a user) so that the user's movement and/or activities can be sensed/tracked as the user participates in activities at a particular destination. One or more of the plurality of wristbands (1005, 1010, 1015) may be configured to fasten around or otherwise engage with a body part (e.g., a wrist) of a user, for example via receipt of one or more protrusions 1020 connected with or formed integrally on a first band 1023 into a corresponding one or more openings 1022 associated with a second band 1021. The one or more protrusions 1020 and/or the one or more openings 1022 may be any of a variety of possible sizes, shapes, or configurations/orientations, for example as shown in the embodiments shown in FIG. 10A. Alternative embodiments may use alternative sizes, shapes, or configurations/orientations or alternative fastening or engagement means (e.g., hook/pin, adhesive, belt/loop, button, clasp, or other fastener). Although each of the plurality of wristbands (1005, 1010, 1015) shown in FIG. 10A are intended to allow a user to easily remove the wristband after applying it around the user's wrist, in an alternative embodiment, the wristband may be configured to permanently fasten around a user's wrist such that it is not easily removable without destroying all or a portion of the wristband (e.g., must be ripped, torn, or cut off of the user when the user is finished using the wristband) and cannot be easily worn by the user, or another user, after such removal. In other words, the wristband may be destructively removed.

Although the plurality of wristbands (1005, 1010, 1015) are shown in FIG. 10A as possible embodiments, alternative embodiments may include devices that are configured to be sensed or tracked by a system, but are associated with a user other than fastening or engaging around a wrist of the user (e.g., ankle bands, necklaces, lanyards, cards, stickers, or any of a variety of other possibilities). For example, in one embodiment, a device configured to be sensed or tracked by a system may be configured to engage with a shoelace of a user. The plurality of wristbands (1005, 1010, 1015) may be manufactured of a variety of possible materials. In certain embodiments, a material that is water resistant and/or waterproof may be desirable, such as plastic, rubber, wax or other water-resistant coating, etc., for example to be used in locations where water is prevalent (e.g., waterparks).

FIG. 10B shows an exploded view 1050 of component parts making up the plurality of wristbands (1005, 1010, 1015) of FIG. 10A. The first wristband 1005 includes a portion or base 1060 (e.g., a center portion) having a particular shape (e.g., hexagon) that is configured to accept a capsule or module 1061 (e.g., a sensing/communicating component or components for tracking purposes). The module 1061 has a top component 1062 and a bottom component 1064 that, when coupled together, contain a cavity there between, for example, to contain various electronic or other components to aid in the sensing or tracking of the first wristband 1005 by the system, as discussed in greater detail throughout. For example, the capsule or module 1061 may be configured to only transmit, to only receive, or to transmit and receive in varying embodiments. The capsule or module 1061 may only be capable of transmission (e.g., may transmit at one or more frequency bands, such as a short-range transmission band and/or a longer range transmission band) that is received or sensed at sensors or receivers disposed throughout the location incorporating the system. In one embodiment, the capsule or module 1061 may be configured to both transmit and receive, or receive only. The capsule or module 1061 may be sealed (e.g., hermetically sealed) such that water and/or other elements (e.g., dust) are not permitted to enter the interior cavity of the capsule or module 1061 and potentially interfere with operation of the components therein. The portion 1060 of the first wristband 1005 may be disposed substantially at a center of the wristband 1005 and on one side (e.g., protruding outward from one side of the bands for securement around a wrist of a user while being flush or substantially flush on an opposite side) of the wristband 1005. In an alternative embodiment, the portion 1060 may be alternatively positioned, sized, and/or shaped.

Similarly, the second wristband 1010 includes a portion 1070 (e.g., at a center) having a particular shape (e.g., square) that is configured to accept a capsule or module 1071. The capsule or module 1071 has a top component 1072 and a bottom component 1074 that, when coupled together, contain a cavity there between, for example, to contain various electronic or other components to aid in the sensing or tracking of the second wristband 1010 by the system, as discussed in greater detail throughout. The capsule or module 1071 may be sealed (e.g., hermetically sealed) such that water and or other elements (e.g., dust) are not permitted to enter the interior cavity of the module and potentially interfere with operation of the components therein. The portion 1070 may be disposed substantially at a center of the wristband 1010 and on one side of the wristband 1010. In an alternative embodiment, the portion 1070 may be alternatively positioned, sized, and/or shaped.

Similarly, the third wristband 1015 includes a portion 1080 (e.g., at a center) having a particular shape that is configured to accept a capsule or module. Although a hexagon shape is explicitly illustrated in FIG. 10B, other possible shapes may be used (e.g., circle, triangle, pentagon, rectangle, square, diamond, heart, etc.). The same or similar to previous discussions, the module may be formed of multiple components (e.g., top and bottom components configured to fit together) and/or may be formed of a single, molded component (e.g., sealed for water or otherwise air-tight) that has a cavity contained therein for the placement of electronic or other components. The portion 1080 may be disposed substantially at a center of the wristband 1015 or on one side of the wristband 1015. The portion 1080 may be alternatively positioned, sized, and/or shaped. The third wristband 1015 includes an additional engagement element 1090 for receiving a portion (e.g., one of the bands of the wristband 1015 there through and engaging therewith). Such an engagement element 1090 may allow for additional, more customizable, and/or stronger securement for users having varying body shapes or sizes.

Figure 10C:
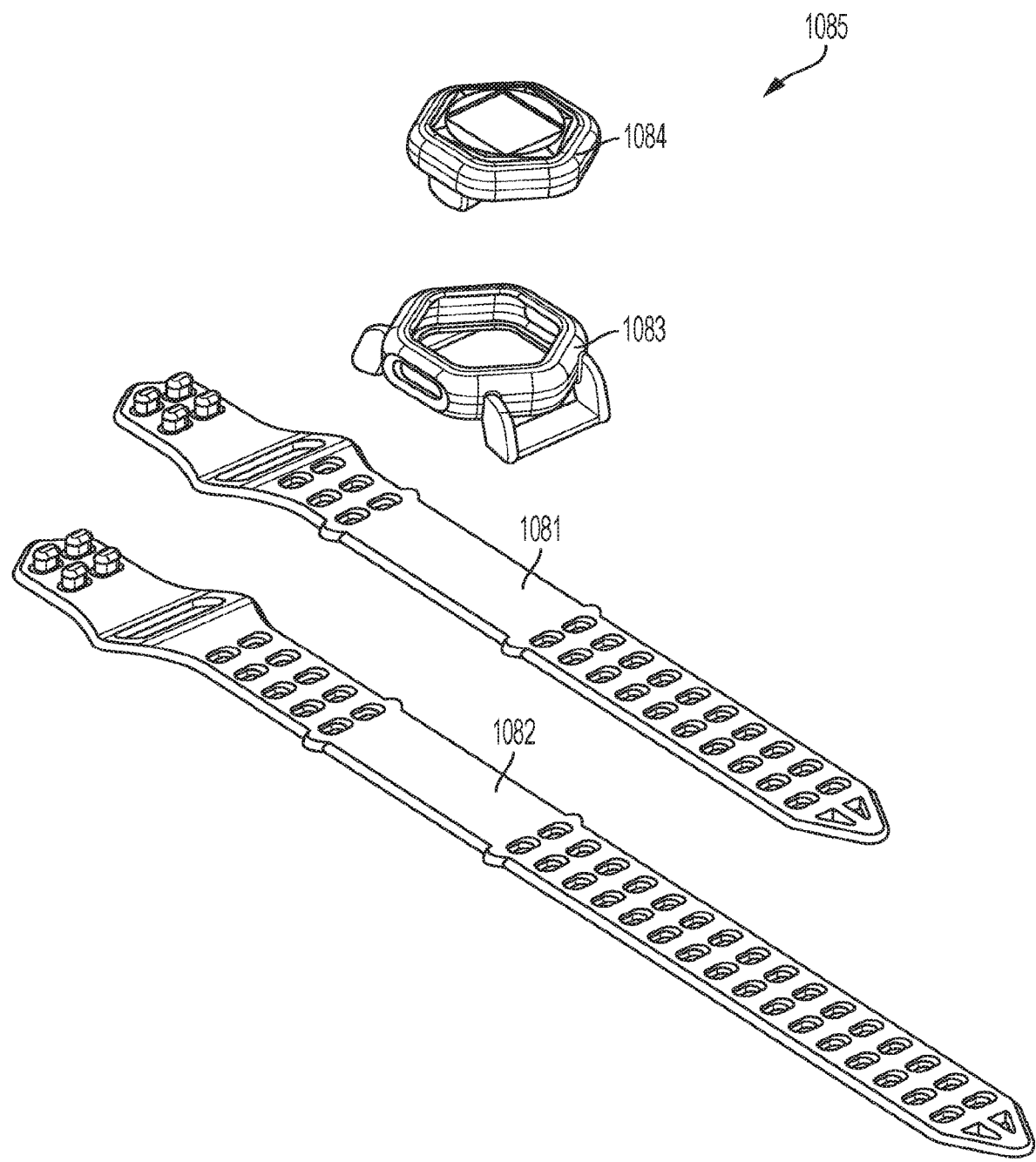
FIG. 10C illustrates a perspective view of component parts making up a plurality of wristbands configured to be sensed or tracked by a system, according to one exemplary embodiment of the invention.

FIG. 10C similarly shows a plurality of wristbands 1085 having sensing or tracking features. The plurality of wristbands 1085 may include features that are the same as or similar to those discussed throughout this application. A first band 1081 (e.g., shorter in size and/or length, for example for a child's wrist) and a second band 1082 (e.g., longer in size and/or length, for example for an adult's wrist) are configured to connect or engage with a base 1083. The base 1083 may be configured to removable connect or engage with the first or second bands (1081, 1082), for example by sliding over a portion of the first or second bands (1081, 1082) and/or engage with or more fixedly connect with the first or second bands (1081, 1082) once in a desired position along a length of the first or second bands (e.g., via a clamp, pin, etc.).

A capsule or module 1084 (e.g., including electronics or other elements to aid in the tracking or sensing features or capabilities of the plurality of wristbands 1085) may engage with the base (e.g., at least a portion of the capsule or module 1084 may fit within and/or be held in place or engage with the base 1083). The capsule or module 1084 and/or base 1083 may include a QR code, or other manner of scanning or linking the capsule or module 1084 to a particular user during setup. In certain embodiments, the capsule or module 1084 may be configured to be removable from the base 1083. In other embodiments, the capsule or module 1084 may not be configured to be removable from the base 1083 (e.g., may be permanently secured with the base 1083, for example, via adhesive or other connection that does not make disconnection with the base convenient and/or possible with potentially causing damage to the base 1083 and/or the module or capsule 1084. Accordingly, in various embodiments, either the base 1083, the capsule or module 1084 (or both) may be configured to be removed and/or reconnected with the bands (1081, 1082). In certain embodiments, the base 1083 and/or capsule or module 1084 may be configured to be used and/or is interchangeable with a variety of bands, allowing a user to collect various bands (e.g., of different materials, themes, colors, designs, etc., but maintain a single base 1083 and/or capsule or module 1084 that may be replaceably used on the various bands as desired. In still another embodiment, the base 1083 and/or capsule 1084 may be configured to be replaceably used on a variety of possible items (e.g., necklaces, shoelaces, cell phone holders, lanyards, etc.) such that a user need only acquire one tracking device, but can use it as desired in conjunction with a variety of wearable, or non-wearable items.

Figure 10D:
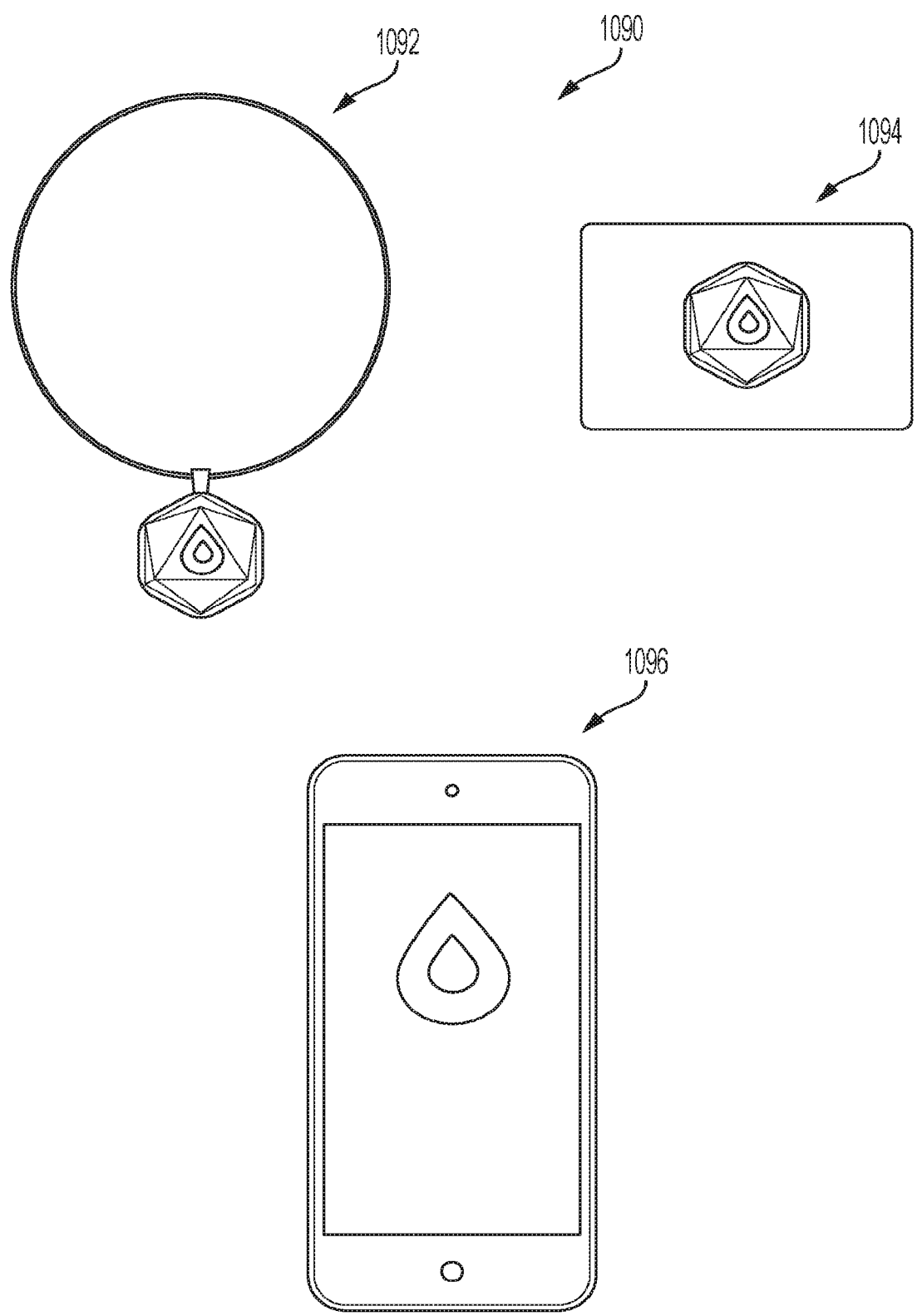
FIG. 10D illustrates perspective views of alternative objects configured to be sensed or tracked by a system, according to one exemplary embodiment of the invention.

Although FIGS. 10A-C specifically illustrate wristbands with tracking capabilities, any of a variety of other potential devices 1090 may be configured to tracking by a system, such as those shown in FIG. 10D. For example, a necklace 1092 for wearing around a user's neck may include a trackable device (e.g., a capsule or module), the same or similar to those discussed for FIGS. 10A-B. In another example, a card 1094 for carrying by a user (e.g., in a wallet of a user, in a lanyard, in a cell phone case, etc. may include a trackable device (e.g., a capsule or module), the same or similar to those discussed for FIGS. 10A-C. In still another example, a mobile device may execute software and/or cooperate with an external device (e.g., via one or more of its hardware ports) for providing track capabilities by transmitting and/or receiving signals configured to be received and/or sent by sensors positioned around the location, as discussed throughout this application. Any of a variety of possible manners of wearing and/or carrying a trackable device that is configured to be sensed and/or tracked by a system in accordance with the features discussed throughout this application may be used in alternative embodiments.

Figure 11C:
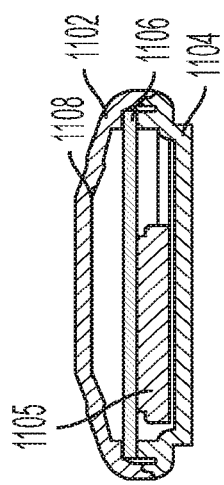
FIG. 11C illustrates a cut-away side view of the capsule of FIG. 11A.
Figure 11B:
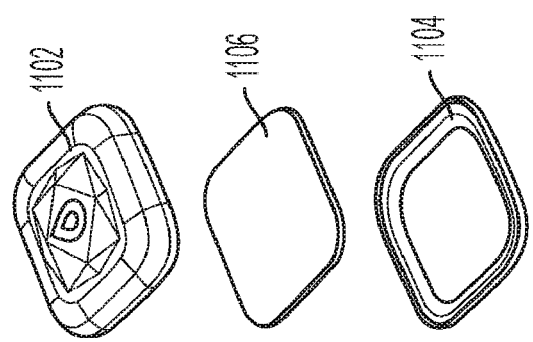
FIG. 11B illustrates an exploded perspective view of the capsule of FIG. 11A.
Figure 11A:
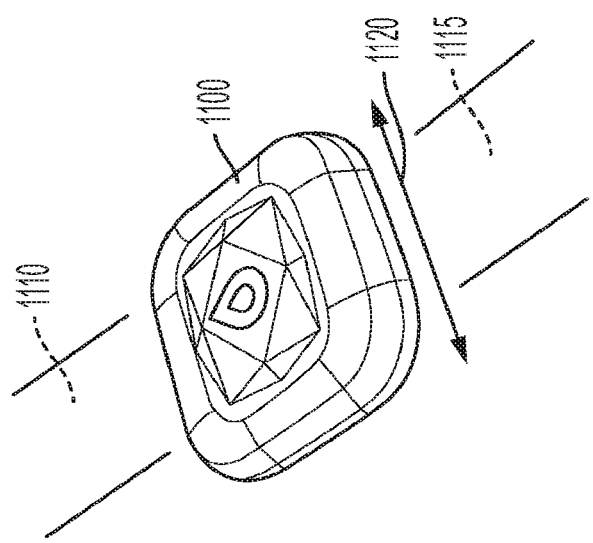
FIG. 11A illustrates a perspective view of a capsule configured to be tracked by a system, according to one exemplary embodiment of the invention.

FIGS. 11A-C show various views of a module 1100 configured to be tracked by a system. The module 1100 and/or the system may include features as discussed elsewhere in this specification and/or drawings. For example, as shown in FIG. 11A, the module 1100 may be configured to be worn by a user (e.g., as part of a wristband having bands or straps (1110, 1115) that extend outwardly from opposing sides or ends of the module 1100). The module may be integrally formed with one or both of the bands or straps (1110, 1115) or may be connected with one or both of the bands or straps (1110, 1115) in different embodiments. In another embodiment, the module 1100 may not be connected with or adjacent to any bands or straps (e.g., may be configured to be worn or associated with a user other than through strapping to a wrist, ankle, or other body part of the user. The module 1100 can be tracked by the system as a way for the system to know the location or position of the user as the user moves throughout a particular geographic location.

As shown in FIGS. 11B and 11C, the module 1100 may be made of a rigid outer shell having a top component 1102 and a bottom component 1104 (or other orientation/combination of two or more separate components) that are configured to fit together (e.g., be connected, sealed, or adhered together) such that a cavity 1108 is disposed between the top component 1102 and the bottom component 1104. In an alternative embodiment, a module may be formed of a single material without requiring connection of separate portions and/or may be formed of more than two components. One or more electronic or other components may be disposed there between, for example, upon a printed circuit board ("PCB") 1106 or other substrate or material that fits within the cavity 1108. In another embodiment, the one or more electronic or other components may be connected with the top component 1102 and/or the bottom component 1104. A battery 1105 may also be contained within the cavity 1108 for providing power to one or more of the components (e.g., upon the PCB). The module 1100 may be a square shape with dimensional length 1120. In one embodiment, the dimensional length 1120 may be equal to or under 40 mm, such as between 20 mm-40 mm. In another embodiment, the module 1100 may be any of a variety of possible shapes having different dimensions (e.g., rectangle, circle, oval, diamond, hexagon, octagon, pentagon, triangle, and/or other complex shapes, for example shapes in the form of objects, such as logos or in the shape of other objects). The module 1100 may have a cross sectional dimension of equal to or less than 60 mm, such as between 20 mm-60 mm. Such a dimension may allow for convenient wearing by a user while also satisfactorily containing the desired components within the module 1100.

Figure 12C:
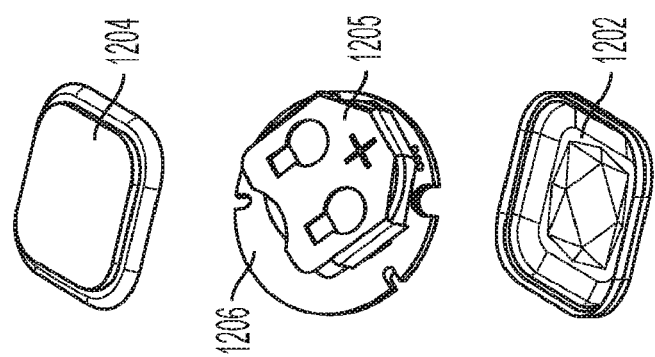
FIG. 12C illustrates an exploded view from a bottom perspective of the capsule of FIG. 12A.
Figure 12B:
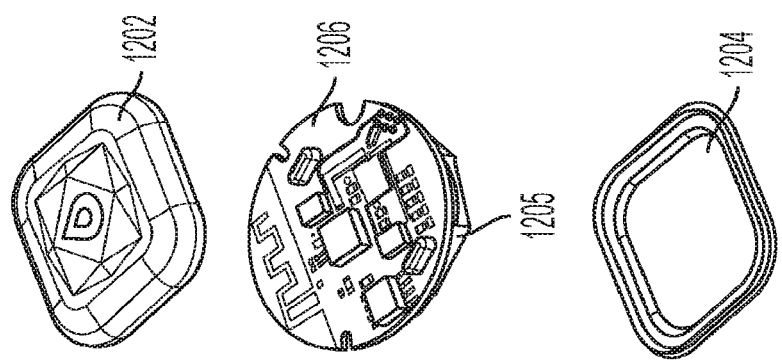
FIG. 12B illustrates an exploded view from a top perspective of the capsule of FIG. 12A.
Figure 12A:
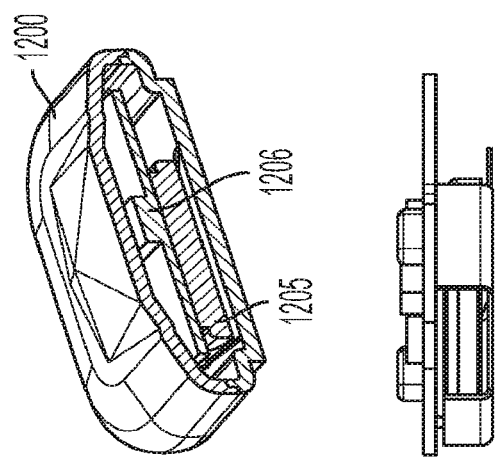
FIG. 12A illustrates a capsule having electrical components and configured to be tracked by a system, according to one exemplary embodiment of the invention.

FIGS. 12A-C show a capsule 1200 containing electrical components and configured to be tracked by a system. The module 1200 and/or the system may include features as discussed elsewhere in this application. As shown in FIG. 12A, the module 1200 may include an interior cavity that houses a PCB 1206 having electrical components and/or traces disposed thereon and a battery 1205 for powering one or more of the electrical components on the PCB 1206.

FIG. 12B shows an exploded view from the top perspective of the module 1200 of FIG. 12A. The module 1206 may be made up of a top component 1202 and a bottom component 1204 (or other orientation/combination of two or more separate components) configured to fit together and contain the PCB therebetween. The battery 1205 may be coupled with the PCB 1206 (e.g., to a bottom surface of the PCB 1206 that is adjacent to the bottom component 1204) while other components may be coupled with the PCB 1206 on a side opposite the battery 1205 (e.g., to a top surface of the PCB 1206 that is adjacent to the top component 1202). In order to conserve battery power, one or more components may be disposed on the PCB 1206 or connected with the PCB 1206 with a switch such that all or some of the electronic components that require power are shut off or have their power draw reduced if it is determined that the module has not moved for a predetermined period of time. In one embodiment, this determination may be aided by an accelerometer, such as a 3-axis accelerometer. Once movement is detected again, some or all of the electronic components may begin receiving additional power from the battery 1205 again.

In one embodiment, the battery 1205 may be a standard battery (e.g., a conventional battery for a wristwatch or other consumer electronic device, such as a CR2032 battery) that is not capable of being recharged (e.g., the battery 1205 may be a consumable and/or configured to provide power for set period of time, such as roughly 3 years of operation). For example, the module 1200 may be sealed (e.g., for preventing water and/or dust from entering the interior of the module 1200) such that when the battery 1205 runs out of power, the module should be discarded and a new module with a new battery can be provided to or obtained by a user for future use. In an alternative embodiment, other types of batteries may be used, such as rechargeable batteries and/or allow for solar recharging and/or charging based upon movement. For rechargeable batteries, an electrical port may be provided that allows for connection of a power cable to or through the module 1200 in order to recharge the battery 1205. For rechargeable batteries, recharging of the battery 1205 may be accomplished via wireless charging such that no electrical port is required. In still other embodiments, the battery 1205 may be replaceable. For example, embodiments where presence of water or other environmental elements are of lower concern, the module 1200 may not be permanently sealed (e.g., the module 1200 may be configured to be opened without causing damage or destruction to the module 1200) and/or the battery 1205 may be located outside of the module 1205 thereby allowing replacement of the battery either by opening up the module 1200 and replacing the battery 1205 that is positioned within the module 1200 or by replacing a battery that is instead located outside of the module. The battery 1205 may also be located within a sealable cavity such as using gaskets or other sealing interface between access components.

The PCB 1206 may contain and/or interface with an antenna or transmitter (e.g., an ultra-high radio frequency or microwave frequency antenna) that is configured to transmit over a longer range, such as over a 2.4 GHz frequency. In one embodiment, the long-range antenna may use Bluetooth Low Power protocol such that no pairing of the antenna with a reader is required. The long-range antenna may require battery power or could be an antenna that does not require battery power. The PCB 1206 may also contain and/or interface with a second antenna or transmitter (e.g., a radio frequency antenna) that is configured to transmit over a short range, such as over a 13.56 MHz frequency. In certain embodiments, the short range antenna may not include a metal backing. Non-metal backed antennae may allow for better operation when within a module that also includes a long-range antenna. The short range antenna may be a metal backed tag.

In one exemplary embodiment where the antenna(s) is/are powered by a battery, battery power may be conserved by extending a beacon interval for transmission via one or more of the antennae (e.g., by using a beacon interval of transmission for a long-range antenna of only once every 2 seconds or greater). In such a case, the antenna may use less power since it is transmitting less often than it might otherwise with if it had a shorter beacon interval. Although extension of the beacon interval for transmission may introduce additional error in tracking of users, error reduction techniques, such as those previously discussed may be used to detect, mitigate, and/or correct such errors.

In still another embodiment, rather than having a module with an active (e.g., requiring battery power) antenna or transmitter (e.g., long-range) that regularly transmits a signal at set beacon intervals (e.g., 2 second intervals) and a passive (e.g., not requiring battery power) antenna or transmitter (e.g., short-range) a system may be employed that uses one or more semi-active antennae or transmitters that do not regularly transmit at set intervals, but rather transmits in response to a stimulus signal. For example, an external transmission device (e.g., positioned outside of the module, such as an antenna or transmitter having a range of roughly 30 ft.) may be positioned at a desired location at the destination and sends a signal that is received by a passive antenna (e.g., the short-range antenna or tag of the module) which then transmits or communicates a small signal to the active, long-range transmitter of the module instructing or stimulating the active, long-range transmitter of the module to transmit. In this fashion, the long-range transmitter need not consume as much power as would otherwise be necessary to support regular interval transmissions, but only consumes power upon transmission in response to the stimulus signal. The power draw or use by the external transmission device may be of lower importance or concern since it is not within the module or associated with a mobile tracking device of a user and may be powered by wires or cables or other power sources associated with the destination or venue (e.g., water park or amusement park) itself. Antennae that are tuneable may be used in an alternative embodiment.

Figure 13:
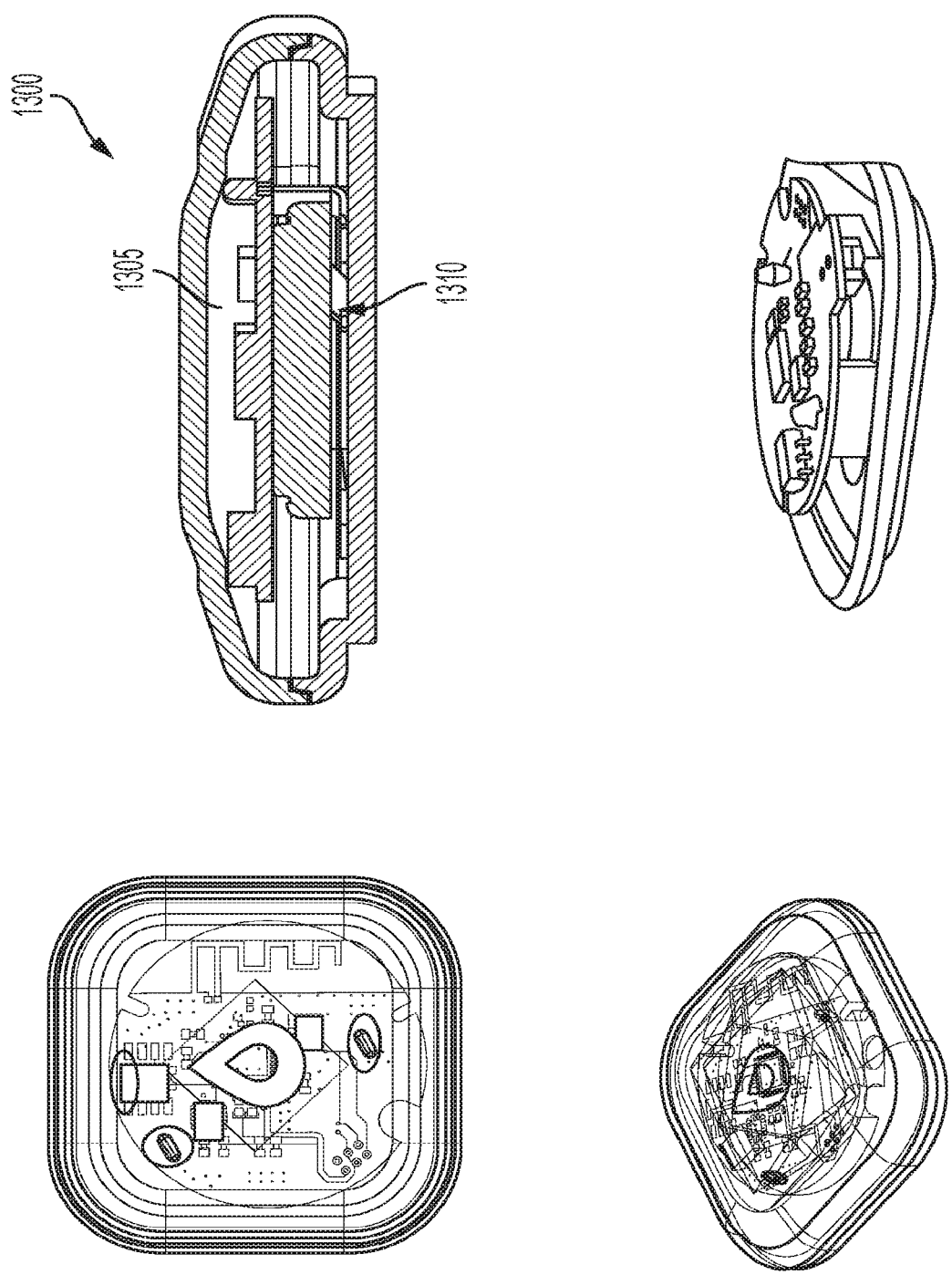
FIG. 13 illustrates electrical component layout making up a capsule shaped as a square that is configured to be tracked by a system, according to one exemplary embodiment of the invention.

To help improve proper operation of all or some of the antennae or transmitters of the module 1200, a predetermined distance and/or orientation of the antennae within the module 1200 may be established. For example, as shown in FIG. 13, a square-shaped module 1300 may have a first side 1305 (e.g., a top side or area adjacent to a top side of a printed circuit board within a cavity of the module) and a second side 1310 (e.g., a bottom side or area adjacent to a bottom side of a printed circuit board within the cavity of the module) that is opposite the first side 1305. The module 1300 may have a first antenna or transmitter positioned, disposed, located, and/or oriented on or at the first side 1305 and a second antenna or transmitter positioned, disposed, located, and/or oriented on or at the second side 1310. Similarly, in another example, as shown in FIG. 14, a hexagon-shaped module 1400 may have a first side 1405 (e.g., a top side) and a second side 1410 (e.g., a bottom side) that is opposite the first side 1405. The module 1400 may have a first antenna positioned, disposed, located, and/or oriented on or at the first side 1405 and a second antenna positioned, disposed, located, and/or oriented on or at the second side 1410. This distance and/or placement of other materials (e.g., a printed circuit board) between the antennae may aid in maintaining a particular or desired distance or separation between the antennae or transmitters. In an alternative embodiment, the first and second antennae or transmitters may both be disposed on the first side (1305, 1405) or the second side (1310, 1410) of the module (1300, 1400), respectively. Epoxy or other material may also or alternatively be disposed within the module (1300, 1400) to help maintain the desired distance. In one embodiment, a desired distance or separation between antenna or transmitters of a module may be 2.5 mm or greater. Any of a variety of possible epoxy or other materials may be used, such as silicone, potting, rubber, etc.

Although the previous exemplary embodiments have focused upon wristbands containing trackable hardware, in alternative embodiments, any of a variety of possible devices could contain trackable hardware, such as towels, to help prevent users from taking towels and not returning them, for example, in a hotel or resort context. Portable asset tracking (e.g., equipment on emergency vehicles such as fire trucks, ambulances, police cars, etc.) may also use the tracking technology described throughout this application for objects that are moving around in less controlled areas compared to conventional asset tracking in warehouses or the like. Non-trackable hardware may be desirable in alternative embodiments.

Figure 15:
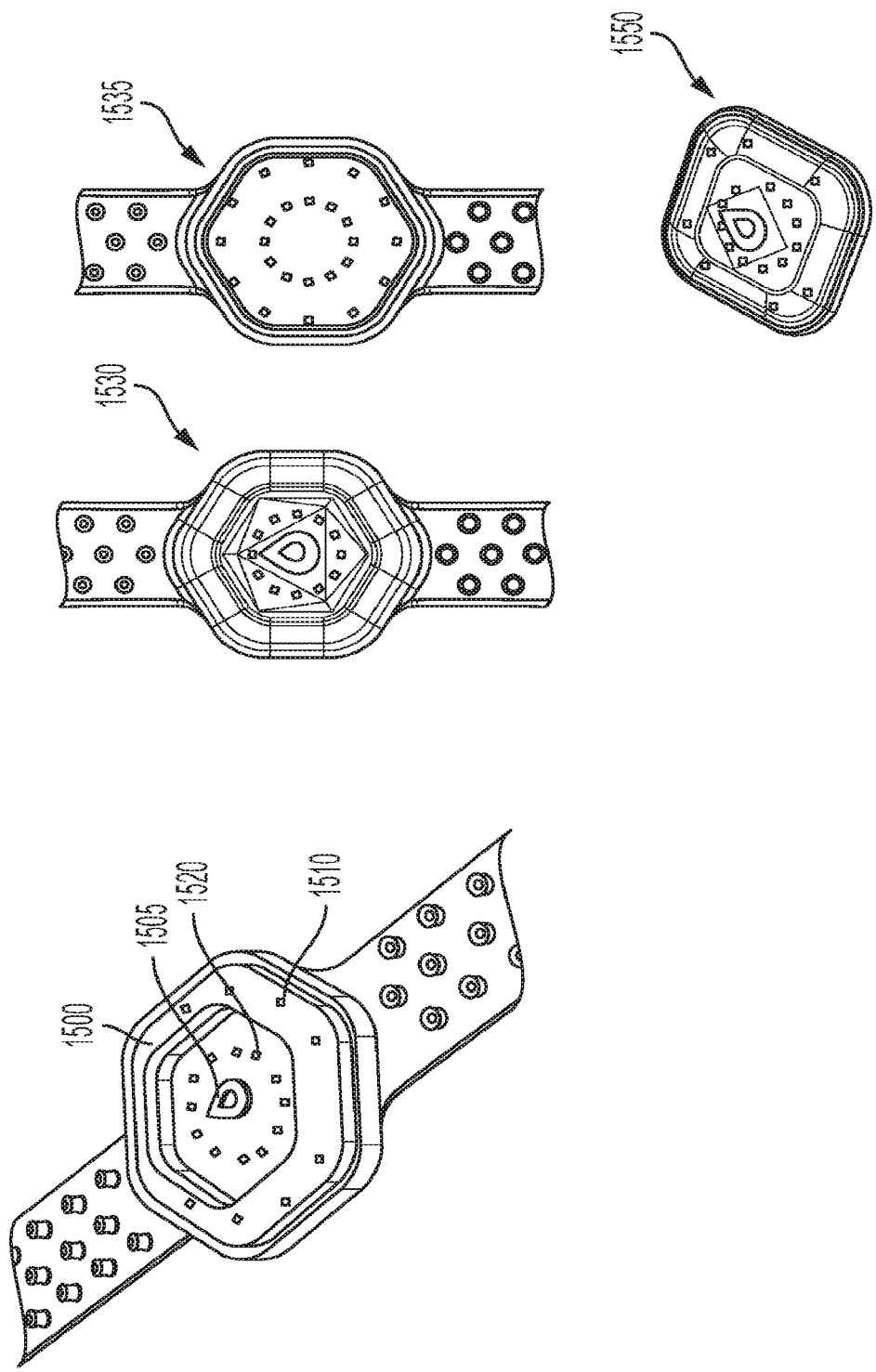
FIG. 15 illustrates a capsule configured to provide entertainment or enjoyment to a guest without being trackable by a system, according to one exemplary embodiment of the invention.

FIG. 15 shows various views and configurations for non-trackable modules (1500, 1550) configured to provide entertainment or enjoyment to a user without being tracked by a system. For example, as previously discussed, a wristband may be configured to receive a module that contains one or more components to aid in the sensing and/or tracking of the module. The cost of such a module that is capable of being tracked or sensed by a system (e.g., due to electronic components used) may make such a module desirable for re-use by multiple users who visit the particular destination, such as an amusement park or water park. To help in discouraging users from taking such trackable modules with them when leaving the destination and/or for providing or selling to users a souvenir or other keepsake, a module that does not contain tracking or sensing components therein may be made available.

For example, the non-trackable module 1500 may be provided in a hexagonal shape and/or may include logos and/or personalization elements 1505 that are indicative of the particular destination visited by the user (e.g., name of the amusement park or waterpark, user name, nickname, initials, user-chosen graphic, branding, etc.). Powered elements such as lights (e.g., light-emitting diodes) or speaker(s) may also or alternatively be part of the non-trackable module 1500. In one embodiment and as shown, a first set of lights 1510 may be disposed along an outer ring of the module 1500 and a second set of lights 1520 may be disposed along an inner ring of the module 1500. The lights may be programmed to flash or illuminate according to a particular sequence (e.g., chasing lights and/or fade through different colors). The non-trackable module 1500 may be configured (e.g., sized and/or shaped) to replace a trackable module, such as in a wristband as shown in the top view 1530 and/or bottom view 1535). The non-trackable module 1500 may be any of a variety of shapes, the same or similar to previous discussions, such as a hexagon shape or as specifically illustrated by the non-trackable module 1550 having a square shape. Exemplary component features of the non-trackable module may also be incorporated into the tracked hardware or other modules described herein, including, for example, speaker, lights, display, logos, personalization, and combinations thereof.

Figure 16A:
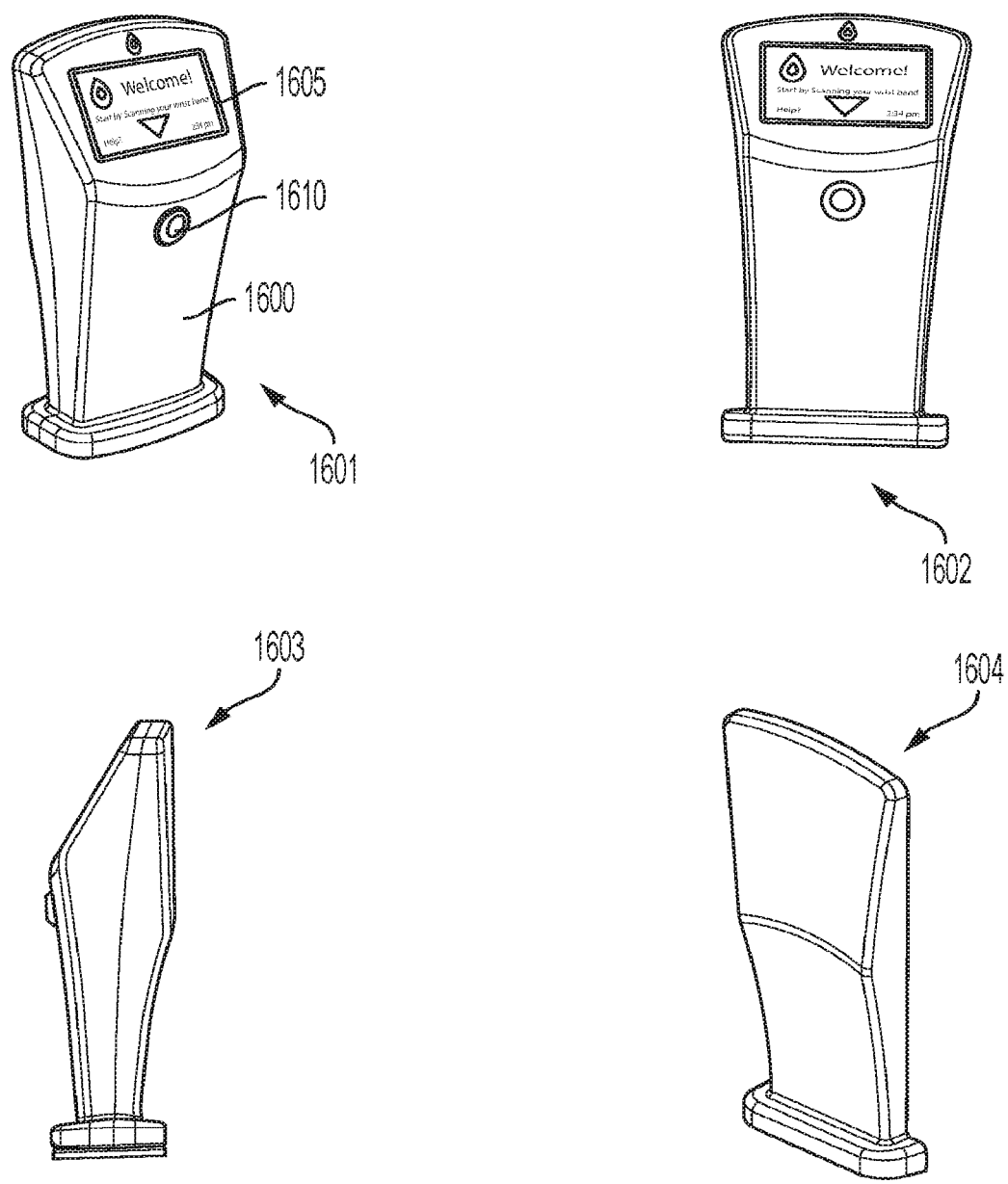
FIG. 16A illustrates a plurality of views of a kiosk for sensing of a user and allowing user interaction therewith, according to one exemplary embodiment of the invention.

FIG. 16A shows multiple views of a kiosk 1600 for sensing of a user and/or equipment and/or hardware associated with a user and allowing user interaction therewith. The kiosk 1600 and/or sensing of a user or equipment or hardware associated with a user may include features that are the same as or similar to those discussed throughout this application. Users may interact with a system via a mobile phone or other electronic device (e.g., a mobile device) running a software application thereon and/or may interface with the system using a software interface via one or more kiosks 1600. For example, the kiosk 1600 (or multiple kiosks) may be disposed in or around a destination or geographic location (e.g., a waterpark or amusement park) and be configured to allow a user to be identified. Upon identification, the user may then interact with the kiosk, such as by interfacing with software via a touchscreen for modifying aspects of that user's account, communicating with family/friends, and/or engaging in a variety of other activities or features provided by the software executed by the kiosk 1600 as discussed throughout. For clarity of illustration, the kiosk 1600 is shown from a front perspective view 1601, a front view 1602, a side view 1603, and a rear perspective view 1604. Although the kiosk 1600 is shown in FIG. 16A as having particular components, a particular size, and/or a particular shape, a kiosk may be shaped, sized, and/or configured in any of a variety of possible manners in an alternative embodiment.

In one exemplary embodiment, the kiosk 1600 includes a sensor 1610 for sensing, identifying, or determining a user that is within a predetermined proximity of the kiosk 1600. The sensor 1610 may be configured for short-range sensing of a user via sensing of a module or capsule that includes electronic components (e.g., antenna, RFID tag, transmitters, etc.), such as those modules or capsules previously discussed. When a user that is wearing or carrying (e.g., via a wristband) a capsule or module (or otherwise brings the module or capsule or any sensible components or electronics within a certain distance of the sensor 1610, the kiosk 1600 may identify the user via such sensing. For example, a wristband worn by the user may include a module that includes a short range (e.g., few inches, 13.56 MHz frequency) tag, antenna, or transmitter therein. The short range tag, antenna, or transmitter may be sensed by the sensor 1610 of the kiosk 1600 when the short range tag or antenna is within a predetermined distance (e.g., 2-15 inches) from the sensor 1610 of the kiosk 1600. In a given destination, kiosks with different capabilities may be disposed throughout (e.g., certain kiosks may allow for any or all of interaction by a user, tracking of a user, etc. while other kiosks have different capabilities, such as only tracking or only interaction, etc.)

In an exemplary embodiment, the sensor 1610 may produce radio frequency fields that can excite a tuned circuit within the module or capsule created between the short range antenna and one or more capacitors. Such excitement of the circuit may cause the short range tag or antenna to transmit a signal (e.g., a data packet stored on an integrated circuit coupled to the antenna) without the short range tag or antenna being electrically connected to a battery associated with the wristband or module. Upon sensing the short range tag or antenna, the system may use the received signal or data packet to identify information associated with or for that particular user and display the information upon a display 1605 of the kiosk 1600. In an alternative embodiment, a long-range sensor may be included in the kiosk 1600 in replacement of or in addition to a short-range sensor.

The display 1605 may be a touchscreen display that allows user interaction via touching the display to enable the user to provide input, as discussed in greater detail throughout this application. Alternatively, the display 1605 may be a screen that is not capable of accepting user input via touch and additional user interface elements (e.g., buttons, dials, switches, trackballs, etc.) may be provided on or near the kiosk 1600 for a user to make selections, confirmations, and/or otherwise navigate or interface with the software application being executed by the kiosk 1600 and/or being displayed upon the display 1605. As illustrated, the kiosk 1600 may be configured to be mounted on a ground surface and be roughly 2-5 ft tall in order to allow users to easily view and/or interact with the kiosk. In an alternative embodiment, differing configurations for a kiosk or other manner of scanning users and/or accepting user interaction therewith. For example, in one embodiment, a display screen may be mounted upon or connected with a building or other structure or object of a venue. The display screen may contain processing equipment or devices integrated therewith for running of appropriate software code and/or may be configured to communicate with processing equipment or devices located remotely.

Figure 16B:
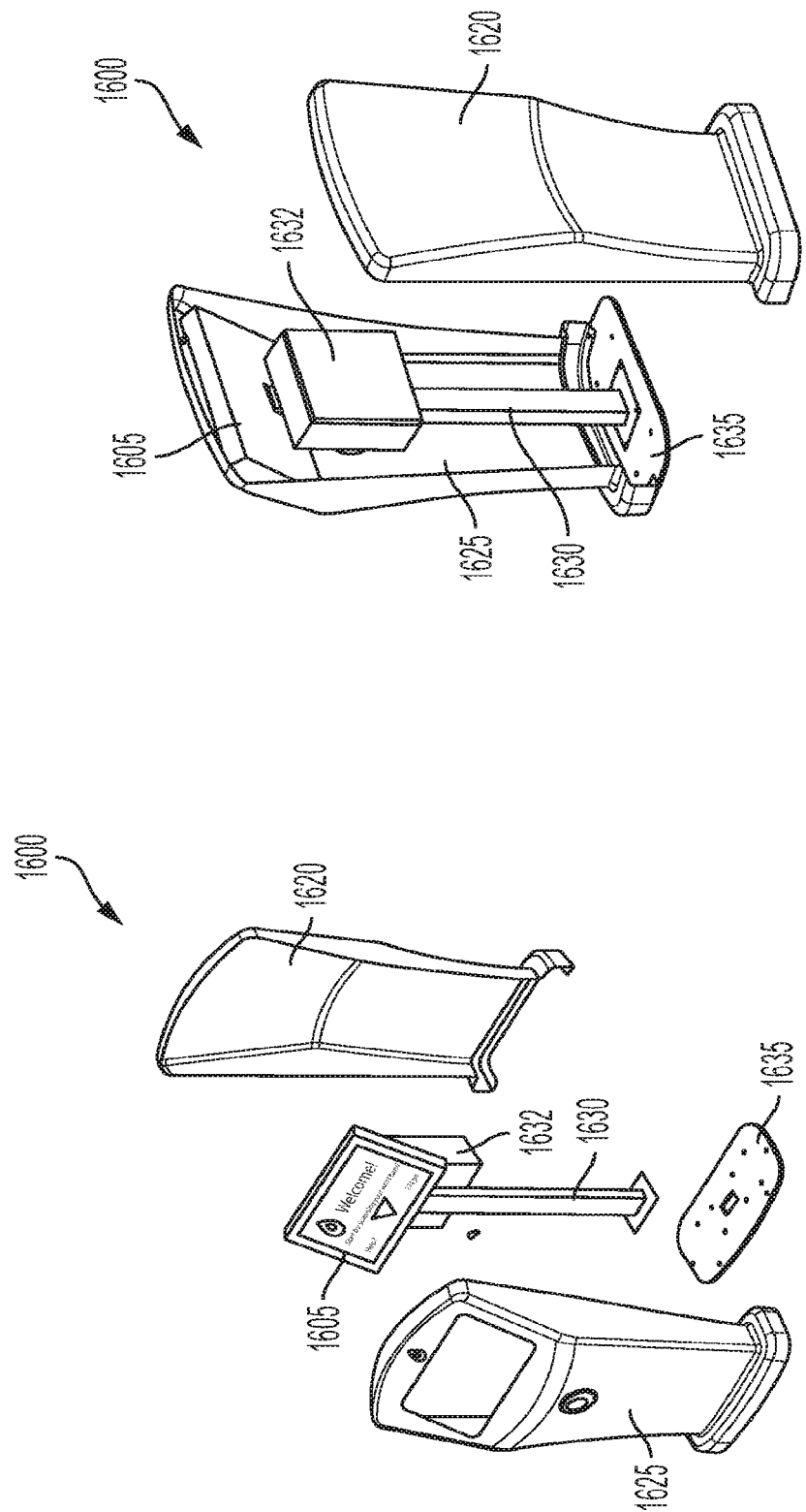
FIG. 16B illustrates an exploded front and rear view of the kiosk of FIG. 16A.

FIG. 16B illustrates an exploded front and rear view of the kiosk 1600 of FIG. 16A. The kiosk 1600 may be manufactured of a front panel or body 1625 and a rear panel or body 1620 that are configured to couple together and form a cavity or space therebetween. In one embodiment, a unitary body may be formed having a cavity therein or a body having a cavity therein may be formed of any of a number of connected panel or body components. The front panel or body 1625 and/or rear panel or body 1620 may be made of any of a variety of possible materials, including plastic, metal, fiberglass, etc. In certain embodiments, the coupling or mating of the front panel 1625 and the rear panel 1620 may be sealed so as to prevent water and/or dust from entering the cavity therebetween (e.g., to protect electrical components or other equipment or devices contained within the cavity).

Figure 16C:
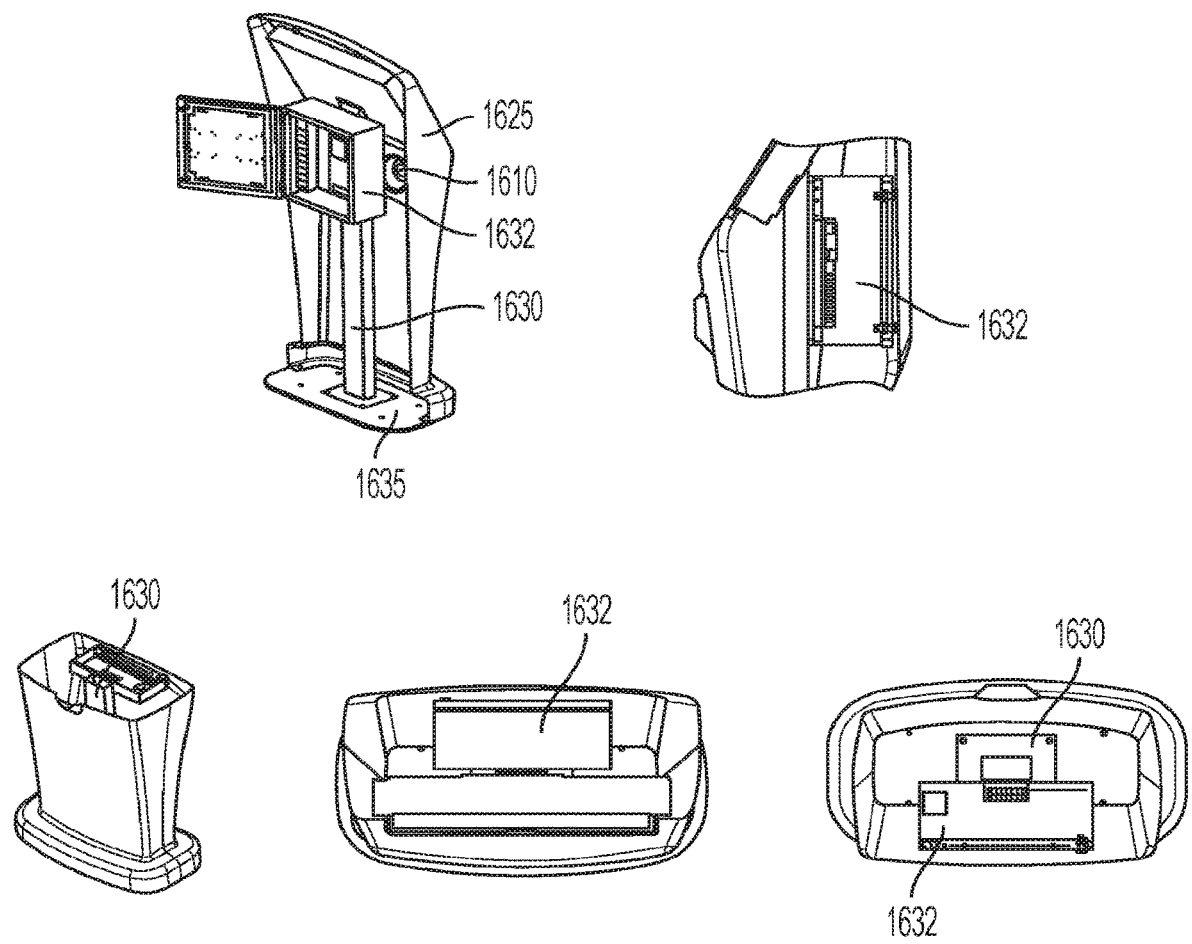
FIG. 16C illustrates a plurality of views showing interior components of the kiosk of FIG. 16A.

A base 1635 is connected with a stand (e.g., vertical) 1630 that connects with the display 1605 and with a box or enclosure 1632 for housing electrical components associated with the display 1605 or other aspects of the kiosk 1600. For example, one or more of a processor, memory, antenna(s), power supplies, etc. may be included within the box or enclosure 1632 such that, upon sensing a user at the kiosk 1600 via the sensor 1610 (see, e.g., the sensor 1610 of FIG. 16A), the kiosk 1600 and/or a connected system (e.g., a system in communication with one or more of the electrical components of the kiosk via wired or wireless communication) may identify the particular user and/or a particular hardware or component, and display appropriate information upon the display 1605 as discussed in greater detail throughout. FIG. 16C shows multiple cross sectional views showing interior layout of the above-discussed features of the kiosk 1600 of FIG. 16A and showing how one exemplary embodiment of a kiosk may be constructed or configured having the components or equipment previously identified.

As previously discussed, a system for a destination (e.g., a waterpark or amusement park) may allow for tracking of users or groups of users and/or other user-customization or user-interaction experiences. Such user-customization or user-interaction experiences of the system may be engaged with by the user via a software application that is executed upon a computing device, such as a handheld or other mobile device (e.g., a smart-phone, tablet, laptop, etc.). The system may have features that are the same as or similar to those disclosed throughout this application.

Figure 17:
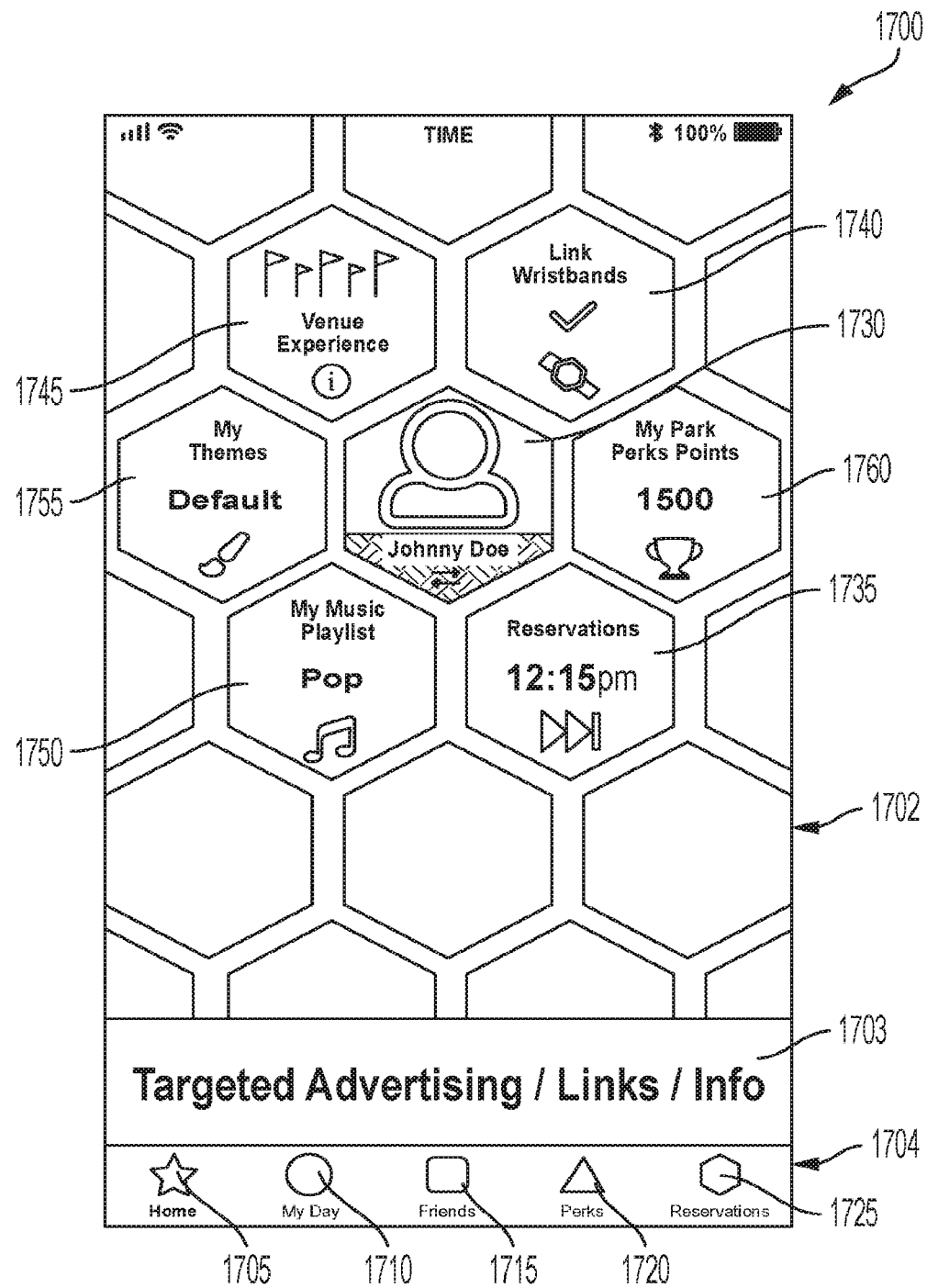
FIG. 17 illustrates a user-interface screen for a guest-centric homepage to be used with a system for tracking users and/or objects at a geographic location and configured to provide data and/or associated features, according to one exemplary embodiment of the invention.

FIG. 17 shows a user-interface ("UI") screen 1700 for a guest-centric homepage to be used with a system for tracking users and/or objects at a geographic location and configured to provide data and/or associated features. The UI screen 1700 may be a "home" screen (e.g., may be an initial screen or screen containing a summary of a variety of possible features available I the software and include links or UI elements that allow a user to navigate to such variety of possible features). As shown, the UI screen 1700 may include a first portion, such as a main portion 1702, a second portion, such as an advertising and/or informational banner portion 1703, and third portion, such as a bottom shortcut portion 1704, as discussed in greater detail herein. The bottom shortcut portion 1704 may include a plurality of UI elements (e.g., text, graphics, etc.) that may be selected (e.g., touched) by a user in order to change the information or UI elements that are available in the main portion 1702 of the UI screen 1700 or to navigate the user to a different UI screen having alternative UI elements. A home UI element 1705 may take the user to a screen having all or some of the UI elements displayed in the main portion 1702 of the UI screen 1700. For example, UI elements that correspond to commonly used features for the particular user (and/or other users in general) may be displayed to allow the user quick access to such features from a single screen of the software application.

A social (e.g., a friends and/or family) shortcut UI element 1715 may be included as shown in the bottom shortcut portion 1704 of the UI screen 1700. The social shortcut UI element 1715 may include various features relating to social functions (e.g., messaging, sharing of activities or statistics for a user, etc.) and/or management of family or linked accounts and associated preferences, for example as discussed in greater detail throughout this application, such as for FIG. 28 and/or FIG. 33. In certain embodiments, a social UI element may additionally or alternatively be included in the main portion 1702 of the UI screen 1700.

Figure 20:
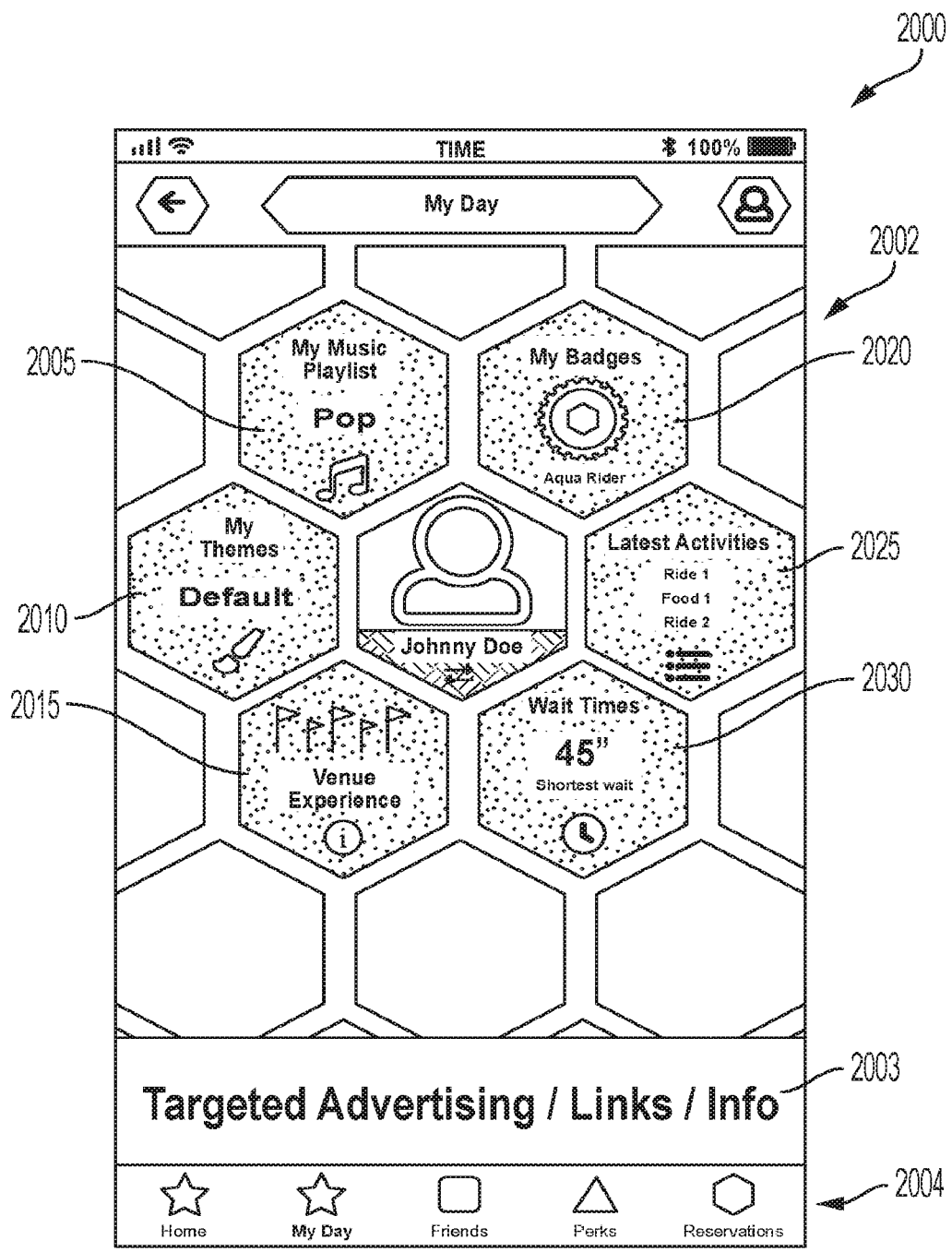
FIG. 20 illustrates a user-interface screen for a guest-centric day activity page to be used with a system for tracking users and/or objects at a geographic location and configured to provide data and/or associated features, according to one exemplary embodiment of the invention.

A day activity UI element 1710 may take the user to a screen displaying UI elements related to activities and/or customizations that a user may engage with that relate to the user's day while at the destination. For example, FIG. 20 shows a handheld user-interface screen 2000 for a guest-centric day activity page to be used with a system for tracking users and/or objects at a geographic location and configured to provide data and/or associated features. The system may include features that are the same as or similar to those discussed throughout this application. The UI screen 2000 for the day activity page may include a first portion, such as a main portion 2002 having a plurality of UI elements. A second portion, such as an advertising and/or informational banner portion 2003, and a third portion, such as a bottom portion 2004, may also be provided, the same as or similar to the discussion for FIG. 17. The plurality of UI elements shown in FIG. 20 are discussed below, greater, fewer, or different UI elements being possible in alternative embodiments. Alternative embodiments may utilize any number of fewer or greater number of portions and/or in alternative arrangements or orientations.

A music UI element 2005 may configure for display a currently selected music category or playlist and may be selectable to enable the user to select a type of music category or playlist that is to be played. For example, the music or audio may be played by the device running the software itself (e.g., a smart phone). In another example, the music or audio may be played by an attraction at the destination or venue. In still another example, the music or audio may be played on advertising screens, kiosks, or other electronic devices located at or throughout the destination or venue, the same or similar to those features discussed throughout for FIG. 17. In certain embodiments, a user may unlock (e.g., purchase and/or earn points as discussed in greater detail throughout this application) additional music songs, albums, features, etc. Similarly, a theme UI element 2010 may display a currently selected theme and may be selectable to enable the user to select a desired theme or scheme that is shown (e.g., by the software application, on or for particular attractions at the destination, on advertising screens or kiosks through the destination, etc.), the same or similar to those features discussed throughout for FIG. 17. A destination information UI element 2015 may display a currently selected destination (e.g., waterpark or amusement park) and may be selectable to enable the user to view additional information corresponding to that destination, the same or similar to those features discussed for FIG. 17.

The UI screen 2000 for the day activity page also includes a badges or statistics UI element 2020 that may display one or more statistics or data about the user (e.g., the most recently obtained "badge," as discussed in greater detail below). Upon selecting the badges or statistics UI element 2020, the user may view the various stats and/or badges that have been determined for and/or earned by the user in the system. For example, the system may have setup a "badge" that a user can earn (or partially earn) by riding on or participating with a particular attraction a predetermined number of times. For example, one badge may be earned by riding five predetermined attractions within an amusement park. As a user is tracked as having ridden upon the predetermined attractions, that user earns or progresses towards that badge. One all five of the predetermined attractions (and/or other criteria established, such as in a particular day, week, etc.) has been completed, the user may earn the badge.

Upon successfully completing the requirements for such a badge, the badge may be awarded to the user, in the form of a colored graphic, or other indication that the user has successfully completed the requirements to earn that badge. Multiple badges may be available for users to earn. Prior to earning the badges, they, such badges may be greyed out and/or indicate to the user the progress that has been made to date in earning the badge. In another embodiment, badge requirements may be hidden from users until the badge is successfully earned, at which time the badge becomes visible to the user. Badges may thus encourage participation on a variety of attractions or venues and may be used by operators of a destination to help influence user behaviours by the establishment of certain badges that encourage user participation in particular areas or on particular attractions.

The UI screen 2000 for the day activity page may also include an activities UI element 2025 that may display the most recent activity that the user was tracked as participating on (e.g., a particular attraction, making a particular purchase, visiting a particular venue, etc.). Selecting the activities UI element 2025 may provide the user with a list of all (or a subset of all) of the activities that the user had previously participated on. In certain embodiments, other statistics or data related to those activities may be collected and/or displayed to the user, such as the top speed a user achieved upon a certain attraction, the total time spent at a particular venue, vertical feet traversed, number of G-Force obtained, number of steps walked, etc. Such activity history and/or associated statistics may be shareable by the user, for example to friends and family linked with their account within the software application and/or by using third party applications, such as via messaging, email, social media, etc.

The UI screen 2000 for the day activity page may also include a wait time UI element 2030 that may display one or more statistics or data relating to wait times on one or more attractions at the destination. For example, the system may determine which attractions are within a predetermined proximity to the user and display the shortest wait time among those attractions. In another example, the system may display the shortest wait time out of all of the attractions at the destination. In still another example, the system may determine and display the shortest wait time corresponding to a set of attractions that the user has previously established and/or whose attributes (e.g., height, weight, etc.) and/or preferences (e.g., water rides, roller coasters, etc.) match with the particular attraction characteristics. Upon selecting the wait time UI element 2030 the user may be provided with a list (e.g., categorized) concerning all, or some subset of all, of the attractions and/or venues at the destination and their corresponding current (or estimated future) wait time. In certain embodiments, the wait time UI element 2030 may include start times of shows, events, reservations for food or ride or attraction access, etc. The wait times may be dynamically updated (e.g., in real-time) based on a variety of data available to the system from the tracking of users through the destination such that a user may be able to specifically see the exact wait time for one or more particular attractions. As discussed in greater detail throughout this application, such data concerning wait times can also be used by the system for crowd management by dynamically (e.g., in real-time) adjusting a level of perks or points that will be awarded to a user if that user opts to ride on a particular attraction within a given timeframe.

Referring back to FIG. 17, a user profile UI element 1730 may be disposed in the main portion 1702 of the UI screen 1700. The system that is engaged with or interfaces with the software application having the UI screen 1700 with user profile UI element 1730 may be configured to allow a user to establish and/or modify a variety of profile personalization data, for example, as discussed in greater detail below. The user profile UI element 1730 may display information about the real name, nickname, or other profile characteristic (e.g., profile image, age, gender, etc.) associated with the particular user that is currently signed in to the software application (or otherwise associated with the user, such as a child's information that has an account setup by a parent). For example, upon selecting the user profile UI element 1730, a further screen or popup may be displayed that allows a user to view and/or edit information associated with their profile, including modifying their nickname, age, height, gender, preferences, etc.

Figure 19:
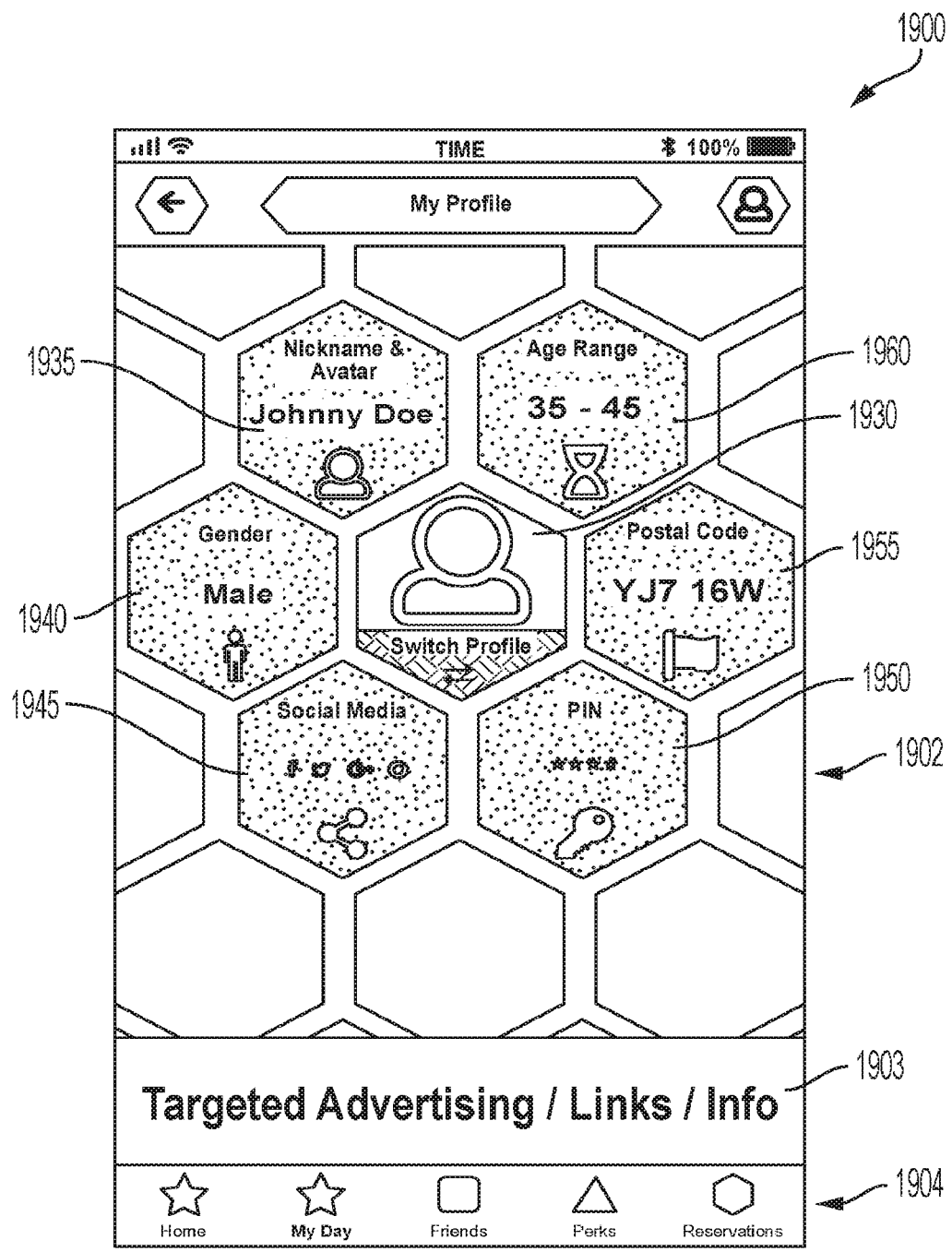
FIG. 19 illustrates a user-interface screen for a guest-centric profile page to be used with a system for tracking users and/or objects at a geographic location and configured to provide data and/or associated features, according to one exemplary embodiment of the invention.

For example, in one embodiment as shown in FIG. 19, a UI screen 1900 for a guest-centric profile page 1900 to be used with a system for tracking users and/or objects at a geographic location and configured to provide data and/or associated features, may be displayed upon selecting the user profile UI element 1730. The UI screen 1900 for a guest-centric profile page may include a first portion, such as a main portion 1902, a second portion, such as an advertising and/or informational banner portion 1903, and third portion, such as a bottom shortcut portion 1904, the same as or similar to that discussed for the UI screen 1700.

The user may be able to edit a nickname or avatar associated with their profile via selection of interface element 1935, edit a gender associated with their profile via selection of interface element 1940, edit a specific age and/or age-range associated with their profile via selection of interface element 1960, edit or establish links to social media accounts to be associated with their profile via selection of interface element 1945, edit a postal code or other geographic indicator (e.g., home address, zip code, home town, home state, home country, etc.) associated with their profile via selection of interface element 1955, and/or edit a passcode (e.g., a Personal Identification Number or "PIN") for additional security that is associated with their profile via selection of interface element 1950. In some embodiments, particular aspects or characteristics associated with a user may be automatically programmed (e.g., may connect with other systems for auto population of data) and/or may utilize additional hardware to aid the user in populating profile characteristics (e.g., a camera may be used to take a picture of a guest or user to associate that guest or user with a wristband and such picture can be used to programmatically determine age, gender, height, weight, etc.). Software-based learning and/or acceptable margins of error may be used in conjunction with a programmatically-determined user characteristic, such as height or weight. In certain embodiments, the picture taken by the camera may be automatically selected from a series of frames taken by the camera to determine the best frame to use for the above-described association and/or determination of characteristics. In other embodiments, additional equipment (e.g., load cell or scale for weight, laser for height, etc.) may be used to determine one or more specific user characteristics for entry as part of the user profile A user may be able to associate other user profiles with their own profile and switch between such profiles in order to setup information, establish restrictions or otherwise have access, to another user's profile. In one example, a user may be able to setup warnings, alarms, etc. for one or more associated user profiles and/or establish parameters or other settings (e.g., a parent may set that Child1 is not permitted to leave Area1, but that Child2 is not permitted to leave Area1 or Area2). Such functionality may be beneficial to parents or guardians whose children do not have mobile devices and/or when parents or guardians or other adults with authority over minors wish to setup particular parameters or other profile data for such children or other minors or dependants. Such parameters or profile data may be a child's age, gender, authorization to go on particular attractions, authorization to visit particular areas of a destination, etc. In this manner, a child or user who otherwise cannot be trusted, whose parents or guardians wish to control, or who does not wish to interface with the system themselves may have their user profile information setup or modified by a linked user. Linking of and switching between user accounts may be established via selection of the interface element 1930.

Referring again to FIG. 17, a link wristband UI element 1740 may be disposed in the main portion 1702 of the UI screen 1700. The system that is engaged with or interfaces with the software application having the UI screen 1700 and the link wristband UI element 1740 may be configured to allow a user to link or associate a wristband (or other component or set of components that may be tracked, such as a module as disclosed throughout this application) with the user's profile (or with another user's profile that is being managed by the user), for example, as discussed in greater detail below.

The link wristband UI element 1740 may be a graphic and/or text that changes depending upon whether the user has successfully linked a module (e.g., contained within a wristband) for use during a set period of time (e.g., day or set of consecutive days). A user may setup an account on their mobile device prior to arriving at a destination and/or prior to receiving a tracking module/wristband, for example, to setup user preferences, profile information, etc. Upon receiving a tracking module/wristband, the user may link it to their user account and/or phone by selecting the link wristband UI element 1740 and following the displayed instructions (e.g., placing a QR code associated with the tracking module/wristband in front of a camera of the device running the software application, entering in a set of characters/numerals associated with the tracking module/wristband, reading a code or set of characters/numerals associated with the tracking module/wristband into a microphone of the device running the software application, by using Bluetooth or other form of wired or wireless communication, etc.). By successfully linking the tracking module/wristband to the user account for the established timeframe, activity that is tracked or otherwise determined by the system in response to tracking the module/wristband will then be associated to the particular user account it is linked to. In circumstances where the module and/or wristband is returned to operators of the destination after use by the user, such module and/or wristband may then be de-linked from the user account and available to linking to a different user account at a subsequent time.

Figure 18:
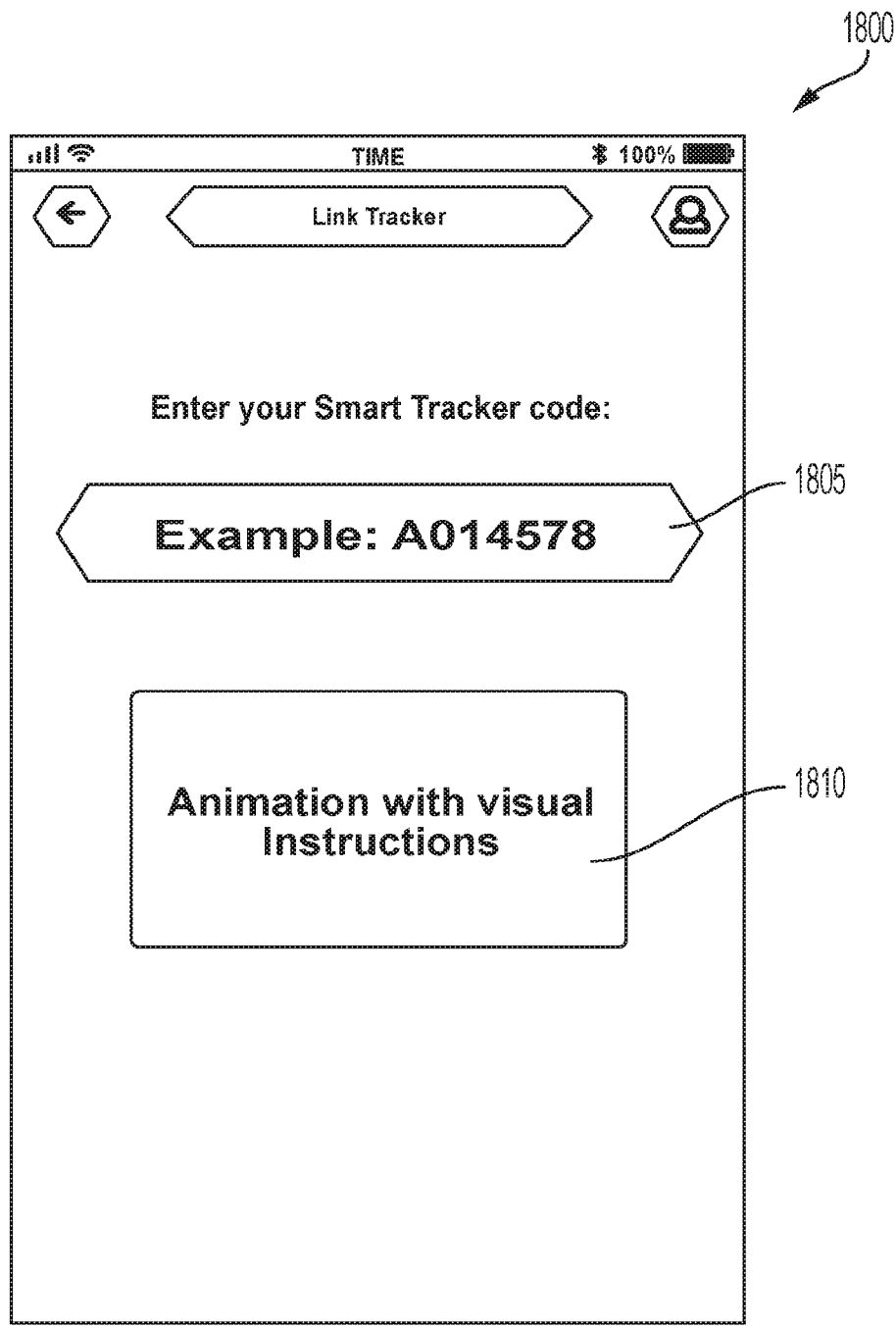
FIG. 18 illustrates a user-interface screen for a guest-centric link wristband page to be used with a system for tracking users and/or objects at a geographic location and configured to provide data and/or associated features, according to one exemplary embodiment of the invention.

For example, in one embodiment as shown in FIG. 18, a UI screen 1800 for a guest-centric link wristband page to be used with a system for tracking users and/or objects at a geographic location and configured to provide data and/or associated features may be displayed upon selecting the user profile UI element 1740. Instructions 1810 may be displayed to the user (e.g., via textual description and/or via graphical animation) to inform a user how to properly link a module or wristband, as previously discussed. An interface element 1805 may be provided to allowing the user to manually enter and/or scan in a barcode, QR code, or other manner of automatically associating a particular module or wristband with the user account.

Referring again to FIG. 17, a destination information UI element 1745 may be disposed in the main portion 1702 of the UI screen 1700. The system that is engaged with or interfaces with the software application having the UI screen 1700 and the destination information UI element 1745 may be configured to display a variety of information to a user that corresponds to the particular destination being visited by the user, or to potentially be visited by the user at a subsequent date, for example, as discussed in greater detail below. The destination information UI element 1745 may display the name and/or graphic associated with a particular destination (e.g., waterpark or amusement park) and be selectable by the user to display additional information associated with that destination (e.g., hours of operation, address, phone numbers, parking instructions, entrance fee or cost information, etc.).

Figure 23:
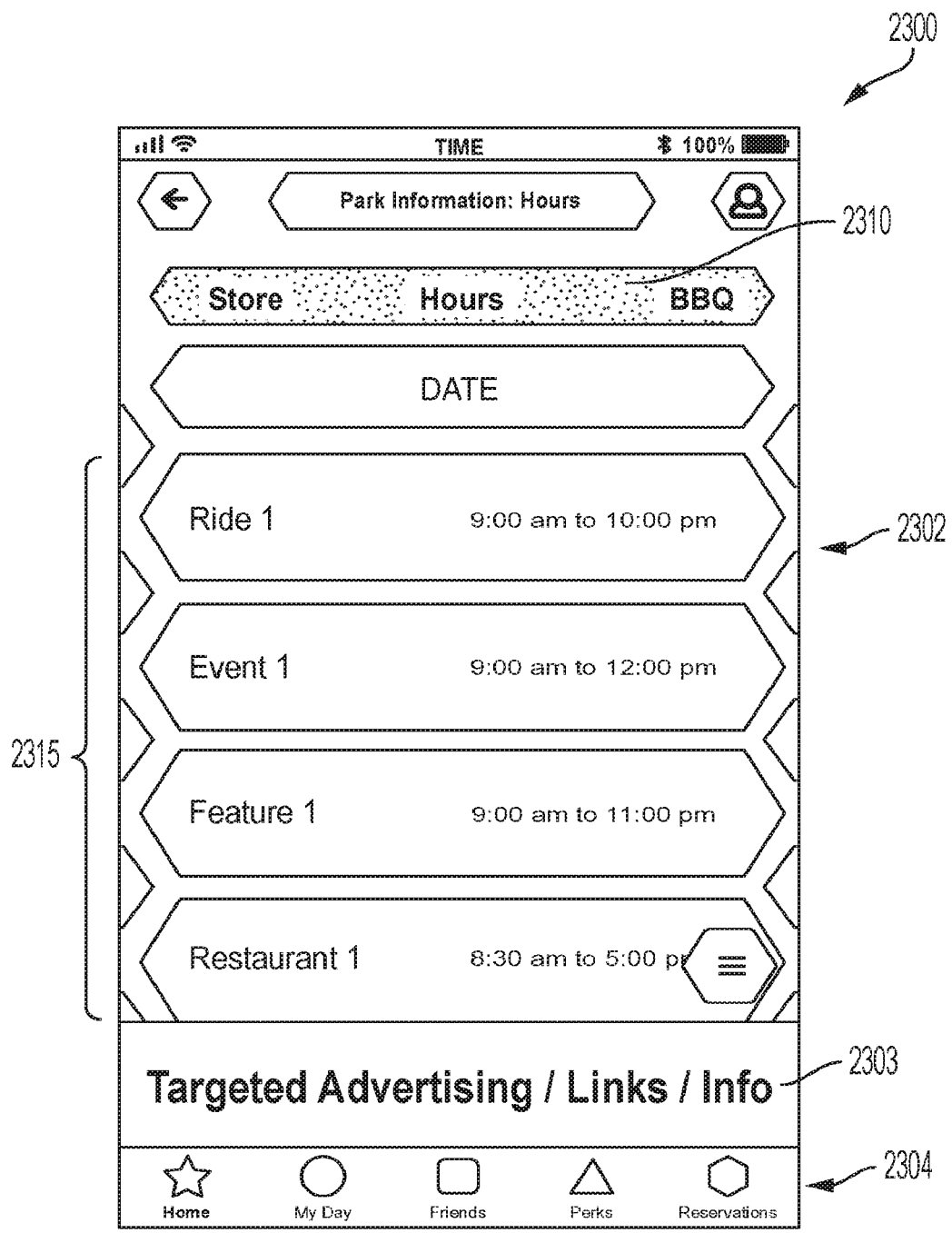
FIG. 23 illustrates a user-interface screen for a guest-centric park information page to be used with a system for tracking users and/or objects at a geographic location and configured to provide data and/or associated features, according to one exemplary embodiment of the invention.

For example, in one embodiment as shown in FIG. 23, a UI screen 2300 for a guest-centric park information page to be used with a system for tracking users and/or objects at a geographic location and configured to provide data and/or associated features may be displayed upon selecting the user profile UI element 1745. The UI screen 2300 for a guest-centric park information page may include a first portion, such as a main portion 2302, a second portion, such as an advertising and/or informational banner portion 2303, and a third portion, such as a bottom shortcut portion 2304, the same or similar to that discussed for the UI screen 1700. A user may choose a particular type of information desired by interfacing with an information-type interface element 2310 (e.g., hours, retail, food/menus, etc.) and corresponding information or data (e.g., park and/or one or more attraction hours may be displayed if the user chooses the "hours" information type) may be displayed in the main portion 2302 of the UI screen 2300. For example, as shown in the embodiment shown in FIG. 23, if "hours" is selected by the information-type interface element 2310, corresponding hour information 2315 for a plurality of rides, events, features, attractions, shows, restaurants, etc. may be displayed for a particular day or date.

Referring again to FIG. 17, a music preference UI element 1750 may also be disposed as part of UI screen 1700. The system that is engaged with or interfaces with the software application having the UI screen 1700 and the music preference UI element 1750 may be configured to allow a user to establish or modify a desired music (or other sound or audio theme preference). This preference may be used in any of a variety of ways to enhance the user experience, including setting the music/sound that is played by the software application to that of the user preference, setting the music/sound that is played on one or more attractions or venues at the destination (e.g., rides or entertainment activities that are located at the waterpark or amusement park), or otherwise setting the music/sound that is played based upon the user being within a sensed vicinity of a particular location at the destination (e.g., playing desired music or audio themes as the user travels within a vicinity of a billboard, rests at a cabana or pool chair, visits a kiosk, etc.), for example, as discussed in greater detail below.

Figure 21:
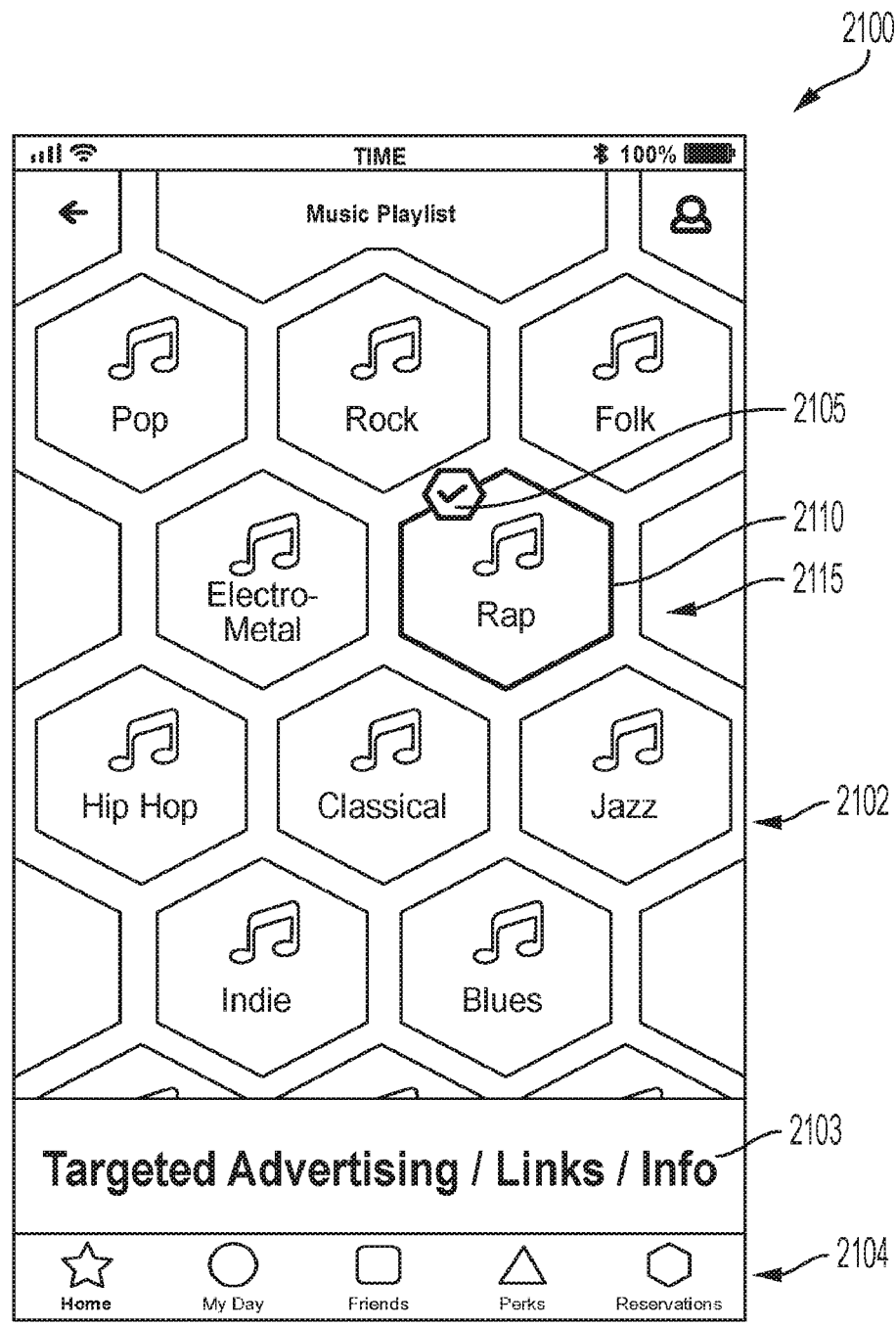
FIG. 21 illustrates a user-interface screen for a guest-centric music selection page to be used with a system for tracking users and/or objects at a geographic location and configured to provide data and/or associated features, according to one exemplary embodiment of the invention.

The music preference UI element 1750 may display a currently selected music preference (e.g., "Pop" type of music as shown) for the user profile presently being displayed. Upon selection of the music preference UI element 1750, additional music selection and/or customization options may be displayed for interaction by the user. For example, in one embodiment as shown in FIG. 21, a UI screen 2100 for a guest-centric music selection page to be used with a system for tracking users and/or objects at a geographic location and configured to provide data and/or associated features, may be displayed upon selecting the music preference UI element 1750. The UI screen 2100 for a guest-centric music selection page may include a first portion, such as a main portion 2102, a second portion, such as an advertising and/or informational banner portion 2103, and third portion, such as a bottom shortcut portion 2104, the same or similar to that discussed for the UI screen 1700.

As shown, UI screen 2100 for the music selection page may include a plurality of interface elements 2115 that correspond to different music genres or categories available for selection by the user. Upon selection of a particular genre or category, one or more indicators (e.g., visual indicators such as boundary highlighting or checkmarks) (2105, 2110) may be displayed or associated with the selected genre or category to indicate to the user the current selection. In certain embodiments, further music selection screens may be used, such as a screen that displays additional playlists, songs, or further selection options after the user has selected a particular music genre or category has been selected through interaction with one of the plurality of interface elements 2115. For example, for the "Rap" category, the user may be permitted to further select the desired type or subcategory of Rap music or playlist that is desired, such as "1990s Rap," "Top Hits," "Female Rappers," etc. In certain embodiments, the user may be permitted to choose individual songs and/or create their own playlists (e.g., choosing specific songs and/or the order of such songs), using songs that are made available by the system and/or by uploading their own songs or choosing playlists associated with one of the user's own music accounts, either created upon the system or through interfacing with third party music services or subscriptions.

Referring back to FIG. 17, a theme preference UI element 1755 is also shown. The system that is engaged with or interfaces with the software application having the UI screen 1700 and the theme preference UI element 1755 may be configured to allow a user to establish or modify a desired theme (or other audio-visual preference). This preference may be used in any of a variety of ways to enhance the user experience, including setting the audio-visual theme that is used by the software application to that of the user preference, setting the audio-visual theme that is used for one or more attractions or venues (e.g., lighting, audio effects, visuals displayed on monitors associated with the attractions or venues, etc.) at the destination (e.g., rides or entertainment activities that are located at the waterpark or amusement park), or otherwise setting the audio-visual theme that is played based upon the user being within a sensed vicinity of a particular location at the destination (e.g., displaying visuals and/or audio effects as the user travels within a vicinity of a billboard or monitor, rests at a cabana or pool chair, etc.), for example, as discussed in greater detail below.

Figure 22:
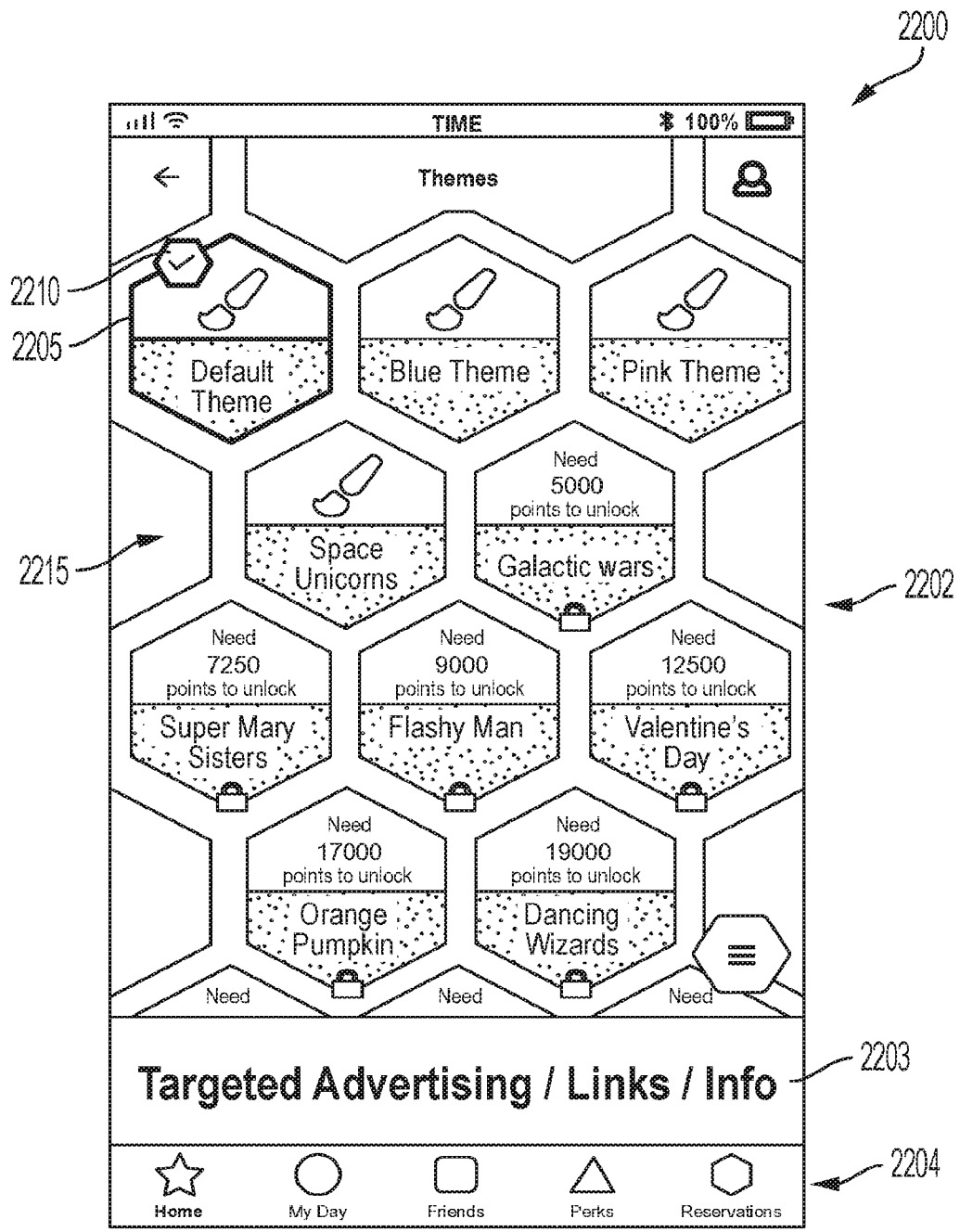
FIG. 22 illustrates a user-interface screen for a guest-centric theme selection page to be used with a system for tracking users and/or objects at a geographic location and configured to provide data and/or associated features, according to one exemplary embodiment of the invention.

The theme preference UI element 1755 may display a currently selected theme preference (e.g., "Default" as shown in FIG. 17) for the user profile presently being displayed. Upon selection of the theme preference UI element 1755, additional theme selection and/or customization options may be displayed for interaction by the user. For example, in one embodiment as shown in FIG. 22, a UI screen 2200 for a guest-centric theme selection page to be used with a system for tracking users and/or objects at a geographic location and configured to provide data and/or associated features, may be displayed upon selecting the theme UI element 1755. The UI screen 2200 for a guest-centric theme selection page may include a first portion, such as a main portion 2202, a second portion, such as an advertising and/or informational banner portion 2203, and third portion, such as a bottom shortcut portion 2204, the same or similar to that discussed for the UI screen 1700.

As shown, the UI screen 2200 for a theme selection page may include a plurality of interface elements 2215 corresponding to different themes or categories 2215 for selection by the user. Upon selection of a particular theme or category, one or more indicators (e.g., visual indicators such as boundary highlighting or checkmarks) (2205, 2210) may be displayed or associated with the selected theme or category to indicate to the user the current selection. In certain embodiments, further theme selection screens may be used, such as a screen that displays additional selection options after the user has interfaced with one of the plurality of interface elements 2215 to select a particular theme or category 2215 (e.g., for a "Holiday" theme category, the user may be permitted to further select the desired type or subcategory of holiday theme that is desired, such as "Birthday," "Christmas," etc.). Certain themes may require a user to unlock them in order for them to be used, for example, by payment of money and/or by other form of currency or points that the user has obtained, as discussed in greater detail throughout this application. In an alternative embodiment, a variety of possible customizations and/or preferences for the theming, look, feel, or otherwise, such as swapping or selecting of music, colors, images, fonts, etc.

Referring again to FIG. 17, a perks/points UI element 1760 is shown disposed in the main portion 1702 of the UI screen 1700. A perks/points shortcut UI element 1720 is also shown disposed in the bottom shortcut portion 1704 of the UI screen 1700. The system that is engaged with or interfaces with the software application having the UI screen 1700 and the perks/points UI element 1760 and/or the perks/points shortcut UI element 1720 may be configured to display information to the user that corresponds to points or other currency or rewards that a user has accumulated, for example, as discussed in greater detail below. The perks/points UI element 1760 may display a total number or value of perks/points for the user and be selectable by the user to display additional information associated with those perks/points.

Points or perks may take any of a variety of different forms. In one embodiment, the system may establish a point system or currency for users that allows users to trade and/or pay for various goods or services using the accumulated points or currency. For example, the user may purchase food, souvenirs, front-of-line or other access to attractions/venues (e.g., reservations to shows, restaurants, special lines or queues that bypass some or all of the traditional line or queue for an attraction, etc.), additional services associated with the destination, additional services or features associated with the software application, or any of a variety of other rewards or benefits to the user via payment with the user's accumulated points. In another example, the user may use points for attraction control, such as using points to control an amount of time that a user is permitted to perform a particular activity associated with a ride or attraction (e.g., an amount of time the user may operate a water cannon, the power of a stream of water exiting a water cannon, the amount of time that a user is permitted upon a ride, such as a surfing attraction whereby if a user has accumulated a certain number of points, badges, or other perks or currency, the user may be allowed to use the attraction for a greater amount of time than the default amount of time available for users.

The points may be purchased by the user (or for the user) with established currency (e.g., government issued currency, such as US dollars, either paying through the software or by visiting another kiosk, terminal, or employee associated with the destination in order to exchange currency for points), by trade-in from another form of currency established through a third party (e.g., a third party monetary provider such as a credit card company, bank, or other entity), and/or by participating in activities or by performing certain behaviours or actions that have been established as worth a particular point amount. Likewise, points earned by a user in one park or location may be converted for currency or goods/services established through a third party. For example, third party companies such as airlines, hotels, restaurants, entertainment venues such as amusement parks, retailers such as grocery stores, brick-and-mortar stores and/or online stores, gas stations, etc. may participate with the system in order to allow users to make purchases or obtain other benefits through the payment or trade of points earned by the user at the destination at such third party locations or vice versa.

The point values that may be obtained by users may be dynamically allocated (e.g., in real-time) based upon other data available to the system to aid in encouraging particular user behaviour. For example, a destination such as a waterpark or amusement park may have a large number of people waiting in a line for Attraction 1 and a comparatively small number of people waiting in a line for Attraction 2. The number of people waiting in each line may be known to the system via tracking of users, as disclosed throughout this specification and drawings. In order to encourage users to ride Attraction 2, rather than Attraction 1 (e.g., in order to spread people at the destination out, increase user enjoyability, etc.) a number of points may be dynamically adjusted or established (e.g., provide additional points to users that ride Attraction 2 versus the points provided for riding Attraction 1) so that a user would be encouraged to ride Attraction 2 in order to accumulate those points. If the line begins to increase at Attraction 2 such that another attraction would subsequently be more desirable for increased user participation, the points may again be dynamically adjusted or established such that users would be encouraged to move toward and/or ride the other attraction. In certain embodiments, such dynamic and/or real-time adjustment may increase the useful life of a particular attraction, such as older and/or less popular attractions, and/or provide secondary benefits to park owners and/or operators, such as by increasing revenue, providing dynamic and/or real-time crowd control, increasing customer satisfaction (e.g., by reducing wait times), etc.

In this fashion, user participation at various locations, venues, attractions, etc. throughout a destination may be dynamically adjusted in order to influence crowd control or otherwise encourage user behaviour as desired. Similarly, if a particular vendor at the destination has seen low traffic, it may be desirable to increase a number of points awarded to users to partake in visiting that vendor. Further, if the destination has a surplus of a particular item, food, etc. a number of points may be increased for user purchases of that particular item, food etc. to encourage such purchases.

Figure 24:
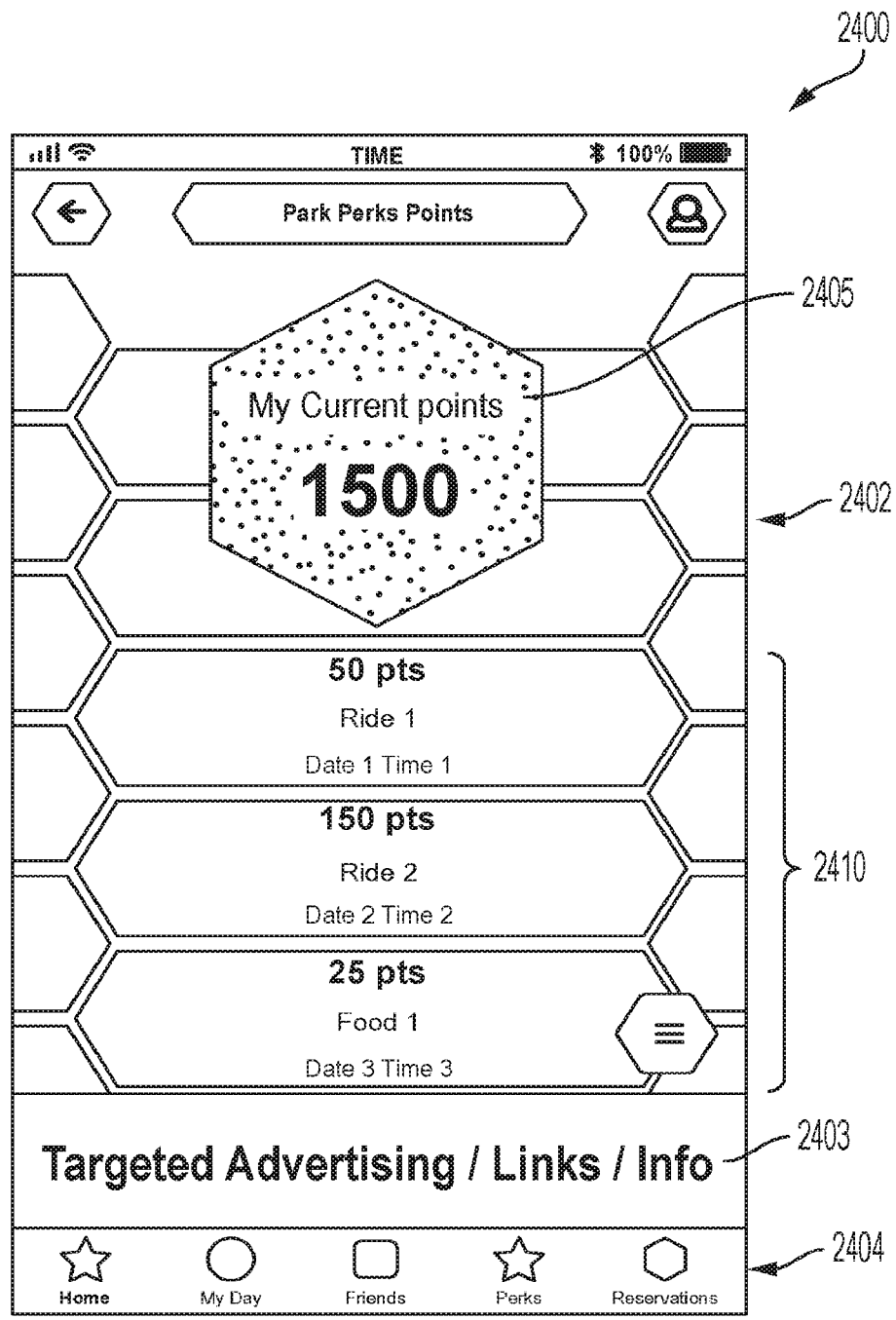
FIG. 24 illustrates a user-interface screen for a guest-centric perks page to be used with a system for tracking users and/or objects at a geographic location and configured to provide data and/or associated features, according to one exemplary embodiment of the invention.

For example, in one embodiment as shown in FIG. 24, a UI screen 2400 for a guest-centric perks page to be used with a system for tracking users and/or objects at a geographic location and configured to provide data and/or associated features may be displayed upon selecting the user profile UI element 1760. The UI screen 2400 for a guest perks page may include a first portion, such as a main portion 2402, a second portion, such as an advertising and/or informational banner portion 2403, and a third portion, such as a bottom shortcut portion 2404, the same or similar to that discussed for the UI screen 1700. A current amount of points UI element 2405 indicates the current amount of points that have been accumulated for the user. A history of the accumulation of such points (e.g., how, when, and in what amount such points were accumulated for particular activities) may show in one or more UI element(s) 2410. Thus, a user can easily see how the current point value shown in the UI element 2405 was obtained (e.g., by riding on particular rides at particular times, by purchasing items at particular times, etc.).

Referring again to FIG. 17, a reservations UI element 1735 is shown disposed in the main portion 1702 of the UI screen 1700. A reservations shortcut UI element 1725 is also shown disposed in the bottom shortcut portion 1704 of the UI screen 1700. The system that is engaged with or interfaces with the software application having the UI screen 1700 and the reservations UI element 1735 and/or the reservations shortcut UI element 1725 may be configured to display information to the user that corresponds to reservations (e.g., event, venue, restaurant reservations, etc.) and/or times that have been reserved to allow the user fast access (e.g., front-of-line, separate line or queue, etc.) to one or more particular rides or attractions, for example, as discussed in greater detail below. The reservations UI element 1735 may display the particular ride or attraction that had been reserved by or for the user that is next up. In some embodiments, the restaurant, event, venue, attraction, or other activity for which the reservation has been made may additionally or alternatively be displayed by the reservations UI element 1735.

Reservations may be made available for users by a variety of possible options. For example, a user may have a predetermined number of potential reservations made available to them by way of performing various activities (e.g., downloading the software application and/or registering an account, purchasing an entry ticket for the destination, etc.). In certain embodiments, a user may be permitted to purchase reservation timeslots using government-issued currency (e.g., US Dollars). In still other embodiments, a user may be permitted to purchase reservation timeslots by way of trading in destination-particular currency and/or currency associated with the software application or system, such as perks/points previously discussed, for example, for UI element 1760 and/or FIG. 24. In certain embodiments, a user may be rewarded by reservations, priority, and/or the ability to secure a reservation by completion of one or more tasks setup by the system (e.g., dynamic and/or real-time objectives to be completed that are determined by the system based upon tracking of users and/or objects).

Figure 25:
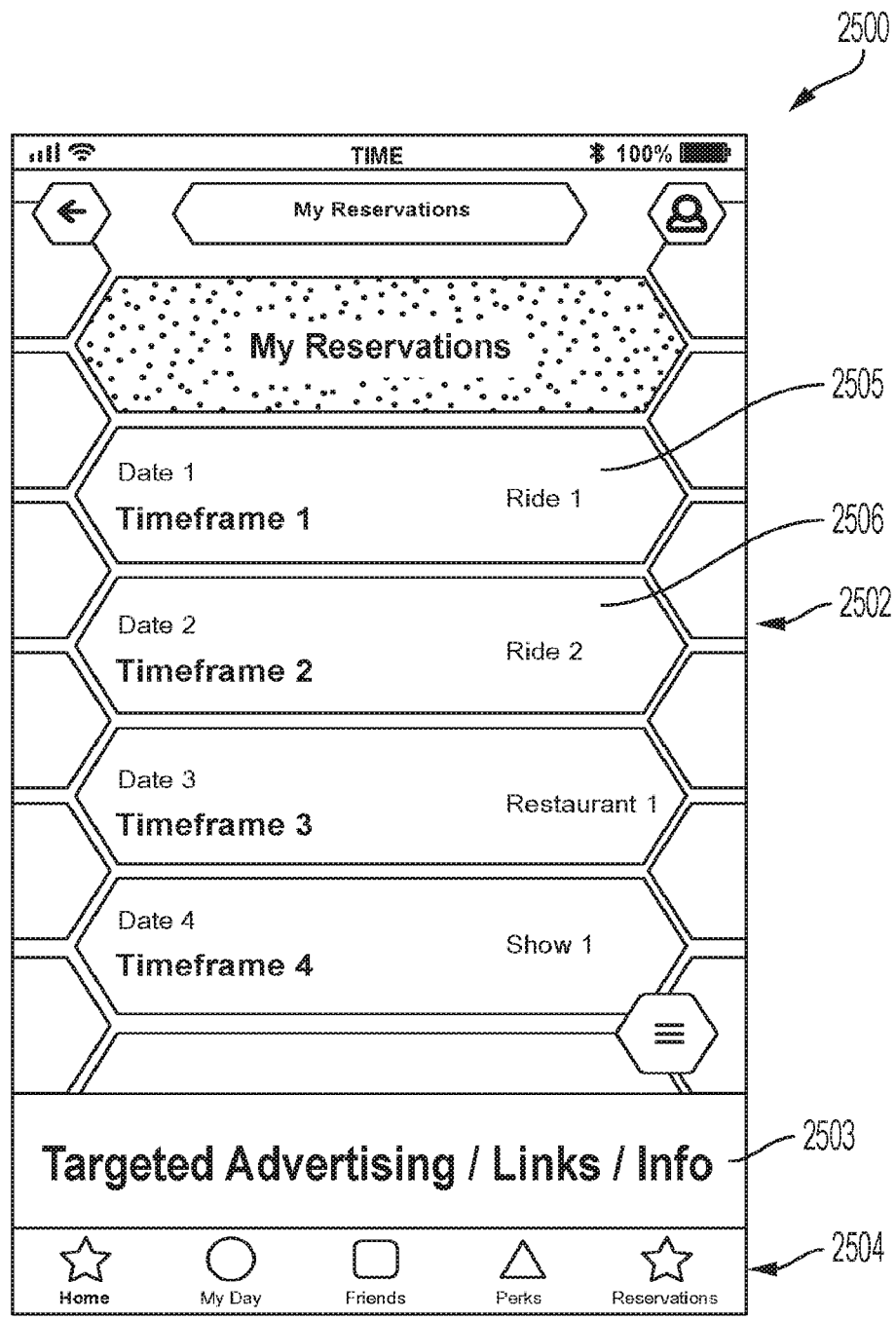
FIG. 25 illustrates a user-interface screen for a guest-centric reservations page to be used with a system for tracking users and/or objects at a geographic location and configured to provide data and/or associated features, according to one exemplary embodiment of the invention.

In one embodiment as shown in FIG. 25, a UI screen 2500 for a guest-centric reservations page to be used with a system for tracking users and/or objects at a geographic location and configured to provide data and/or associated features may be displayed upon selecting the reservations UI element 1735. The UI screen for a guest-centric reservations page 2500 may include a first portion, such as a main portion 2502, a second portion, such as an advertising and/or informational banner portion 2503, and a third portion, such as a bottom shortcut portion 2504, the same or similar to that discussed for the UI screen 1700. A listing of the currently setup reservations that have been established by or for the user, along with their respective data, are displayed in the main portion 2502 of the reservations page 2500.

For example, as shown, a first reservation on Date1 for an attraction titled "Ride1" has been established for the Timeframe1 timeslot. Accordingly, the user would be able to head to the attraction titled "Ride1" during that timeslot (or during some range of time + and/or − that timeslot in certain embodiments) and be permitted to either access the attraction and/or be given some special access (e.g., front-of-line access, separate queue line access only for those users with reservations and/or other status). Also as shown, a second reservation on Date2 (e.g., later in time than the first reservation) for an attraction titled "Ride2" has been established for the Timeframe2 timeslot. Accordingly, the user would be able to head to the attraction titled "Ride2" during that timeslot (or during some range of time + and/or − that timeslot in certain embodiments) and be permitted to either access the attraction and/or be given some special access (e.g., front-of-line access, separate queue line access only for those users with reservations and/or other status). Timeframe1 and/or Timeframe2 may be particular times or ranges of time in varying embodiments. As previously discussed, the user may be able to modify (e.g., add, delete, change) reservations to different attractions and/or activities as desired, for example by redeeming points, paying with currency, trading reservation times, or by using or claiming an available open reservation timeslot.

In one embodiment, the number of available reservations for a particular attraction or venue may be based upon data being tracked by the system (e.g., a number of dispatches of the particular attraction or venue within a particular timeframe, volume of users entering the ride over a particular time period, etc.). Accordingly, reservation availability may be dynamically adjusted or established (e.g., in real-time) based upon an up-to-date and/or changing dispatch rate (e.g., for that particular day or timeframe).

Figure 26:
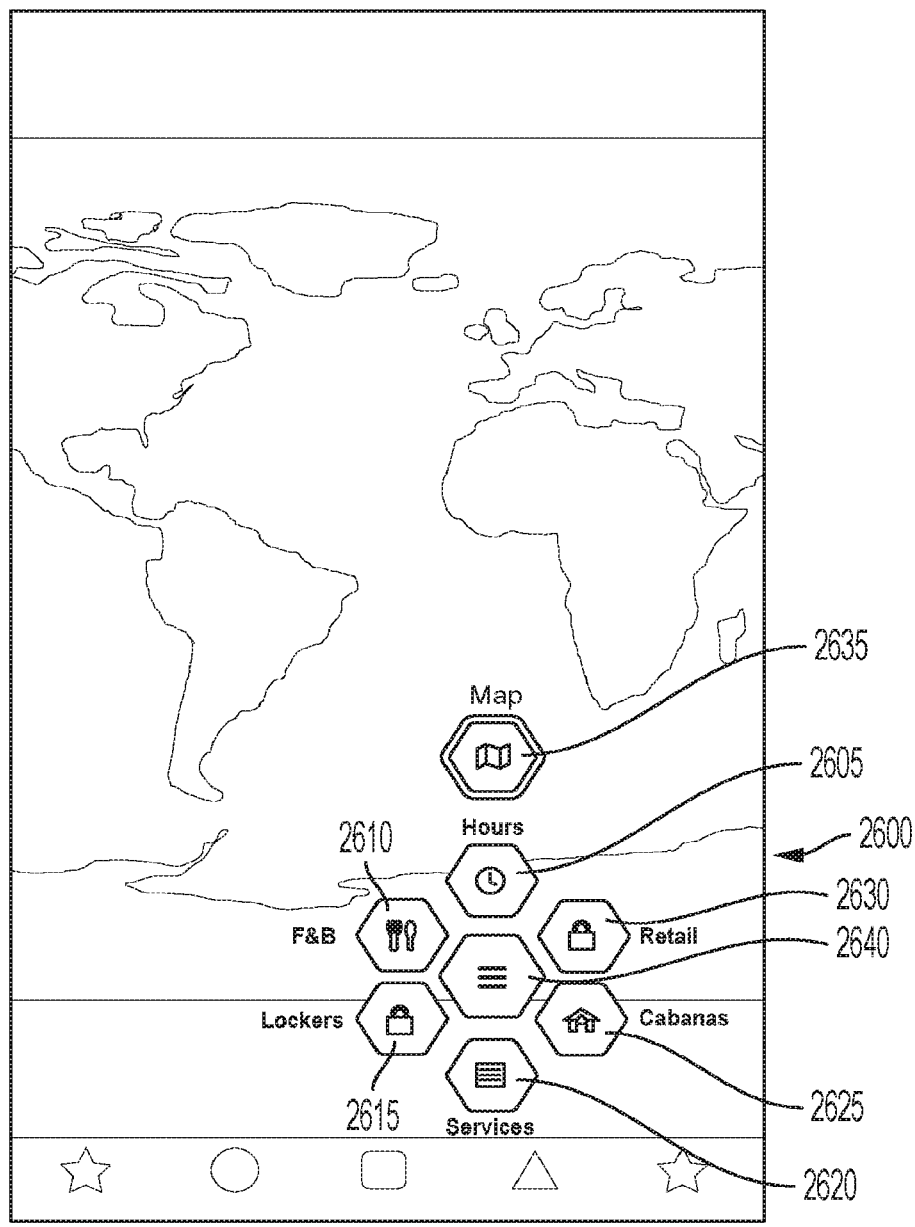
FIG. 26 illustrates a handheld user-interface screen for a contextual user input menu to be used with a system for tracking users and/or objects at a geographic location and configured to provide data and/or associated features, according to one exemplary embodiment of the invention.

FIG. 26 shows a UI screen for a contextual user input menu 2600 to be used with a system for tracking users and/or objects at a geographic location and configured to provide data and/or associated features that may be provided or present on any of a variety of possible UI screens, such as those previously discussed, to provide quick access to particular UI screens and/or other features of the software application. The contextual user input menu 2600 may have its links or UI elements modified depending upon the UI screen that is currently displaying immediately prior to the user opening up the input menu 2600. For example, if the underlying UI screen is one relating to information corresponding to a particular destination (e.g., amusement park or waterpark hours, etc.), upon a user interacting (e.g., pressing, holding, clicking, etc.) upon the contextual user input menu 2600 or otherwise invoking the contextual user input menu 2600 (e.g., long-pressing or pressing with a particular amount of force upon a display screen, etc.) while on the destination information UI screen, the following links may show up as part of the contextual user input menu 2600 due to the underlying context of park information: hours 2605, food & beverage 2610, lockers 2615, services 2620, cabanas 2625, retail 2630, map(s) 2635, etc. Clicking on those links would bring up corresponding additional data and/or user interface elements or screens, accordingly. In one embodiment, a user may close the contextual user input menu 2600 by clicking, pressing, releasing, or otherwise modifying their manipulation of element 2640 of the user input menu 2600.

In certain embodiments, in addition to a software application that is configured to run upon a mobile device, such as a smart phone, that is associated with a user or guest to a destination, kiosks or other hardware may be provided that can be accessed by users to similarly interact with a system. Any of the functions or features previously discussed for the software application configured to run upon the mobile device of a user may similarly be available upon a software application configured to run on a kiosk or other hardware of the destination. For example, such kiosk or other hardware for access by users may be beneficial to users who find it undesirable to carry mobile electronic devices around while at the destination, are too young to have mobile electronic devices of their own, or for a variety of other reasons.

Figure 27:
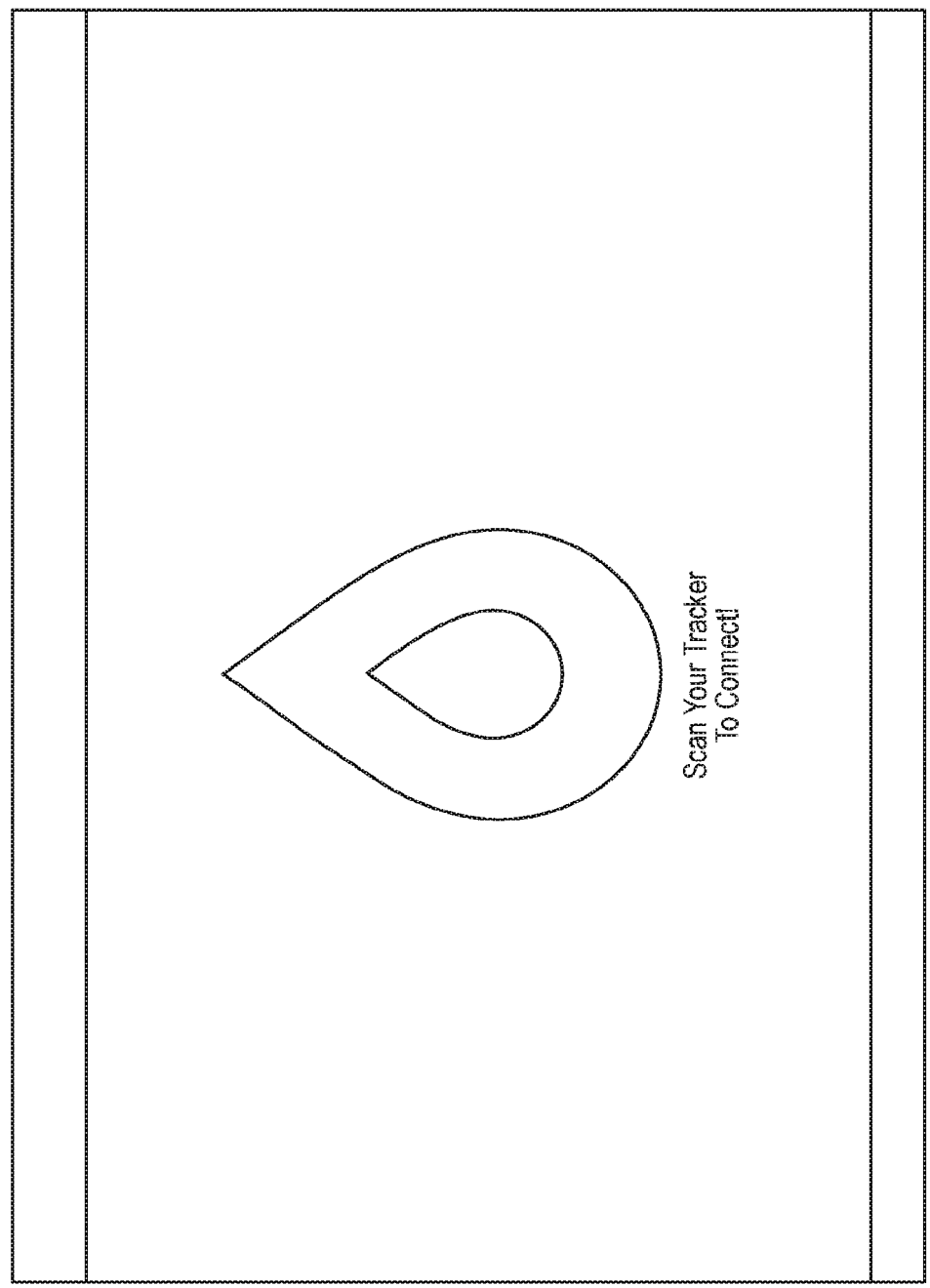
FIG. 27 illustrates a kiosk user-interface screen for a guest-centric splash screen to be used with a system for tracking users and/or objects at a geographic location and configured to provide data and/or associated features, according to one exemplary embodiment of the invention.

FIG. 27 shows a kiosk UI screen 2700 for a guest-centric splash screen to be used with a system for tracking users and/or objects at a geographic location and configured to provide data and/or associated features. Since a kiosk may be accessed by multiple users, such a splash screen or other blank, initial, or instructional screen may be provided when the software application of the kiosk is not presently associated or linked with a particular user. In such a case, as shown, the UI screen 2700 for a splash screen may instruct a potential user to "scan" in or otherwise identify himself or herself to the kiosk (e.g., by holding their wristband or other trackable element up to a requisite scanner, for example, as discussed). Upon appropriately scanning in, once the software application running on the kiosk has become associated with a particular user, a home page or other user-specific information may be displayed, as discussed throughout this application. Once finished using the kiosk, the user may be prompted to sign out so that the kiosk can be associated with a subsequent new guest and/or the kiosk may automatically sign the user out after a predetermined period of time (e.g., after non-use), or after some other determinable event (e.g., after the user is tracked as moving a distance away from the kiosk, etc.), at which point the kiosk may again display the UI screen 2700 corresponding to a splash screen to indicate it is ready to accept a new user sign-in.

Figure 28:
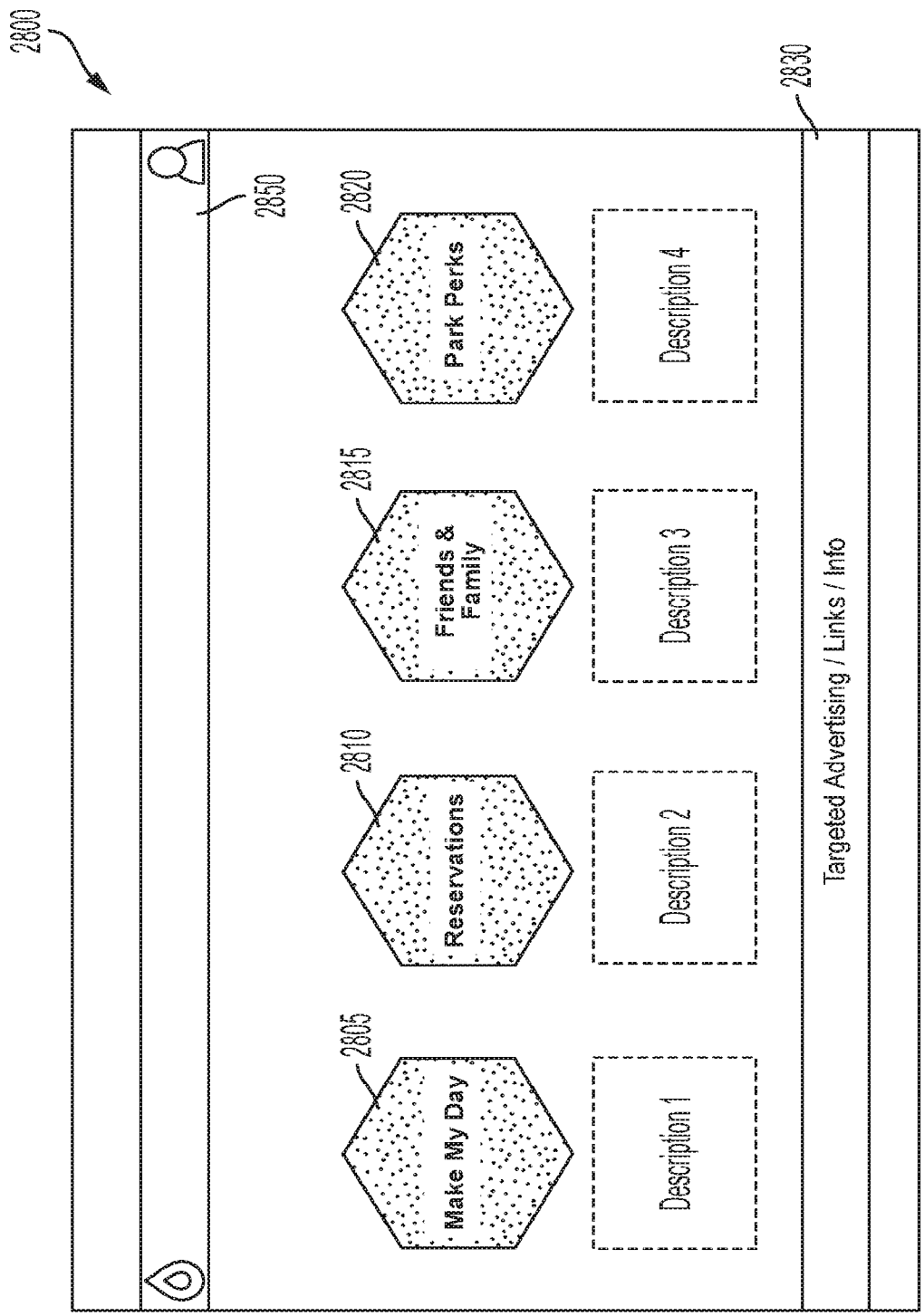
FIG. 28 illustrates a kiosk user-interface screen for a guest-centric homepage to be used with a system for tracking users and/or objects at a geographic location and configured to provide data and/or associated features, according to one exemplary embodiment of the invention.

FIG. 28 shows a kiosk UI screen 2800 for a guest-centric homepage to be used with a system for tracking users and/or objects at a geographic location and configured to provide data and/or associated features. The UI screen 2800 for a homepage may be displayed up a user signing in or otherwise being identified by the kiosk or system, for example, as discussed for FIG. 27. The same as or similar to previous discussions, the UI screen 2800 includes a variety of UI elements that perform functions or features the same as or similar to previous discussions, for example, discussed for FIG. 17 and/or FIGS. 18-26. The UI screen 2800 may include an advertising and/or informational banner section 2830 that displays coupons, advertisements, information, etc. (e.g., either pre-established or dynamically changing) to a user. The particular advertisements or info in section or banner 2830 may be modified to the particulars of each user (e.g., may be targeted advertising), based upon data collected or known about each user (e.g., age, gender, tracked information such as which attractions have been visited, zip code, etc.). In an alternative embodiment, the advertising may not be based on any particulars of the user that is signed in.

Figure 29:
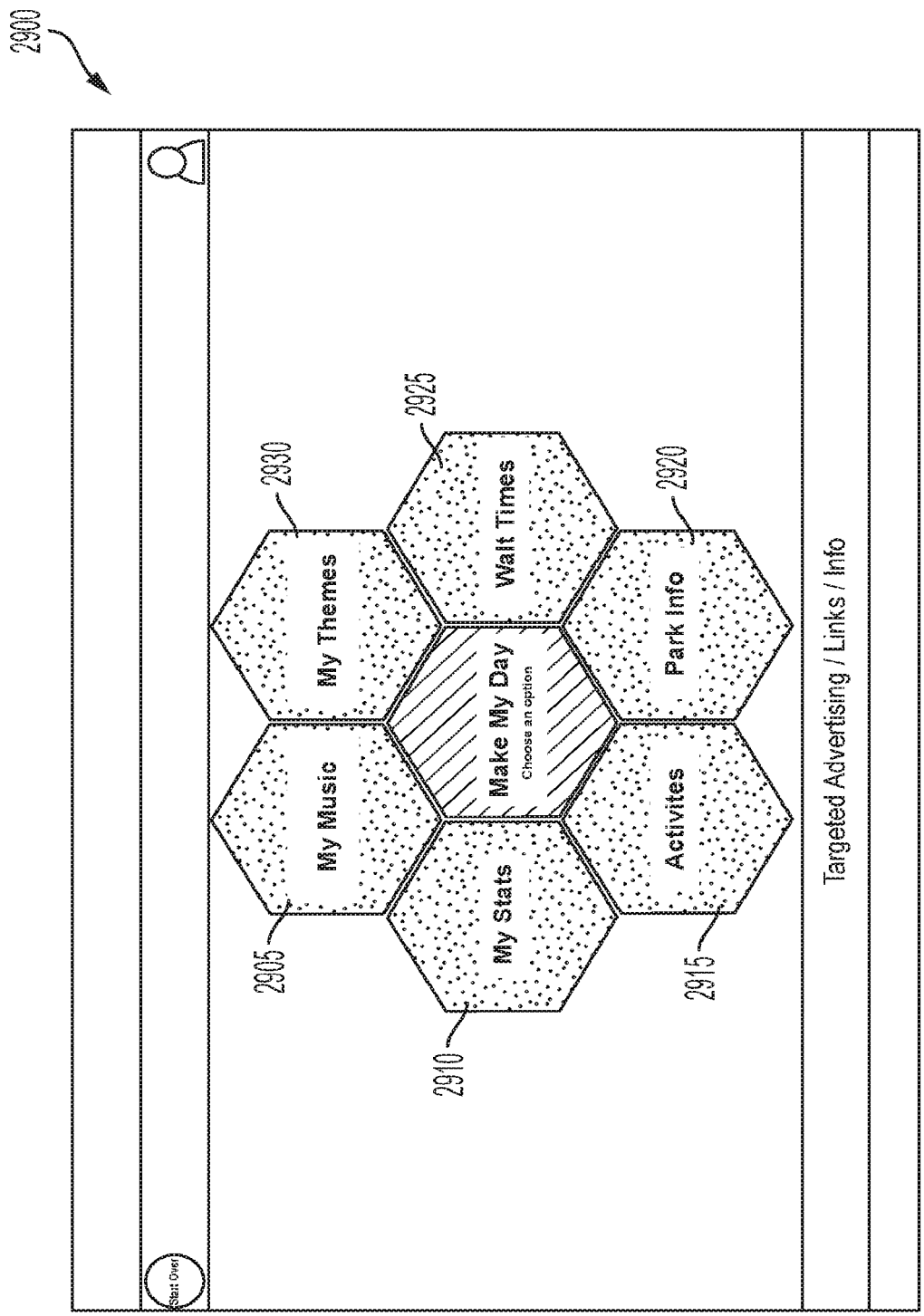
FIG. 29 illustrates a kiosk user-interface screen for a guest-centric day activity page to be used with a system for tracking users and/or objects at a geographic location and configured to provide data and/or associated features, according to one exemplary embodiment of the invention.
Figure 30:
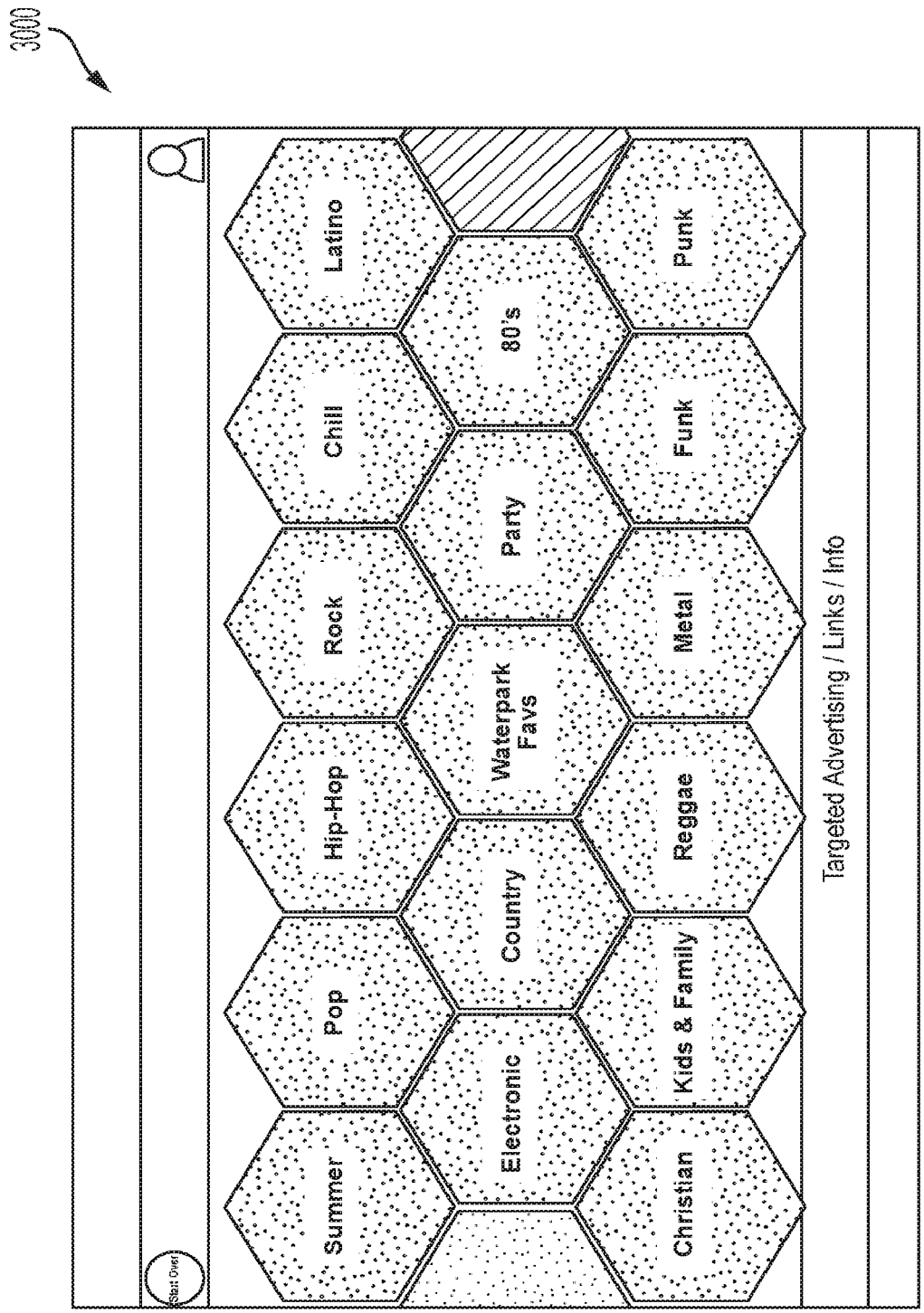
FIG. 30 illustrates a kiosk user-interface screen for a guest-centric music category selection page to be used with a system for tracking users and/or objects at a geographic location and configured to provide data and/or associated features, according to one exemplary embodiment of the invention.
Figure 31:
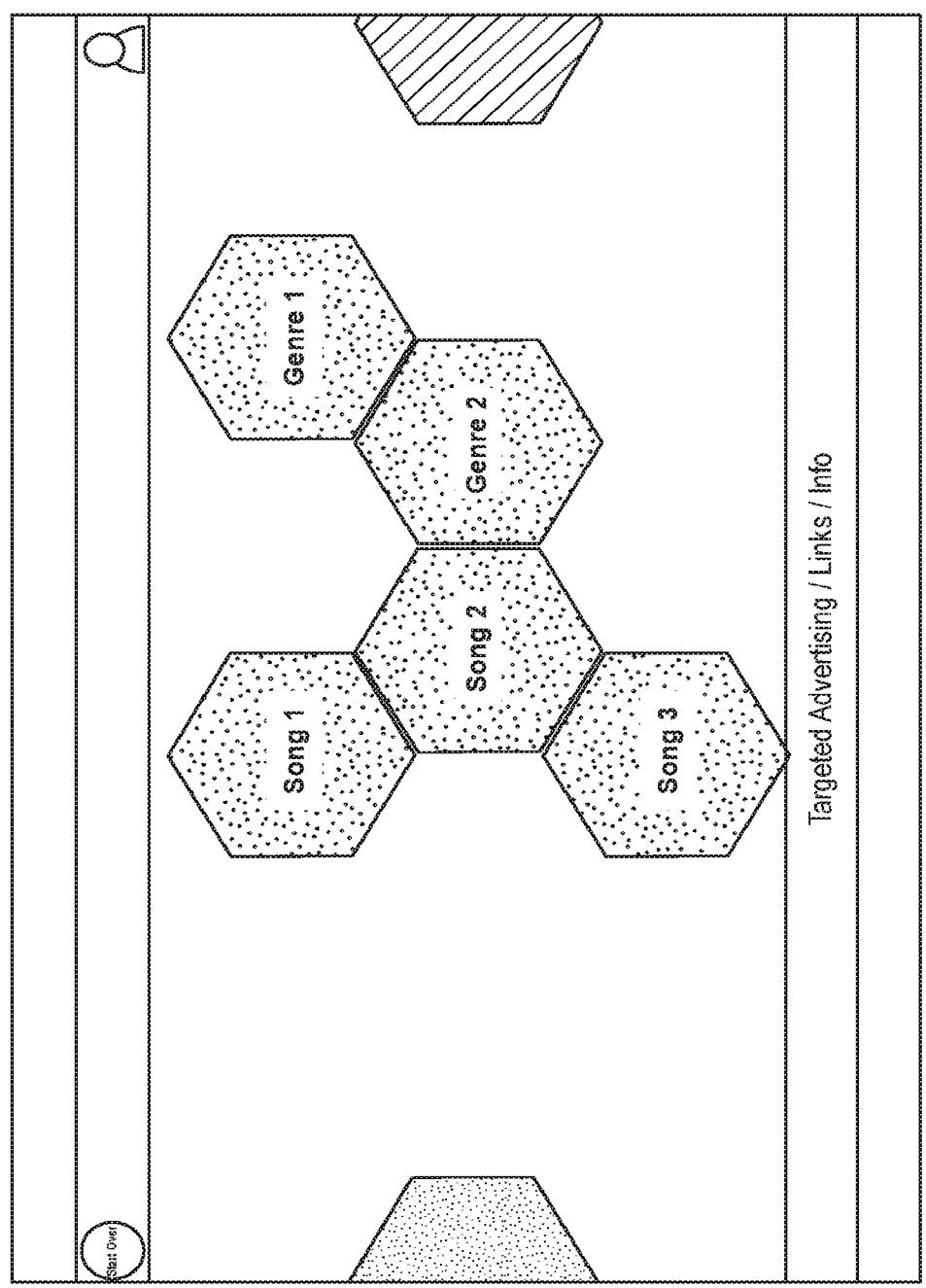
FIG. 31 illustrates a kiosk user-interface screen for a guest-centric music playlist selection page to be used with a system for tracking users and/or objects at a geographic location and configured to provide data and/or associated features, according to one exemplary embodiment of the invention.

A day activity (e.g., "Make My Day") UI element 2805 may be interacted with by a user (e.g., by touching the day activity UI element 2805 on a touchscreen of the kiosk). The day activity UI element 2805 may be associated with a textual Description) and/or imagery to indicate to a user the type of features available by selecting the day activity UI element 2805 (e.g., personalization of the user experience, such as through music selections, themes, viewing of user statistics or preferences or characteristics, etc.). FIG. 29 illustrates a kiosk UI screen for a guest-centric day activity page 2900 to be used with a system for tracking users and/or objects at a geographic location and configured to provide data and/or associated features. The day activity page 2900 includes a variety of UI elements for providing features or functionality the same as or similar to those previously discussed, for example, for FIG. 17 and/or FIG. 20. For example, a music customization UI element 2905 may allow a user to choose music, the same as or similar to the previous disclosure, such as for FIG. 17 and/or FIG. 20 and/or FIG. 21. In one embodiment, upon interacting with the music customization UI element 2905, a further page (or pages) or pop-up (or pop-ups) may be displayed to a user, such as music category page 3000 of FIG. 30 containing various selectable music categories and/or music playlist page 3100 containing various selectable music playlists (e.g., obtained after selecting a music category on page 3000), the same as or similar to the previous disclosures, such as of FIG. 17, FIG. 20, and/or FIG. 21.

Certain UI elements shown in FIG. 29 may include features or operation that are the same as or similar to those previously discussed. A user statistics UI element 2910 may allow a user to view their badges or other statistics or metrics, for example, similar to the previous disclosure for FIG. 20. A user activities UI element 2915 may allow a user to view their activities, for example, similar to the previous disclosure for FIG. 20. A destination (e.g., park) info UI element 2920 may allow a user to see destination-specific information, for example, similar to the previous disclosure for FIG. 17 and/or FIG. 20 and/or FIG. 23. A wait times UI element 2925 may allow a user to view the wait, queue, or line times for attractions or other venues, for example, similar to the previous disclosure for FIG. 20. A theme customization UI element 2930 may allow a user to choose a theme, for example, similar to the previous disclosure for FIG. 17 and/or FIG. 20 and/or FIG. 22.

Figure 32:
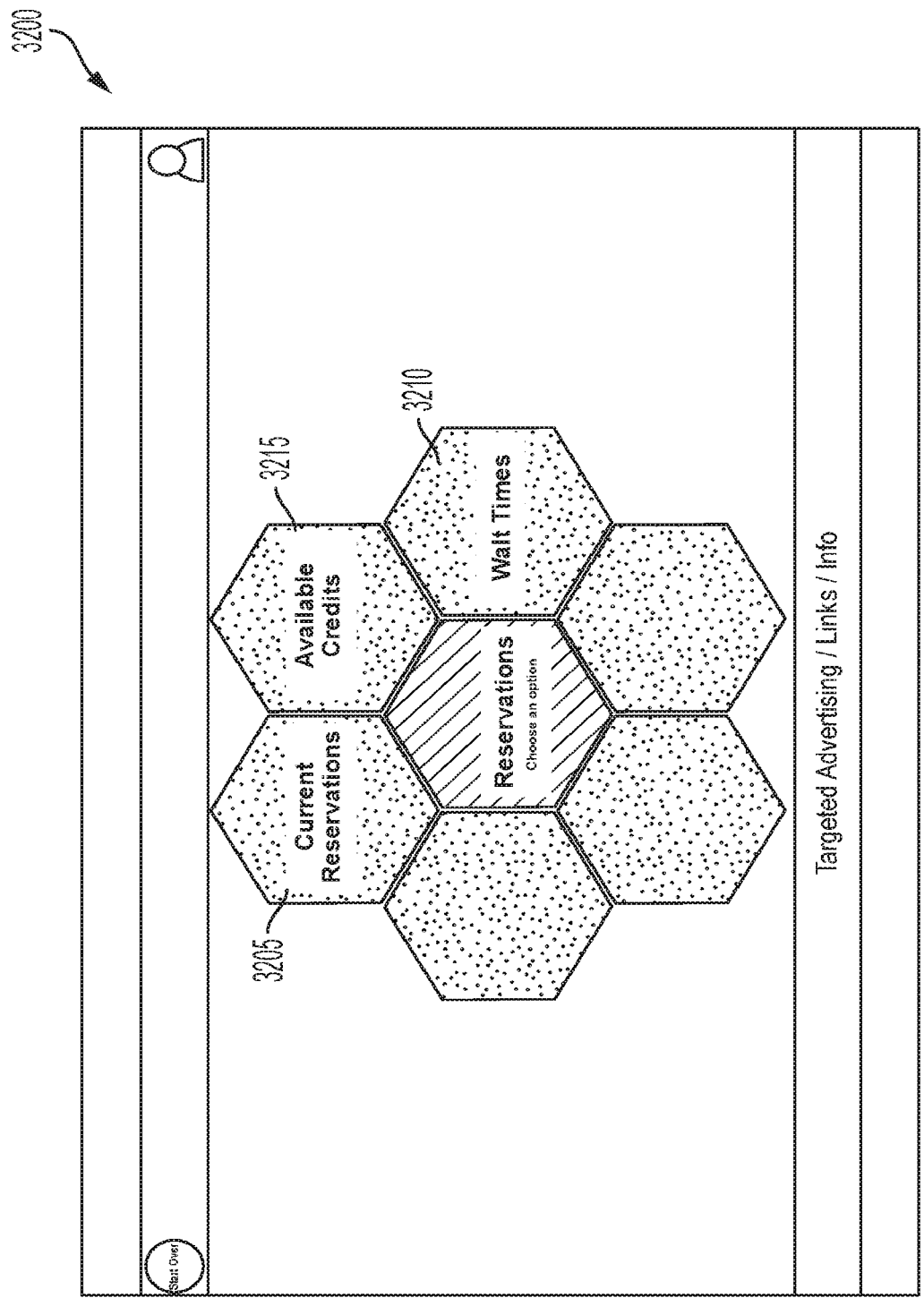
FIG. 32 illustrates a kiosk user-interface screen for a guest-centric reservation page to be used with a system for tracking users and/or objects at a geographic location and configured to provide data and/or associated features, according to one exemplary embodiment of the invention.

Referring back to FIG. 28, a reservation UI element 2810 may be interacted with by a user (e.g., by touching the UI element 2810 on a touchscreen of the kiosk). The reservation UI element 2810 may be associated with a textual Description2 and/or imagery to indicate to a user the type of features available by selecting the reservation UI element 2810 (e.g., viewing and/or setting up or choosing particular restaurant, attraction, or ride reservations, front-of-line access or credits, etc.). FIG. 32 shows a kiosk UI screen 3200 for a guest-centric reservation page to be used with a system for tracking users and/or objects at a geographic location and configured to provide data and/or associated features. The UI screen 3200 for a reservation activity page includes a variety of UI elements for providing features or functionality the same as or similar to those previously discussed, for example, for FIG. 17 and/or FIG. 25. In one embodiment, a current reservations UI element 3205 may be selected by a user in order to view reservations that have already been established for the user (e.g., a reservation for a restaurant, event, venue, attraction, or activity at a particular time or time range. An available credit UI element 3215 may be selected by a user in order to view the amount of currency (e.g., actual currency, such as government issued currency, or virtual currency or destination or software established currency such as credits, points, redemption tickets, etc.) that may be used by the user in order to make reservations. For example, a user who visits a waterpark may be permitted a particular number of reservation passes that can be used for fast or front-of-line access to various attractions at the waterpark. The user may be permitted to purchase additional fast or front-of-line access to various attractions if desired by paying for such access, redeeming rewards (e.g., points or perks as disclosed throughout this application), etc. A wait times UI element 3210 may be selected by a user in order to view wait, queue, or line times for the various events, attractions, venues, etc. at the destination. Such information may be beneficial for a user to decide how to setup or time their reservations or potential reservations. The wait times displayed may be current wait times and/or may be estimated wait times (e.g., future wait times) based on analysis of data within the system, for example, data concerning the number and/or tracking of users throughout the destination on that day or time of year.

Figure 33:
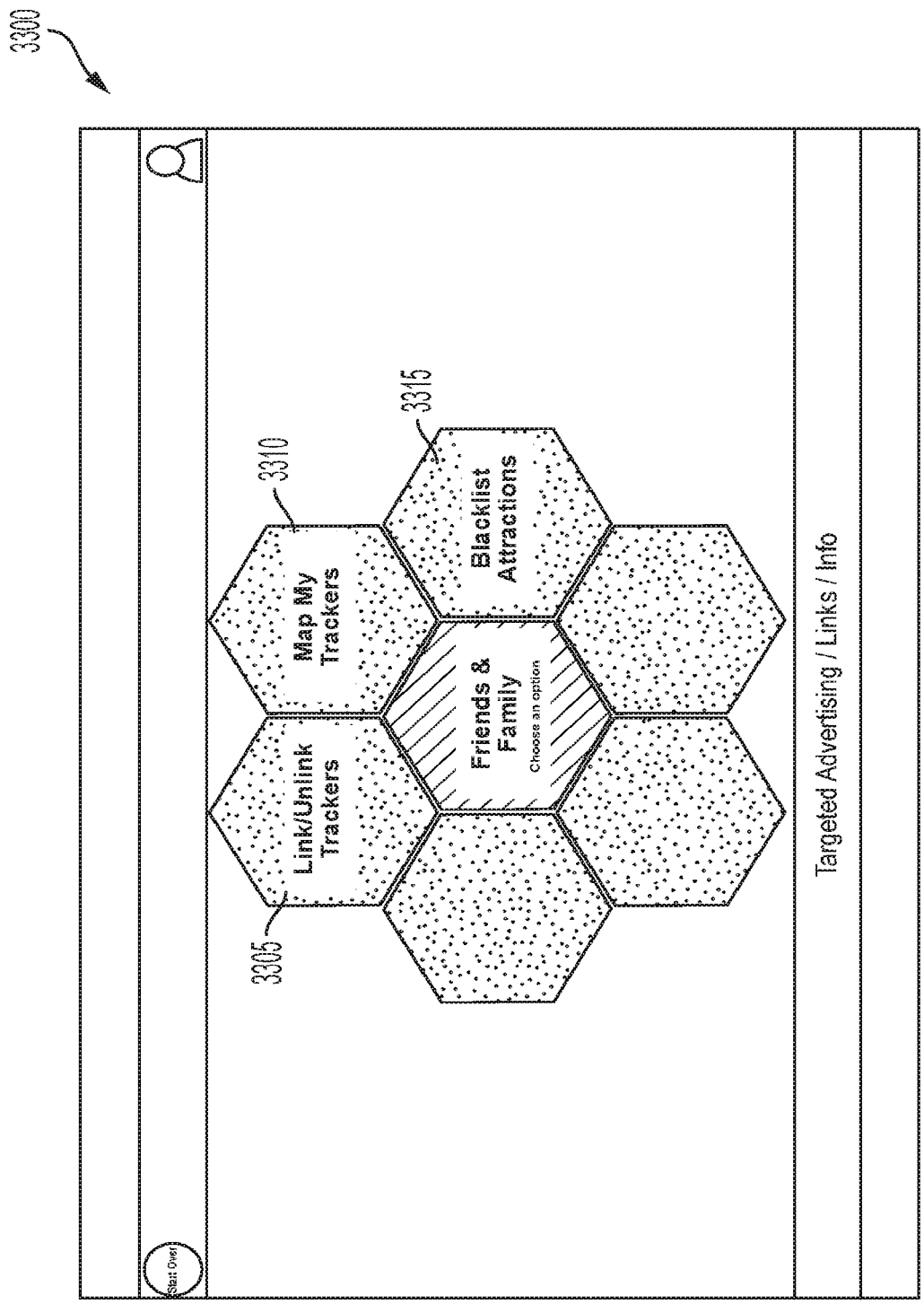
FIG. 33 illustrates a kiosk user-interface screen for a guest-centric friends or family page to be used with a system for tracking users and/or objects at a geographic location and configured to provide data and/or associated features, according to one exemplary embodiment of the invention.

Referring again to FIG. 28, a family or friends UI element 2815 may be interacted with by a user (e.g., by touching the UI element on a touchscreen of the kiosk). The family or friends UI element 2815 may be associated with a textual Description3 and/or imagery to indicate to a user the type of features available by selecting the family or friends UI element 2815 (e.g., linking other user's tracking devices together, establishing links to social media accounts and/or other forms of messaging or sharing of user location or activity, etc.). FIG. 33 shows a kiosk UI screen 3300 for a guest-centric friends or family page to be used with a system for tracking users and/or objects at a geographic location and configured to provide data and/or associated features. The UI screen 3300 for a family or friends page 3300 includes a variety of UI elements for providing features or functionality the same as or similar to those previously discussed, for example, for FIG. 17 and/or FIG. 18. For example, a link/unlink UI element 3305 may be selected by a user in order to establish a link or association between multiple different wristbands or other trackable module, capsule, or hardware. For example, in one embodiment, a family may include two adult parents or guardians and two minor children. Although each of the four family members may have their own trackable element (e.g., wristband) that is configured to track or sense their movement and/or activities throughout the destination, it may be desirable for the four trackable elements to be associated or linked with one another to support various family or friend features. Accordingly, one user for the family (e.g., one of the two parents or guardians) may interact with the link/unlink UI element 3305 in order to manually enter IDs associated with the other family members, scan information (e.g., QR codes) associated with the other family members or their hardware, etc. to establish a link Once linked, various features or functionality may be available for all or some of the users in that linked family.

In one embodiment, linked members may be able to send messages to one another (e.g., text, voice, haptic feedback, etc.). In certain embodiments, as shown in FIG. 33, a mapping UI element 3310 may be interacted with by all (or some smaller subset) of the linked members of a family or friends group in order to see a location of one or more of the linked members. This information may be conveyed by a graphical map pinpointing the last known location and/or activity of a particular user that is linked with other users and/or with a textual description of the last known location and/or activity, etc. FIG. 33 also includes a blacklist UI element 3315 that may be interacted with by all (or some smaller subset) of the linked members of a family or friends group in order to limit participation by certain members on certain attractions. For example, if a parent decides they do not wish for one or more of their children to play or participate on one or more particular attractions and/or go to particular venues or areas of a destination, that parent may setup permission restrictions (e.g., blacklist) those particular attractions, venues, areas, etc. individually for each of the individual linked members or for a group of linked members. In some embodiments, each user may have a parameter associated with them indicating whether they are a minor or an adult, whereby only adults in a group would be permitted to edit permissions or otherwise modify aspects of another linked user's experience (e.g., change music settings, make purchases with currency, etc.). In other embodiments, each user may have a modifiable parameter associated with them that indicates whether another party should be allowed to edit permissions or otherwise modify aspects of their experience (e.g., change music settings, make purchases with currency, etc.).

In one embodiment, an exemplary competition that may be run between gaming stations (e.g., kiosks or other hardware, such as hardware positioned in or near a queue line for an attraction), for example, may include reaction time of users. For example, a display may occur on a display of a kiosk and a user instructed to perform a task, such as organizing shapes, sizes, making an individual selection, choosing a next item in a pattern, or repeating a provided pattern, etc. The system may track the input times of respondents such that the one that completes the task first receives so many points or is able to control some other feature in communication with the system. In one exemplary embodiment, the engagement of riders within a queue line for a ride may also impact the response or available features within a ride. For example, the rider that wins a game within a line queue may receive double points during the actual ride, may unlock additional features available for a ride, and combinations thereof.

Exemplary embodiments may also be used to encourage user or participation behaviour as explained herein. For example, a user may use the line kiosks and/or gaming stations and input/output devices. The kiosks may be used as information displays, such as providing user approximate wait times from a given point. Users may use the kiosks and/or gaming stations integrated into the line structures, such as in defining railings and/or line positions.

Figure 34:
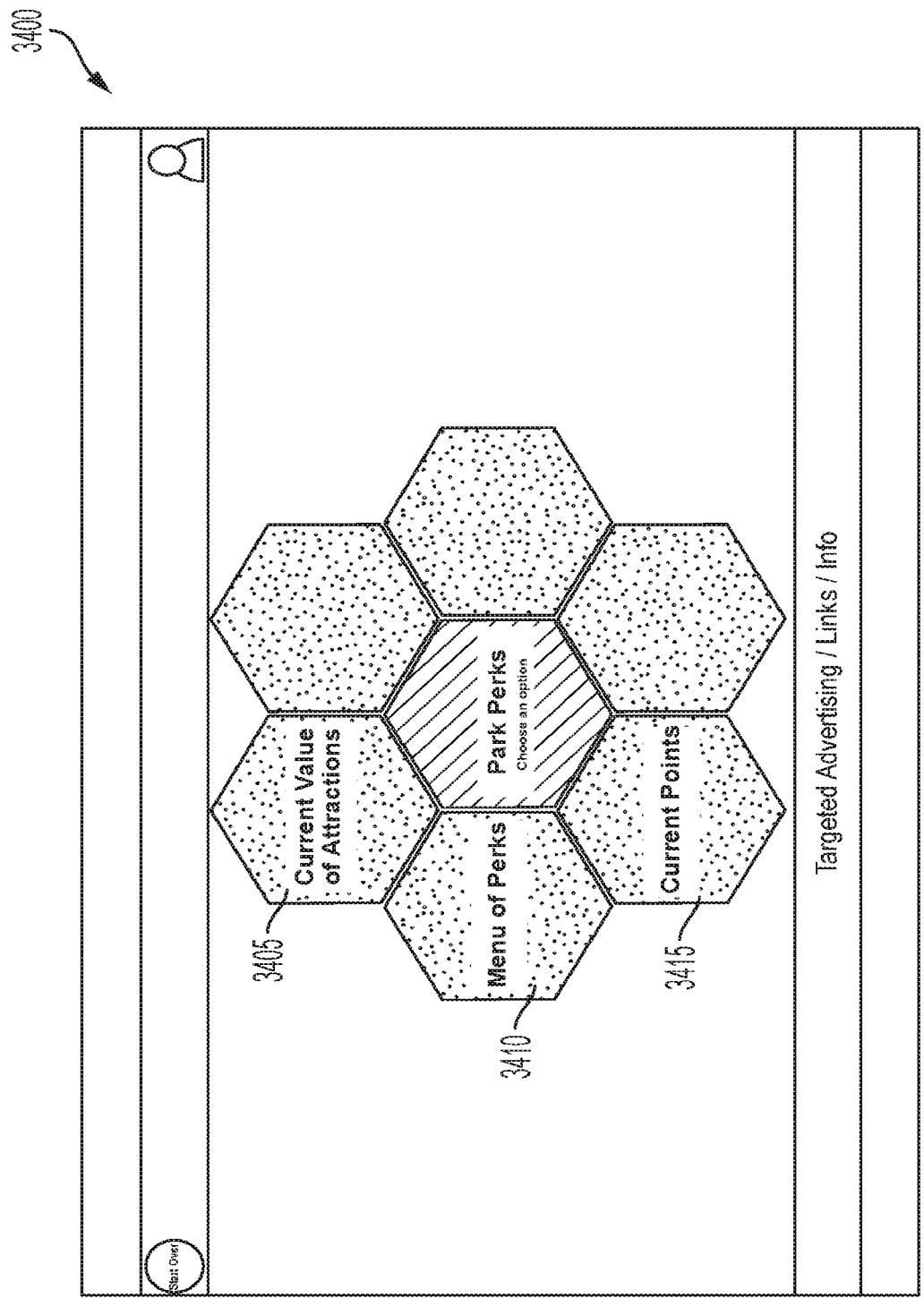
FIG. 34 illustrates a kiosk user-interface screen for a guest-centric perks page to be used with a system for tracking users and/or objects at a geographic location and configured to provide data and/or associated features, according to one exemplary embodiment of the invention.

Referring again to FIG. 28, a perks or rewards UI element 2820 may be interacted with by a user (e.g., by touching the UI element on a touchscreen of the kiosk). The perks or rewards UI element 2820 may be associated with a textual Description4 and/or imagery to indicate to a user the type of features available by selecting the perks or rewards UI element 2820 (e.g., viewing and/or redeeming of points or other perks earned by a user, such as by riding rides, playing games, making particular purchases, etc.). FIG. 34 shows a kiosk UI screen 3400 for a guest-centric perks or rewards page to be used with a system for tracking users and/or objects at a geographic location and configured to provide data and/or associated features. The UI screen 3400 for a perks or rewards page may include a variety of UI elements for providing features or functionality the same as or similar to those previously discussed, for example, for FIG. 17 and/or FIG. 24. For example, a current points UI element 3415 may be selected by a user in order to view the current number of points that a user has accumulated, the same or similar to the previous disclosure for FIG. 17 and/or FIG. 24.

A perks menu UI element 3410 may be selected by a user in order to view a history for that user of how the current number of points was accumulated, the same or similar to the previous disclosure for FIG. 24. A current value of attractions UI element 3405 may be selected by a user in order for the user to view that the current point values are for various attractions, events, venues, etc. that would be awarded to the user if that user participated on them, for example, within a particular timeframe (e.g., entered the queue line for a particular ride within the next 20 minutes).

In this fashion, the user may accumulate differing numbers of points depending on the particular attractions or venues that are visited by the user.

In one embodiment, an operator of the system or the destination may alter (e.g., dynamically or in real-time) the number of points awarded to users for particular attractions in order to help influence or modify user behaviour (e.g., encourage users to visit attractions or venues that are particularly slow compared to other attractions or venues at a given time, for example, to aid in managing crowd control throughout the destination). In still another embodiment, attraction operation may be dynamically adjusted based upon data received from the system (e.g., if the system determines an attraction is particularly popular at a given moment in time, the length of time that elapses for each user on the attraction may be shortened—such as a carousel that turns for only 2 minutes instead of the usual 3 minutes in order to more quickly dispatch users for that attraction. In one embodiment, a user who is linked with one or more other users (e.g., family or friends, such as in embodiments discussed throughout this application) may be permitted to obtain, store, or otherwise collect or interface with points and/or badges on a collective, competitive, and/or collaborative basis. For example, a first user linked with a second user may combine points and/or badges together to obtain a particular reward or other achievement, either rewarded to or associated with the first user, the second user, or both.

Although certain examples throughout this application have been discussed in the context of a waterpark or amusement park, any of a variety of other destinations or applications may use one or more of the features discussed. For example, malls, movie theatres, cruise ships, schools, school busses or other transit opportunities, etc. may benefit from parental control parameters whereby parents or other administrators of the system) can view locations and/or setup restrictions as to geographic location and/or activity of other family members or friends (e.g., ensuring children are in assigned classrooms at assigned times, do not leave school property, are riding on their designated transit, etc.). Users may be customers/guests and/or may be staff (e.g., security guards or other employees for the destination) may be tracked such that their location can be viewed by an operator of the system. Additional hardware may be utilized in certain embodiments that cooperates with one or more of the features described above (e.g., video cameras) may be linked to tracking of staff, for example, to ensure maintenance personnel are in their expected locations and wearing the appropriate safety gear, such as hard hats.

A variety of other operational and/or other operator features may be provided by a system that is configured to track movement and characteristics of users at a destination such as a waterpark or amusement park. A software application (e.g., mobile device based, web-based, etc.) may be provided for operators that differs from the software application that is available for users. Such an operator-specific software application may provide different information to the operators and/or employees based on the tracked data. For example, the system may identify guests or individuals that have a birthday on a given day, are VIPs within the destination, etc. and identify to staff members when such a user enters the vicinity (e.g., such guests or individuals may always be identified to staff members and/or only if other predetermined criterion or parameters are met, such as the guest has a particular type of ticket or pass to the venue, is of a particular age, etc.). A photograph or other visual description or indication may additionally be provided to an operator and/or staff member so that such a user may be individually greeted, enhancing their user experience. In another example, if a particular user has indicated their language is French, or has indicated other preferences that the system has stored as part of their profile or activity, the system may provide such info to staff so that such users can be greeted and interacted with in a more particularized manner. Operators can help ensure parents do not exit the destination (or some location within the destination) while leaving minor children users that are linked to them in the system behind.

In another example of operational features that are available, ride access features may be used to help improve efficiency or operational excellence while maintaining safety of user entering or exiting from attractions may be used. Conventionally, a lifeguard or other employee for a destination maintains control of user entry and/or exit from attractions at a destination to help ensure that users do not improperly attempt to enter or ride on an attraction before the user before them has exited the attraction or is at some predetermined safe distance such that a new rider is permitted. Although certain technology, such as light beams or lasers, can be beneficial in aiding lifeguard or employee control by identifying when the light beam or laser has been broken, issues can still arise, for example if a user's ride vehicle (e.g., inflatable tube or doughnut) breaks the light beam or laser, but the user has fallen off of the ride vehicle. In such a circumstance, a subsequent rider may believe it is safe to enter the ride when in fact the previous rider may still be on the ride.

The present invention allows for specific tracking of each particular user at the entrance to the attraction and at an exit location of the attraction, for example, to help increase operational excellence while maintaining safety of users. Buttons at the top and/or bottom of the ride may be activated based upon such tracking of users for lifeguards or employees to depress (e.g., a "go" button at an entrance to a ride, a "clear" button at a bottom of a ride, etc.). In some embodiments, video cameras may be employed at an entrance or an exit of the ride to potentially limit the number of lifeguards or employees required (e.g., a lifeguard may only be needed at an entrance or at an exit of an attraction, rather than both and/or no lifeguards may be needed physically at the ride at all). Riders or enter a ride improperly may thus be caught by such tracking and suffer some consequence (e.g., have their account flagged, have their trackable hardware de-activated, etc.)

Such tracking of users for operational excellence and/or safety may be used in any of a variety of possible manners outside of the amusement or waterpark context, such monitoring room capacity at nightclubs or other venues, safety monitoring for industrial equipment (e.g., a particular piece of equipment cannot be turned on unless all users have been tracked as being outside of a particular area), at ski resorts or other venues to ensure all users have been tracked as exiting the venue at closing time, etc. For example, to help ensure that there are no users remaining within a location at time of closing, the system may perform a check that each trackable device that passed through an entrance for the location has also passed through an exit for the location. If a discrepancy exists, and/or even in the event of no discrepancy between entrance and exit for aiding in ensuring accuracy, additional functionality may be engaged. For example, the last-known location of the trackable device may be examined from memory. In another example, if the trackable device was associated with a user account that provided contact information, contact with the user via the contact information may be attempted. In still another example, if the trackable device was linked with another trackable device, the location of the other trackable devices may be examined. (e.g., did those other trackable devices exit the location, when, etc.). In still another example, additional functionality of the trackable device may be engaged (e.g., Global Positioning System functionality, etc.) in an effort to pin-point the trackable device within the location or otherwise. Corresponding notifications may be provided to staff in an attempt to locate the trackable device.

In another example of operational and/or other operator features that may be provided by a system that is configured to track movement and characteristics of users at a destination, rider characteristics may be automatically verified by the system before a particular user is permitted onto the attraction and/or into a queue line for the attraction. In one embodiment, the system may have data stored concerning one or more characteristics for each user at the destination (e.g., height, weight, age, etc.). If a particular attraction at the destination requires a user be at least 4 ft tall, when a user who does not meet such criteria is tracked entering a queue line or entrance area for such particular attraction, the user may be notified that they do not meet such criteria (e.g., via a light that turns red, or some other indication—visual, audible, haptic, or otherwise that is indicated to the user). In another embodiment, certain attractions may incorporate multiple users riding on one ride vehicle that has a combined weight requirement. Accordingly, the system may automatically add up the respective weights of all users that are attempting to participate on a single ride vehicle to ensure that the combined weight requirement is not exceeded. In another embodiment, the system may also and/or alternatively arrange users in specific order and/or positioning (e.g., to desirably distribute weight of users in a ride vehicle and/or to increase efficiency of loading users, etc.). Any of a variety of possible criteria may be established for a given attraction or venue (e.g., age limits for venues where alcohol is served, etc.) that may then be enforced and/or indicated to one or more users or employees when such criteria is being breached. An attraction may have additional features that are configured to cooperate with the signals or data from the system (e.g., flows of water, safety bars to prevent entry, etc.).

In another example of operational and/or other operator features that may be provided by a system that is configured to track movement and characteristics of users at a destination, maintenance schedules, cleaning schedules, replenishing of disposable goods, or other operational schedules may be more efficiently tracked or performed. For example, if a bathroom at a facility is desired to be cleaned after every 100th user, the system may keep count of how many users have used the bathroom via the tracking of such users and signal (e.g., to the operator) once that number has been exceeded so that a cleaning crew can be dispatched to the area for cleaning and/or replenishing of toilet paper, etc. In another embodiment, the system may track the number of users that have participated on a given attraction and once a particular threshold number of users is met, indicate (e.g., to the operator) that the attraction or some aspect of the attraction should be serviced. Ride vehicles or other components that have a usable life may similarly be tracked such that it can be determined when such ride vehicles or other components should be replaced. In still another embodiment, vendors or other staff may be notified of areas where guests are queuing in long lines and/or areas where guests are waiting or congregating, in order for those vendors or staff to provide sale of goods (e.g., refreshments), entertain (e.g., provide photography opportunities, etc.).

In another example of operational and/or other operator features that may be provided by a system that is configured to track movement and characteristics of users is to permit engagement with and/or control behaviour of users within a specific ride and/or with a line and/or control behaviour within a line of a ride. Exemplary embodiments may be used as described herein to enhance engagement by individual users of a park. The mobile device and/or trackable hardware may be detected by receivers and/or kiosks within the park to provide specific responses based on the detection of the user. For example, user-specific experiences may be obtained for a rider or a spectator to a ride based on the tracking of such users. A ride may be configured, in one embodiment, to detect the presence of a specific user and may change or permit different engagement features be made available to the user and/or other features associated with the ride based on the detection of the user. In an exemplary embodiment, a ride may be configured with a controller that may be activated based on the recognition or proximity of a user having a mobile device and/or trackable hardware according to embodiments described herein.

Exemplary embodiments may permit individual attendance experiences throughout the park or designated area. For example, smaller kiosks, detectors, and/or gaming units may be positioned within lines or queues to rides. These kiosks/gaming units may permit game play as a rider waits for an attraction. In an exemplary embodiment, a kiosk may detect or receive input from a user identifying the user so the user may obtain points as they wait in line according to embodiments described herein. In an exemplary embodiment, a user may engage or communicate with other users in the same line or queue at different kiosks to create interactive or multiple player gaming. In an exemplary embodiment, a user at a first kiosk/gaming station may impact or provide an effect at another kiosk/gaming station and/or at a receiver or actuator controller an output device. For example, a user may engage another user through a communicatively coupled kiosk. The users may play a game and when one player earns sufficient points and/or wins an engagement, the user may actuate a device at the kiosk/gaming station and/or in proximity thereto. For example, as a player loses or wins a competition, the winner may control a water sprayer, lights, music, or other effect that is effected (e.g., at or in proximity to the winner, the loser, or elsewhere). Therefore, the kiosk/gaming station and/or devices in proximity thereto or elsewhere in the destination may include lights, displays, visual, lasers, speakers, water/fluid sprayers, misters, and combinations thereof. Exemplary embodiments may communicate with the network such that a user's position may be detected and communicated/stored according to embodiments described herein.

In another example of operational and/or other operator features that may be provided by a system that is configured to track movement and characteristics of users to influence behaviour of users within the park or designated area. For example, a plurality of transmitters and/or receivers may be positioned throughout a designated area of a destination. The transmitters/receivers may be hidden or may not be hidden. In an exemplary embodiment, the position of the transmitter/receivers are known and or provided to the user. The system may configure all of or a subset of the transmitter/receivers as checkpoints the user is encouraged to collect. A user may collect a checkpoint by being within proximity to the checkpoint and/or contacting the checkpoint such that the mobile device/trackable hardware of the user recognizes the checkpoint or is recognized by the checkpoint. In an exemplary embodiment, the user may be provided information to collect certain checkpoints and/or be provided the location of the checkpoints. The collection of checkpoints may be triggered or provided to a group of users to disperse users throughout the park or encourage select users to experience or travel certain areas of the park.

In an exemplary embodiment, the plurality of receiver/transmitters may be color coded or otherwise distinguishable or recognizable. Different users may thereafter be directed to find and collect different checkpoints based on the identifying feature, such as color. In an exemplary embodiment, a user may earn points or receive benefits as described herein for obtaining or collecting a certain number of checkpoints and/or in making a certain number of checkpoints within a predetermined amount of time. For example, a user may be provided the location of all of the blue checkpoints and encouraged to collect all of the blue check points to obtain a number of park perk points or other incentive. The location of checkpoints may also encourage activity such as entering certain locations, stores, facilities, etc. within the park. In an exemplary embodiment, the system may be configured to provide alerts to users based on other activities within the park, such as to drive select individuals to underutilized portions of the park from higher utilized portions of the park. Exemplary embodiments may also be used to direct specific users based on one or more user demographic or user trait or attribute to desired portions of the park. Exemplary embodiments may create unique combinations of checkpoints based on individual attributes of the user. Therefore, each user or group of users may be provided a unique combination of checkpoints to drive dispersal or other movement of users and/or groups within a park.

In an exemplary embodiment, the system may recognize an individual user as part of a group and may therefore provide feedback and/or incentives or other responses according to embodiments described herein based on attributes of the group as well as attributes of one or more individuals or actions of individuals within the group. Exemplary embodiments may also be used to track other users within a group such that each group member may have a way to locate other members of the group. Exemplary embodiments may also be used to communicate with other members of a group. For example, a user may configure the system to recognize members of the group. The system may be configured thereafter to provide alerts to other members of a group when a member of the group enters or leaves an attraction. The system may also be configured to provide an alert at a specific time, such that users may set a time to reconvene and the system may inform the location of other users or of a primary user in which the others are to locate and convene. The system may also receive an input from one user, such as through a kiosk. The user may identify a desire to communicate with a specific user and/or one or more members of their group. The system may be configured to display an output based on the user input to the indicated person when the indicated person (or members of a group) are detected.

Figure 35:
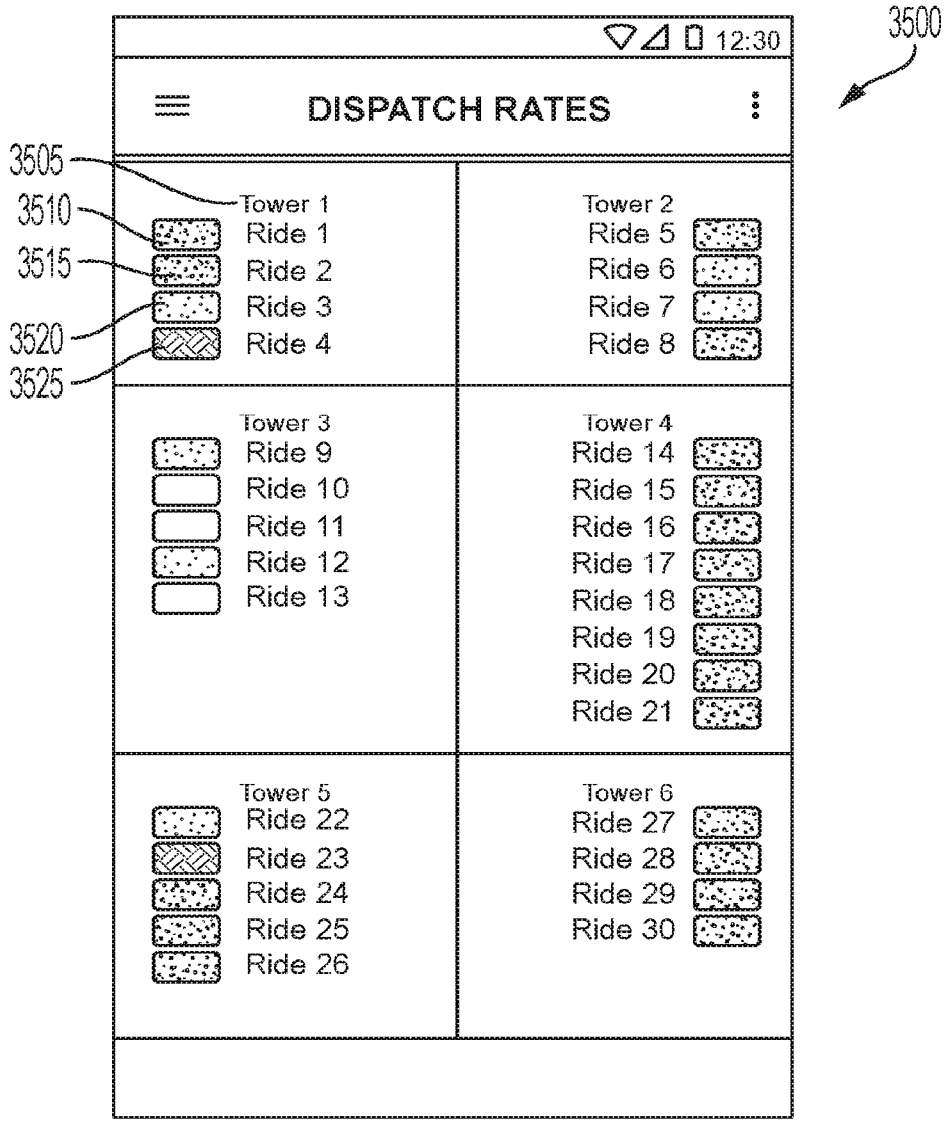
FIG. 35 illustrates a user-interface screen for an operator-centric dispatch data page to be used with a system for tracking users and/or objects at a geographic location and configured to provide data and/or associated features, according to one exemplary embodiment of the invention.

The system may track the location of employees or staff to ensure that such employees and staff are properly performing their duties (e.g., making rounds to check security, making rounds to check maintenance, properly cleaning areas that have been assigned, etc.). For example, FIG. 35 shows a handheld user-interface screen for an operator-centric dispatch data page 3500 to be used with a system for tracking users and/or objects at a geographic location and configured to provide data and/or associated features. Operational efficiency of various rides or attractions at the destination may be shown by a number and/or color code corresponding to the dispatch rate of each of the attractions. For example, a particular structure (e.g., a tower) 3505 may have four rides or attractions that may be entered by users via the structure 3505: a first ride or attraction 3510, a second ride or attraction 3515, a third ride or attraction 3520, and a fourth ride or attraction 3525. A number or color or other indicia may be displayed next to each of the four rides or attractions (3510, 3515, 3520, 3525) corresponding to how efficiently they are dispatching riders, for example, based upon an expected or ideal dispatch rate. If it is determined that one or more of the attractions is dispatching riders particularly slowly, the operator may send personnel to take a look and make sure there is not a problem with the attraction and/or with the employee(s) in charge of controlling access to the attraction.

In one embodiment, a variety of other attraction operation conditions or parameters can be ascertained or otherwise tracked via the system. For example, maintenance of an attraction may be scheduled (e.g., a notification sent by a processor to staff and/or operators indicating maintenance is needed). Such maintenance may be scheduled based on timing (e.g., an attraction has been in operation for a predetermined amount of time) and/or maintenance may be scheduled based upon tracking of users (e.g., a particular attraction has had 1000 users ride or otherwise interact with the attraction). Error detection and/or other failures of an attraction (e.g., mechanical failures) may also be tracked (e.g., pressure sensors, flow sensors, etc.) that are incorporated into the system and/or have appropriate maintenance scheduled in response thereto. Any of a variety of attraction or venue maintenance, user-experience, cash-generating opportunities (e.g., provide advertisements and/or coupons to users as those users are tracked in particular areas and/or have participated in particular activities) health-related functionality (e.g., tracking and providing users and/or operators with statistics regarding number of steps walked, calories burned, etc.), and/or safety functionality (e.g., notifications to staff based upon user biometrics, such as heart monitors, notifications to staff based upon lack of user movement when in a particular area, such as a pool, etc.) may be provided in varying embodiments.

Figure 36:
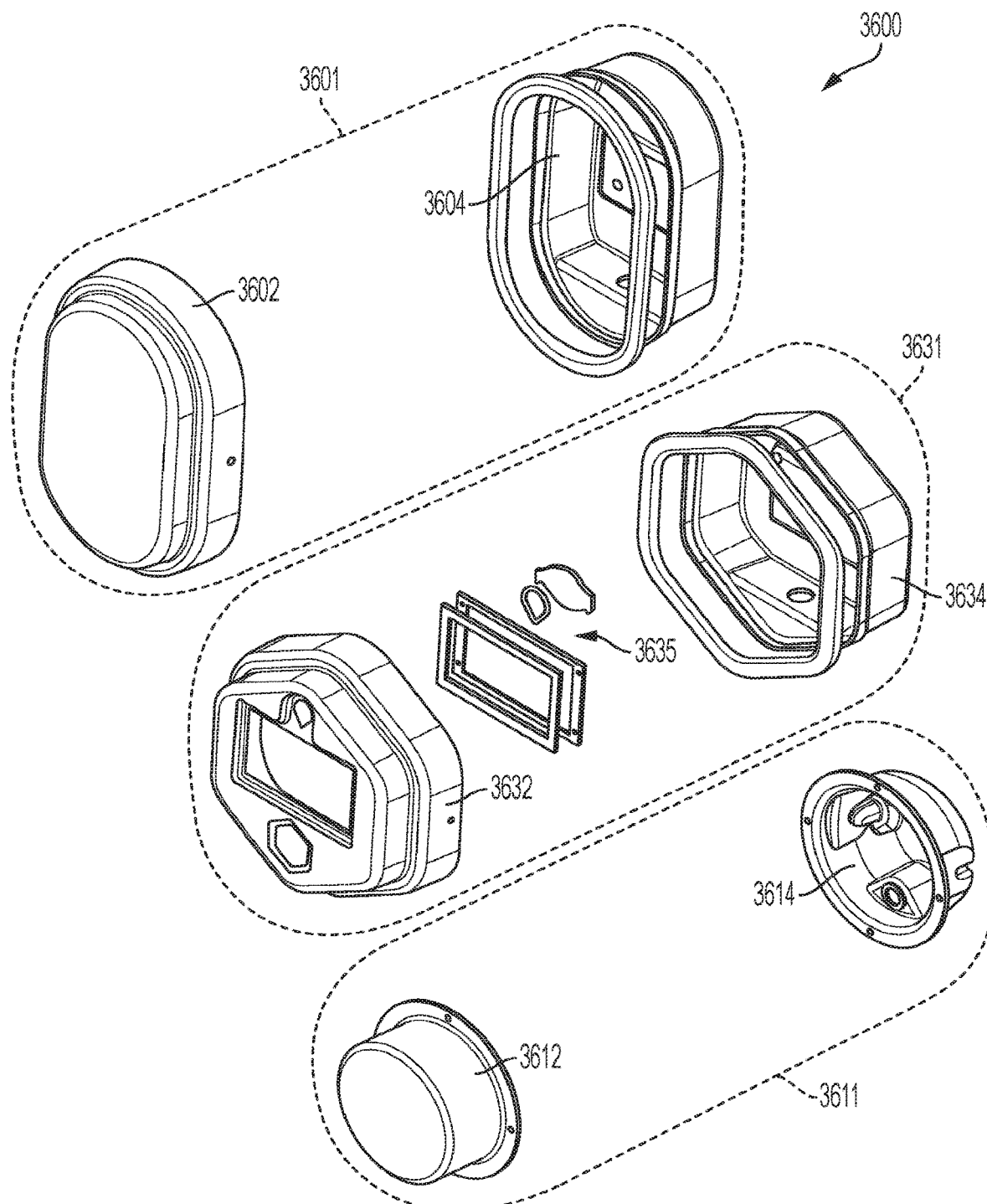
FIG. 36 illustrates a perspective view of various devices that interface with a tracking device, according to one exemplary embodiment of the invention.

FIG. 36 shows a perspective view 3600 of various devices that interface with a user's tracking device (e.g., wristband or otherwise, as discussed throughout) for the purposes of sensing or tracking the user and/or allowing the user to interface with software, such as software that includes features based off of tracking data of the user and/or other users, for example, those discussed throughout this application, such as in FIGS. 27-24. A sensing or tag-up device or station 3631 may be positioned within a location (e.g., a waterpark or amusement park) and configured to allow a user to tag-up (e.g., be sensed) when within a proximity of the device or station 3631, such as when a tracking device of the user is within 2 ft of the device or station 3631. The device or station 3631 may be made of a first housing 3632 and a second housing 3634 that are configured to connect or engage with each other and hold one or more electronic components therein (e.g., antenna(e), readers, such as RFID readers, processors, receivers, transmitters, transceivers, memory, etc.). The device or station 3631 may also include a display 3635 (e.g., a touchscreen) that permits a user to view information, such as information or data determined based upon the sensing or tag-up by the user, and/or interact therewith (e.g., by touching UI elements displayed on the touchscreen), the same or similar to discussion throughout this application. The display 3635 may include a coating or other be configured for high-visibility in outdoor environments. The device or station 3631 may be a freestanding device (e.g., similar to the disclosures of FIGS. 16A-C) and/or may be configured to be mounted to other structures (e.g., not resting upon a floor or ground surface). In one embodiment, the device or station 3631 may not allow user input (e.g., may have only a display, but not accept user touch of the display as an input) and be used for tag-in by users and display of information upon the display, but without further functionality based upon user feedback.

A first sensing device or station 3601 may be configured to read, receive, and/or otherwise sense or track a user's movement in a location (e.g., a waterpark or amusement park) based upon tracking hardware that is worn, carried, or otherwise associated with a user. The first sensing device 3601 may be made up of a first housing 3602 and a second housing 3604 that are configured to connect or engage with one another and contain one or more electronic components therein (e.g., antenna(e), readers, processors, receivers, transmitters, transceivers, memory, etc.). The first sensing device 3601 may be configured to sense users at a shorter range (e.g., 2 ft or less) and may be placed at a desired location for a user to "tag-up" to the device or station 3601 (e.g., at an entrance to an attraction, show, or other area). In an alternative embodiment, longer-range sensing or tracking equipment (either alternative to shorter range sensing equipment or in addition thereto) may be incorporated with or connected with the first sensing device or station 3601. For example, the first sensing device or station 3601 may be configured to sense or detect users at ranges of greater than 2 ft (e.g., 30-50 ft) in a 360 degrees radius around the position of the first sensing device or station 3601.

A second sensing device 3611 may similarly be made up of a first housing 3611 and a second housing 3612 that are configured to connect or engage with one another and contain one or more electronic components therein (e.g., antenna(e), readers, processors, receivers, transmitters, transceivers, memory, etc.) The second sensing device 3611 may similarly be configured to sense users at a longer range (e.g., greater than 2 ft), and may be include a directional antenna, for example to provide a more narrow radius of detection of users (e.g., a 20-30 degree radius) via hardware associated with the user. The second sensing device 3611 may be connected with the first sensing device or station 3601. In such an embodiment, the electronic components of the first sensing device or station 3601 may interface with the second sensing device 3611 to convert the first sensing device or station 3601 from a 360 degree radius of detection station to a more narrow detection station due to the directional antenna of the second sensing device 3611. One or more antenna(e) associated with the second sensing device 3611, such as is described in FIG. 37, may be used to the sensing and/or tracking of particular users and/or crowds of users. In one embodiment, the first sensing device or station 3601 may be configured to use Bluetooth Low Energy communication protocol. In an alternative embodiment, any of a variety of communication protocols, whether proprietary or not, may be used.

Figure 37:
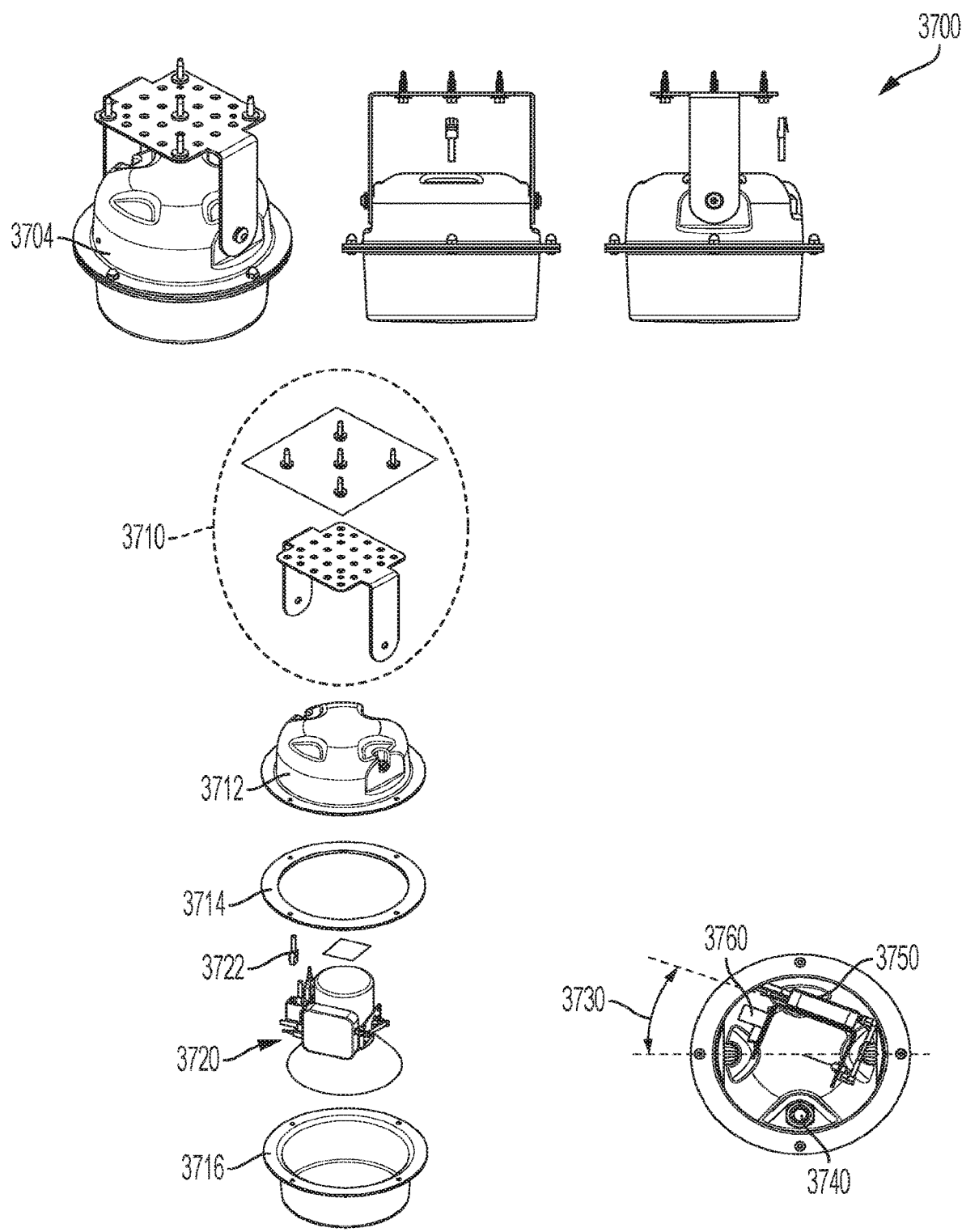
FIG. 37 illustrates a plurality of views of a sensing device configured to sense one or more users, according to one exemplary embodiment of the invention.

FIG. 37 shows a plurality of views of a sensing device 3700, for example, capable and/or configured to sense one or more users over a larger range, for example, even when a user is greater than 2 ft away from the sensing device 3700. Such capability may be desirable when a user (or plurality of users) are moving and/or positioned throughout a location (e.g., a waterpark, amusement park, or other entertainment venue) and positioning and/or tracking data for such user or plurality of users is desired, as discussed throughout this application. The sensing device 3700 may include an enclosure 3704 having a cavity therein. One or more components (e.g., electronic components) may be disposed at least partially within the cavity of the enclosure 3704, for example, as shown in the exploded view of FIG. 37. Antenna(e) of the sensing device 3700, as described in greater detail below, may allow for greater accuracy in detection of users since such antenna(e) may be directional and detect users in a more narrow radius around the sensing device 3700.

In one embodiment, the enclosure 3704 may be made up of multiple parts, such as a first housing 3712, a second housing 3716 configured to connect with the first housing 3712, and a gasket or other connecting plate or ring 3714 therebetween. In the cavity formed via the connection of the first and second housing (3712, 3716), a sub-assembly comprising an antenna (e.g., a horn antenna) or other transmitter and/or receiver, power connection or power board 3760 (e.g., a Power over Ethernet board), and/or a gateway 3750 (e.g., Bluetooth) or other networking or communication component or components is located. In an alternative embodiment, greater or fewer components, as a sub-assembly or as individual items, may be included. In one embodiment, the antenna may be made of aluminium. A cable 3722 (e.g., RJ45) may be connected with the gateway via a port in order to support communication with remote devices, such as a server or other equipment configured to track, store, and/or monitor users and/or perform other functions based upon data obtained via the sensing device 3700. Although the embodiment of FIG. 37 shows a single cable 3722 for transmitting (e.g., from a sensing station, such as sensing device or station 3601 of FIG. 36) data and power to the antenna for powering the gateway 3750, in an alternative embodiment, greater number of cables and/or different connection of cable(s) may be used for provision of power and/or communication of data or signals. In certain embodiments, wireless communication may be used. A cable gland or fitting 3740 may be used to help attach and/or secure cabling or wiring within the enclosure 3704. The antenna may be rotated an angle 3730 and/or oriented relative to the second housing 3716 (e.g., 22 degrees from horizontal) via the cable gland or fitting 3740 and/or rotation or positioning of the first housing 3712 with respect to the second housing 3716, for desired operation. The enclosure 3704 and/or parts therein or thereof may utilize a yolk design for allowing modification of the angle of the antenna to a desired orientation. Bracket or connection components 3710 may be used for the placement and/or orientation of the sensing device 3700 as desired.

FIG. 38 shows a sensing or tag-up device 3800 for user engagement and/or interaction. The sensing or tag-up device may include features that are the same as or similar to those discussed throughout this application. For example, it may be desirable for a user to interface with an account associated with the user, data associated with the user, and/or otherwise interact with software associated with a location (e.g., a waterpark or amusement park) by allowing the user to be sensed (e.g., "tag up" when within a proximity of the sensing or tag-up device 3800). This sensing of the user may be by way of a sensor 3806 built into or otherwise (partially or fully) contained and/or connected with a housing 3804 of the sensing or tag-up device 3800. The sensing may be configured to occur only when the user is within a predetermined proximity or range of the sensing or tag-up device 3800 (e.g., a short range, such as equal to or under 2 ft, for example, by using Radio Frequency Identification or RFID tags). This short range may be desirable to help avoid the sensing or tag-up device 3800 from sensing and/or allowing interaction by users who are merely walking or passing by the sensing or tag-up device but are not attempting to interact with the sensing or tag-up device 3800. Electronic cables or wiring (3812, 3814) (e.g., power, communications, networking, signal routing, etc.) may engage with one or more electronic components contained within the housing 3804 (e.g., via a back of the housing) of the sensing or tag-up device 3800, such as a processor, printed circuit boards, antenna(e), receivers, transmitters, transceivers, reader, memory, etc.). A connection plate 3808 may allow the sensing or tag-up device 3800 to be mounted off of the ground or otherwise positioned to be at a convenient height or orientation for user viewing or interaction, for example, as opposed to floor or ground-standing structures, such as those described in FIGS. 16A-C. In one embodiment, the device 3800 may be roughly 250 mm tall and 100 mm wide.

Once a user is sensed or tags up to the sensing or tag-up device 3800, a display 3810 (e.g., a touchscreen or a display that does not allow for user touch input to be received) may display information to the user and/or receive input from the user. In this fashion, the user may view data associated with their tracking module (e.g., where the user has been or what activities or attractions the user has participated in, viewing points or other rewards the user has obtained, etc.) and/or provide input that software associated with the sensing or tag-up device may use for further features (e.g., communication with other users, redemption of points, setting up reservations, changing music or themes, etc.), the same or similar to previous discussions. The sensing or tag-up device may include all or a subset of the features and/or software operation discussed throughout this application, for example, regarding the structures and associated software of FIGS. 16A-C and FIGS. 27-34 and/or FIG. 36. In one embodiment, the sensing or tag-up device 3400 may be smaller in physical size and/or have reduced features and/or different features available for a user to view and/or interact from those previously discussed for FIGS. 27-34. For example, in one embodiment, the sensing or tag-up device 3800 may be used for providing alternative customer service related features (e.g., technical support, interaction with company representatives, troubleshooting information, etc.) different from the features previously described.

In another example, in one embodiment, the sensing or tag-up device 3800 may be used at an entrance or other check-in location for an attraction, ride, show, event, restaurant, or other access point whereby a user is permitted to tag-in and subsequently interact with the sensing or tag-up device 3800 to input or establish further activity (e.g., setup or finalize reservations at a particular restaurant where the sensing or tag-up device 3800 is located, setup particular preferences for a given attraction or ride where the sensing or tag-up device 3800 is located, purchase upgrades for a show, such as preferred seating or adding a dining package, etc.). In such a fashion, the sensing or tag-up device 3800 may be used in cooperation with other sensing devices, such as kiosks, for example, as described in this application for FIGS. 16A-C, performing same or similar functions or software operation and/or providing alternative features, functions, or software operation altogether.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. A target may be single threaded or multiple threaded. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. In another example, although particular portions and/or elements of user interface screens have been shown by exemplary embodiments throughout this application, greater, fewer, different, and/or different orientations, positioning, sizes, shapes, and/or other functionality may be used for portions and/or elements of user interface screens (either for use upon handheld or mobile devices and/or for larger devices, such as kiosks) in alternative embodiments. Embodiments are exemplary only, and provide an illustrative combination of features, but are not limited thereto.

Additional exemplary features may also be included, additional or in replacement of other features discussed throughout this application. For example, rider wearable hardware and/or its associated software may be configured to detect motion, or lack of motion, of an individual associated with the hardware for aiding in safety. In one embodiment, if an individual is determined to not be moving (either detected through the lack of small movements, or on a larger scale by detecting that an individual is currently positioned in a pool or other body of water but has not significantly moved from that position for a predetermined period of time, the system may determine that a safety concern should be raised, either by sounding an alarm, alerting an employee or operator, alerting another user associated with the individual's hardware (e.g., a parent), etc. In one example, gateways or other sensing equipment, such as Bluetooth Low Energy ("BLE") gateways may be placed in successive locations or positions in a particular area (e.g., a pool or body of water) that tracks the presence of tags and when a tag is not sensed or heard from for a particular period of time, one or more notifications may be sent (e.g., to particular employees or system operators) alerting them as to the lack of sensing.

In another example, various operator management features may be incorporated into a system using one or more of the features described herein. Such operator management features may include tracking of employees (e.g., who is currently present within the tracked location and/or their positioning or history of positioning), tracking of ride vehicles, tracking of products (e.g., food, souvenirs, etc.), tracking of facility or ride status (e.g., last time of ride or facility inspection or cleaning), etc. Such features may help efficiently manage staff and/or more them throughout the park to address needs that arise during operation. In certain embodiments, a staff engagement and/or incentive system may be implemented to aid in operator management, for example, by targeting a whole group and/or individual staff members based on behaviours of those groups or members that is tracked by the system. For example, software incorporating such a feature may include a portal that allows operators and/or individual staff members to see progress toward a particular goal (e.g., complete the sale of a certain number of a particular item). The portal for individual staff members may be limited in the amount of access to information displayed outside of that specific incentive plan.

In still another example, ride environments or other areas of facilities may be modified or personalized based upon rider characteristics or desires. For example, depending on the characteristics of a rider entering a ride or area (e.g., height, weight, preferences, age, gender, etc.), specific experiences may be changed (e.g., changing the thrill level of a ride, changing the characteristics of a ride to allow for individuals having different skill levels, such as the speed or amount of water flowing on a given ride, changing the flow of water by modification of pumps based on height and/or weight of a rider, changing the tension on specific ride apparatus, changing the power provided to motors on a particular ride, changing the theming of a location, etc.) Indeed, any of a variety of possible personalization modifications may be made based upon a rider, or group of riders, entering a designated area. In one example, a characteristic of a particular ride vehicle may be determined (e.g., the color of the ride vehicle). Once that particular ride vehicle characteristic is determined at the start of a ride, the color of the ride itself may be changed based upon the color of the ride vehicle. Any of a variety of ride vehicle characteristics may be used (theme, etc.) to correspondingly alter a facet of a ride (e.g., sound, color, theme, etc.) for personalization purposes.

Although sensing of riders at various locations and/or attraction entrances at a given location have been described via the use of wearable wireless technology (e.g., the wristbands described above), any of a variety of possible user recognition systems or types may be used in alternative embodiments, such as RFID (e.g., short-range or long-range), BLE, facial recognition, computer vision, biometric (e.g., fingerprint), iris scan, etc. Different technologies for recognition may be used in different locations (e.g., short-range or long range readers may be used to initially identify a person, whereas photo, iris, LIDAR, etc. may be used top more particularly determine where that user exists in a given space). In some embodiments, additional sensing technology (e.g., a camera) may be used to help determine whether a particular area is occupied to help unambiguate the location of a particular person that is being read with a long-range sensor). In certain embodiments, a sensor or component (e.g., a light sensor, heart rate sensor, etc.) may be connected or integrated with a portion (e.g., a back) of a wearable by a user (e.g., a wristband) that is configured to detect when the wearable has been taken off by the user. In such a circumstance, the wearable may automatically disassociate itself from that user.

In certain embodiments, additional sensors, such as those described, may be used to help detect when users without the necessary hardware. For example, a long-range reader may be setup to track all guests that are wearing wristbands that have access to a specific area. If a user enters the area without the necessary wristband, a separate sensor (e.g., photo recognition, etc.) may be used to see that entry was made by someone without the wristband and alert an appropriate staff member. In some embodiments, the technologies described throughout this application for reading or sensing guests or ride vehicles may be incorporated into a handheld device, with or without a display screen (e.g., allowing for staff members to individually read guests as desired, for example, to allow guests to make purchases, reservation, or enter a particular area, etc.).

Hardware or software may also be used to accept particular wearables (e.g., wristbands) for a location and also allow information associated with that wearable be passed to other systems (e.g., interface or integrate with a third party developer in a format compatible with such third party system, such as payment systems). Moreover, data collected as part of the system (e.g., across all parks or locations using the system) may be aggregated for certain information and/or using certain parameters for generation of benchmarks. Algorithms for translating guest demographics and/or behaviour into buying habits may be created. For example, the system may notify a system operator on how or where currency or purchases from guests may be maximized based on which guests are in which locations of large concentration.

Other wearable technology associated by individuals visiting the location may also be accommodated by the system in particular embodiments. For example, smart glasses being used by a guest may be interfaced with to help create a story-driven experience for a particular ride or area. Smart glasses may be utilized in other manners as well, for example, by staff wherein a picture of a guest that has entered a particular area may be displayed on the smart glasses of a staff member so that the guest may be personally greeted or to otherwise make the experience more personalized or enjoyable for the guest (e.g., staff may be notified as to one or more guest preferences, such as for food, beverages, rides, characters, etc.).

A variety of interactive maps and/or other games or activities may also be available for guest interaction. For example, a map of the location with various activities (e.g., rides) within that location may be available (e.g., at an entrance to a particular zone or area of the location). Wait times for the various activities may be displayed upon the map. A guest may tag into those signs to create a personalized map (e.g., either displayed on the display at the location and/or on a personal mobile device of the guest) with a route or path that the user may follow to get to a desired one or more activities. Another example of a game that can be played by guests may include a series of "checkpoints" that are setup through the location (e.g., amusement or waterpark). These checkpoints may be virtually setup as a plurality of gem-like hexagons (e.g., 18"×18"×3") and have a station (e.g., somewhat hidden or difficult to casually find) associated with each hexagon. Each station may include a small computer with a monitor, a reader, and a speaker. Guests can play by attempting to locate each of the "hidden" stations and tagging the reader associated with each station to their wearable device (e.g., wristband). Upon tagging, the screen of the station may display a prompt to the user, such as "You've found a hidden checkpoint. This is number [x] of [xx]. Keep Looking for more!" and the speaker associated with the station may play a quick fanfare to let the player know that a positive action just occurred. Checkpoints may be divided up in particular ways (e.g., there may be 10 "green" checkpoints and 10 "orange" checkpoints in the park). Upon the user finding all (or a particular number) of the checkpoints or types of checkpoints, the user may be rewarded (e.g., through park perks or points previously discussed, badges previously discussed, coupons, or other benefits).

When used in this application, the terms "comprises" and "comprising" and variations thereof mean that the specified features, steps or integers are included. The terms are not to be interpreted to exclude the presence of other features, steps or components. Features disclosed throughout this application, expressed in their specific forms or in terms of a means for performing the disclosed function, or a method or process for attaining the disclosed result, as appropriate, may, separately, or in any combination, be utilised for realising the invention.

The invention claimed is:

1. A device associated with a user for tracking comprising:
a first strap having a connection mechanism;
a second strap having a connection mechanism configured to connect with the connection mechanism of the first strap;
a capsule having a top component and a bottom component configured to fit together to form a cavity therebetween and prevent water from entering into the cavity, the cavity of the capsule containing:
  a printed circuit board having a first side and a second side,
  a first transmitter configured to transmit unique identification data corresponding to the capsule for a maximum distance of less than 3 ft, the first transmitter connected on the first side of the printed circuit board,
  a second transmitter configured to transmit the unique identification data corresponding to the capsule for a distance that is greater than the maximum distance of the first transmitter, the second transmitter connected on the second side of the printed circuit board,
  a receiver configured to receive a signal from an external source;
  an accelerometer;
  a battery for providing power to the first transmitter or the second transmitter, wherein the battery is configured to not provide power to the first transmitter or the second transmitter if the capsule has not received a predetermined signal from the accelerometer within a predetermined amount of time; and
a base disposed between the first strap and the second strap configured to removably accept the capsule; and
a machine-readable code configured to associate the capsule with a particular user.

2. The device of claim 1, wherein the base is removably attached to the band.

3. The device of claim 1, wherein the capsule further comprises one or more speakers.

4. The device of claim 3, wherein the one or more speakers are configured to produce sounds based on a signal received by the receiver.

5. The device of claim 1, wherein the capsule further comprises one or more lights.

6. The device of claim 5, wherein the one or more lights are configured to activate based on a signal received by the receiver.

7. The device of claim 5, further comprising a first set of lights disposed along an outer ring of the capsule, and a second set of lights disposed along an inner ring of the capsule.

* * * * *